United States Patent
Shimai et al.

(10) Patent No.: US 11,233,245 B2
(45) Date of Patent: Jan. 25, 2022

(54) CATALYST-LAYER FORMING APPARATUS

(71) Applicant: TOKYO OHKA KOGYO CO., LTD., Kanagawa (JP)

(72) Inventors: Futoshi Shimai, Kanagawa (JP); Hiroshi Okonogi, Kanagawa (JP); Yasuhiro Numao, Kanagawa (JP); Takayuki Hirao, Kanagawa (JP); Kimio Nishimura, Kanagawa (JP)

(73) Assignee: TOKYO OHKA KOGYO CO., LTD., Kanagawa (JP)

( * ) Notice: Subject to any disclaimer, the term of this patent is extended or adjusted under 35 U.S.C. 154(b) by 123 days.

(21) Appl. No.: 15/769,299

(22) PCT Filed: Oct. 13, 2016

(86) PCT No.: PCT/JP2016/080400
§ 371 (c)(1),
(2) Date: Apr. 18, 2018

(87) PCT Pub. No.: WO2017/069043
PCT Pub. Date: Apr. 27, 2017

(65) Prior Publication Data
US 2018/0309135 A1    Oct. 25, 2018

(30) Foreign Application Priority Data
Oct. 19, 2015    (JP) .............................. JP2015-205286

(51) Int. Cl.
*H01M 4/88* (2006.01)
*H01M 8/1018* (2016.01)
(Continued)

(52) U.S. Cl.
CPC ......... *H01M 4/8828* (2013.01); *H01M 4/881* (2013.01); *H01M 4/8807* (2013.01);
(Continued)

(58) Field of Classification Search
None
See application file for complete search history.

(56) References Cited

U.S. PATENT DOCUMENTS 6,197,147 B1 * 3/2001 Bonsel ................ H01M 8/1004
156/269
7,993,798 B2 * 8/2011 Kuramochi ........... B32B 37/223
429/535
(Continued)

FOREIGN PATENT DOCUMENTS

JP    2005-149847 A    6/2005
JP    2005149847 A *   6/2005
(Continued)

OTHER PUBLICATIONS

International Preliminary reporton Patentability received in PCT Application No. PCT/JP2016/080400, dated Apr. 24, 2018.
(Continued)

*Primary Examiner* — Ula C Ruddock
*Assistant Examiner* — Amanda Rosenbaum
(74) *Attorney, Agent, or Firm* — Knobbe, Martens, Olson & Bear LLP

(57) ABSTRACT

[Problems] To easily and efficiently manufacture a catalyst layer having high catalytic activity and to easily manufacture a fuel cell having high power generation efficiency.
[Solution] An apparatus for forming a catalyst layer 3 for a fuel cell on an electrolyte film (application object) 2, the apparatus including: a holding portion 6 that holds a sheet-shaped electrolyte film 2, an application portion 7 that applies a catalyst ink 5 for forming the catalyst layer 3 on at least one side of the electrolyte film 2 held by the holding portion 6, a chamber portion 8 that is capable of forming a space 55 including the holding portion 6, and a suction
(Continued)

portion 9 that depressurizes the inside of the space 55 formed by the chamber portion 8 so as to dry the catalyst ink 5.

2 Claims, 27 Drawing Sheets

(51) Int. Cl.
*H01M 8/02* (2016.01)
*H01M 8/1004* (2016.01)
*H01M 4/92* (2006.01)

(52) U.S. Cl.
CPC .......... *H01M 4/8882* (2013.01); *H01M 8/02* (2013.01); *H01M 8/1004* (2013.01); *H01M 8/1018* (2013.01); *H01M 4/926* (2013.01); *H01M 2008/1095* (2013.01); *Y02P 70/50* (2015.11)

(56) References Cited

U.S. PATENT DOCUMENTS

| | | | | |
|---|---|---|---|---|
| 2005/0098101 A1* | 5/2005 | Shen | ............... | B05B 17/063 |
| | | | | 118/696 |
| 2006/0045985 A1* | 3/2006 | Kozak | ............... | H01M 8/0245 |
| | | | | 427/458 |
| 2006/0216563 A1* | 9/2006 | Matsunaga | ......... | H01M 4/8807 |
| | | | | 429/483 |
| 2007/0116914 A1* | 5/2007 | Koike | ............... | B32B 3/26 |
| | | | | 428/40.1 |
| 2015/0165627 A1* | 6/2015 | Ono | ............... | H01M 8/006 |
| | | | | 294/185 |

FOREIGN PATENT DOCUMENTS

| | | | |
|---|---|---|---|
| JP | 2006-164790 A | | 6/2006 |
| JP | 2010-033731 A | | 2/2010 |
| JP | 2010-86730 A | | 4/2010 |
| JP | 2010086730 A | * | 4/2010 |
| JP | 2010-251012 | | 11/2010 |
| JP | 2015-220185 A | | 12/2015 |
| JP | 2015220185 A | * | 12/2015 |

OTHER PUBLICATIONS

Office Action issued in Japanese Patent Application No. 2015-205286 dated Jul. 29, 2019, pp. 1-5.

International Search Report received in PCT Application No. PCT/JP2016/080400, dated Jan. 17, 2017.

* cited by examiner

FIG. 3
(A)
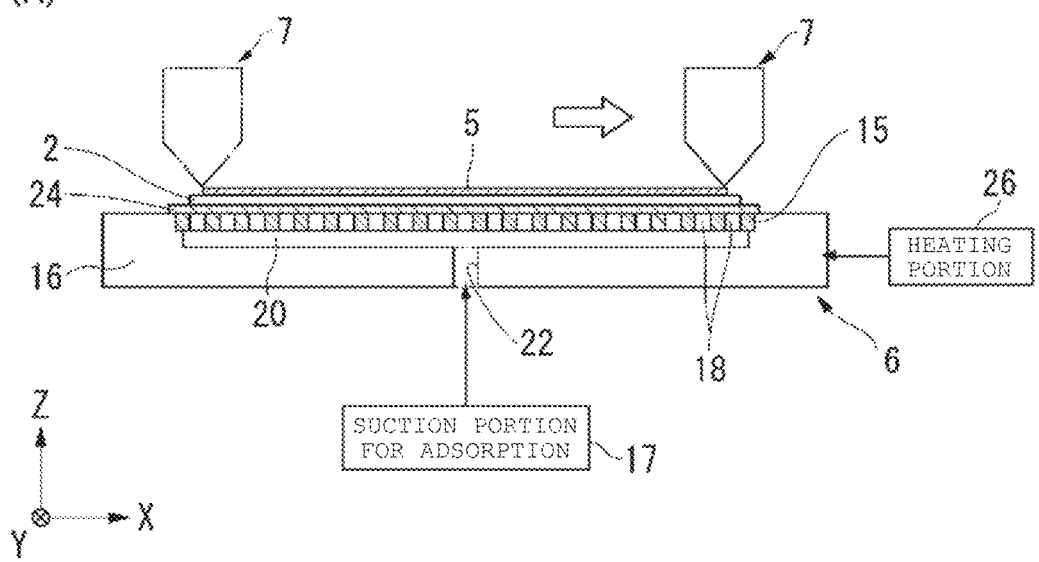
(B)
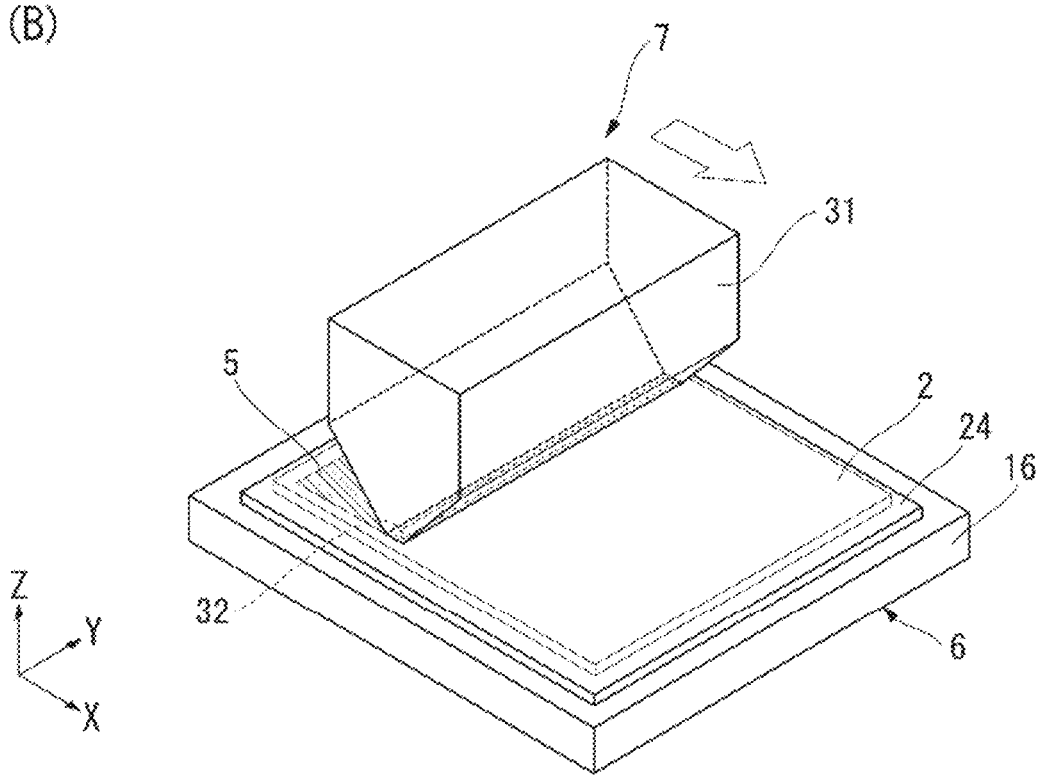

FIG. 4
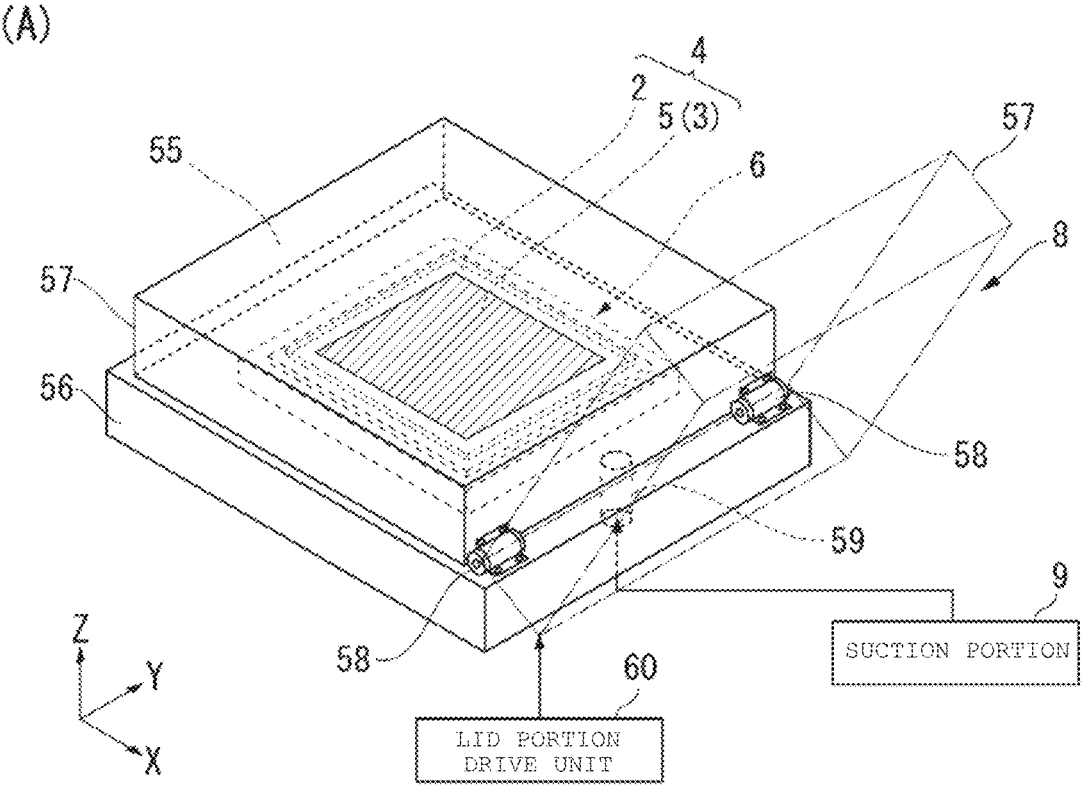
(A)
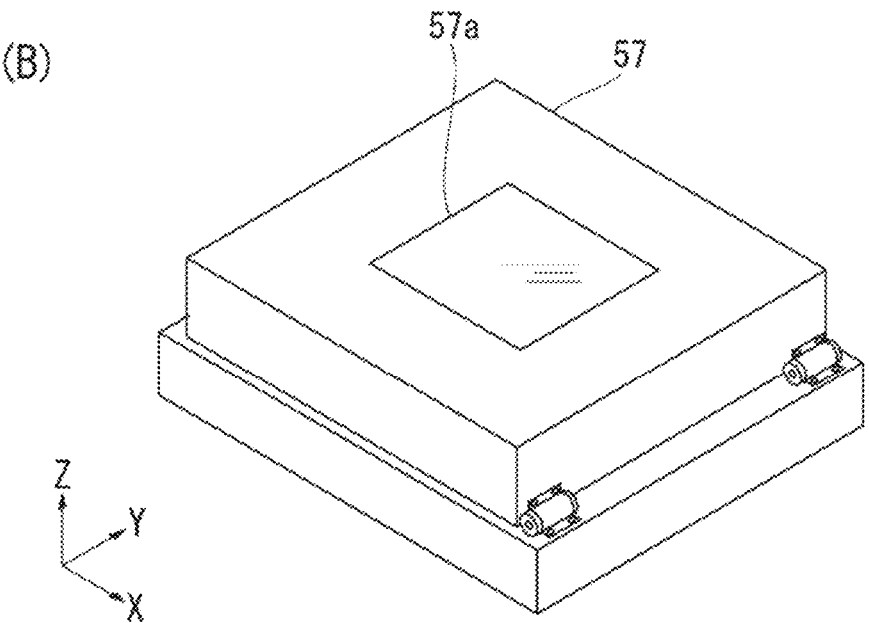
(B)

FIG. 6
(A)
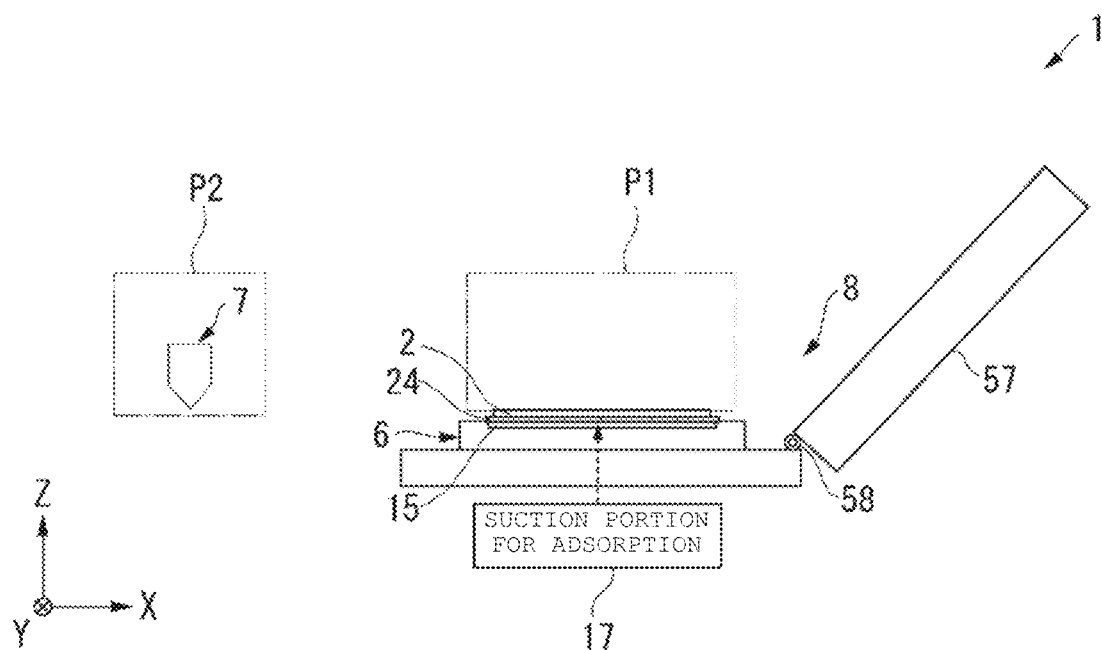
(B)
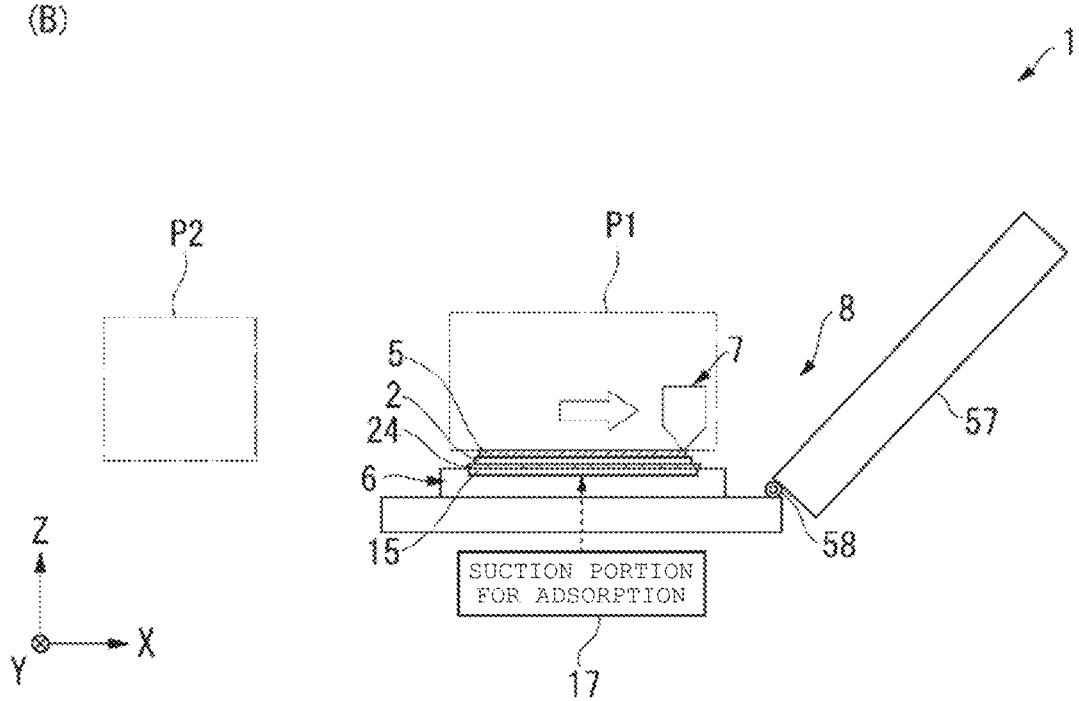

FIG. 7
(A)
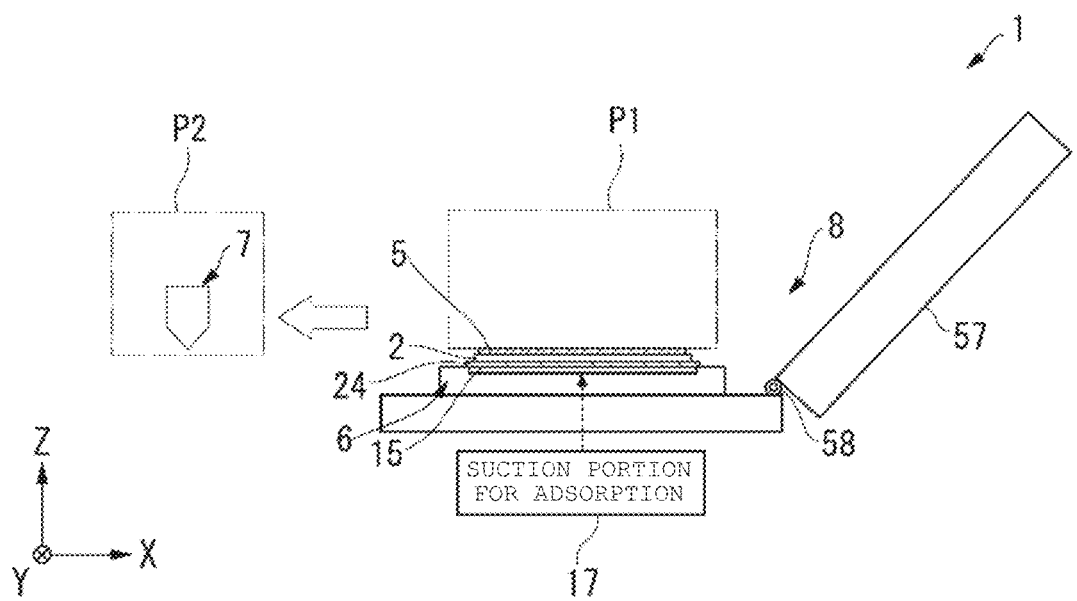
(B)
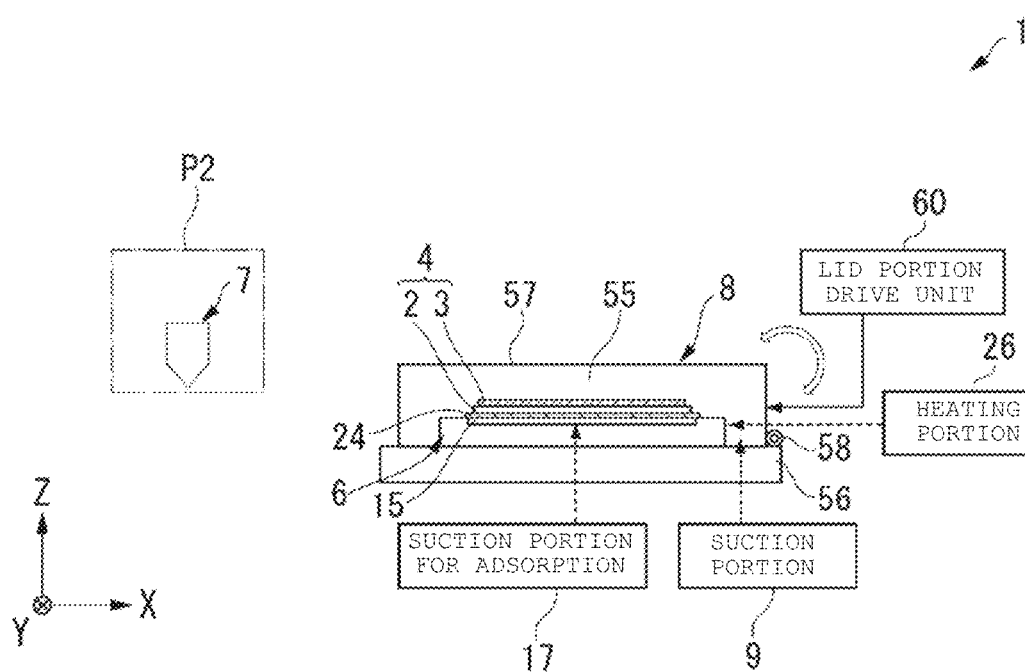

FIG. 12
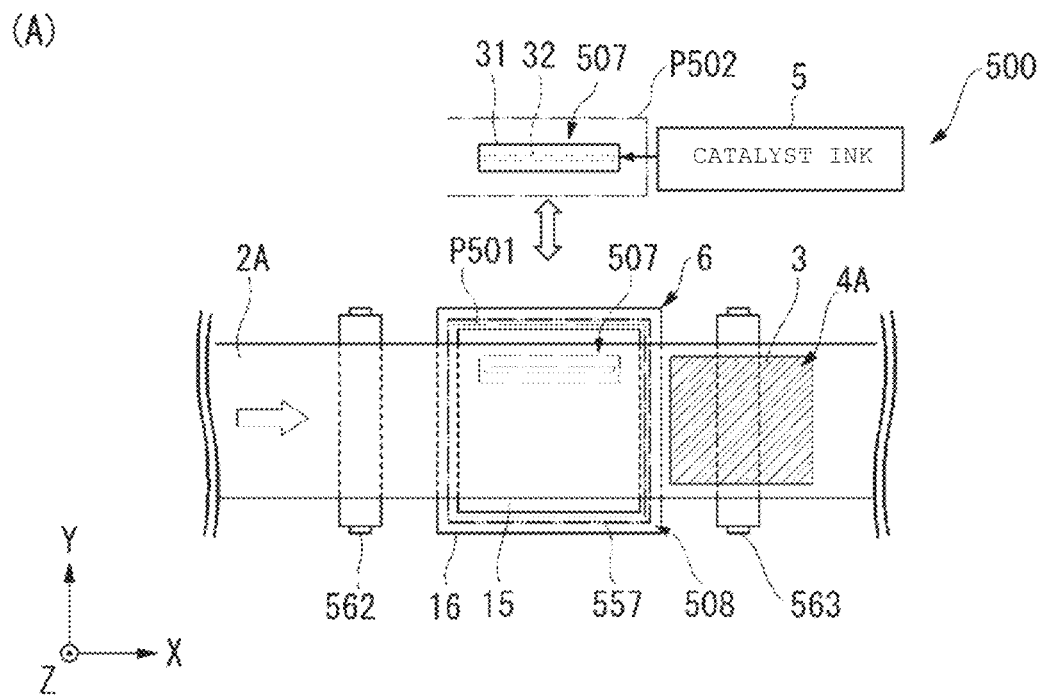
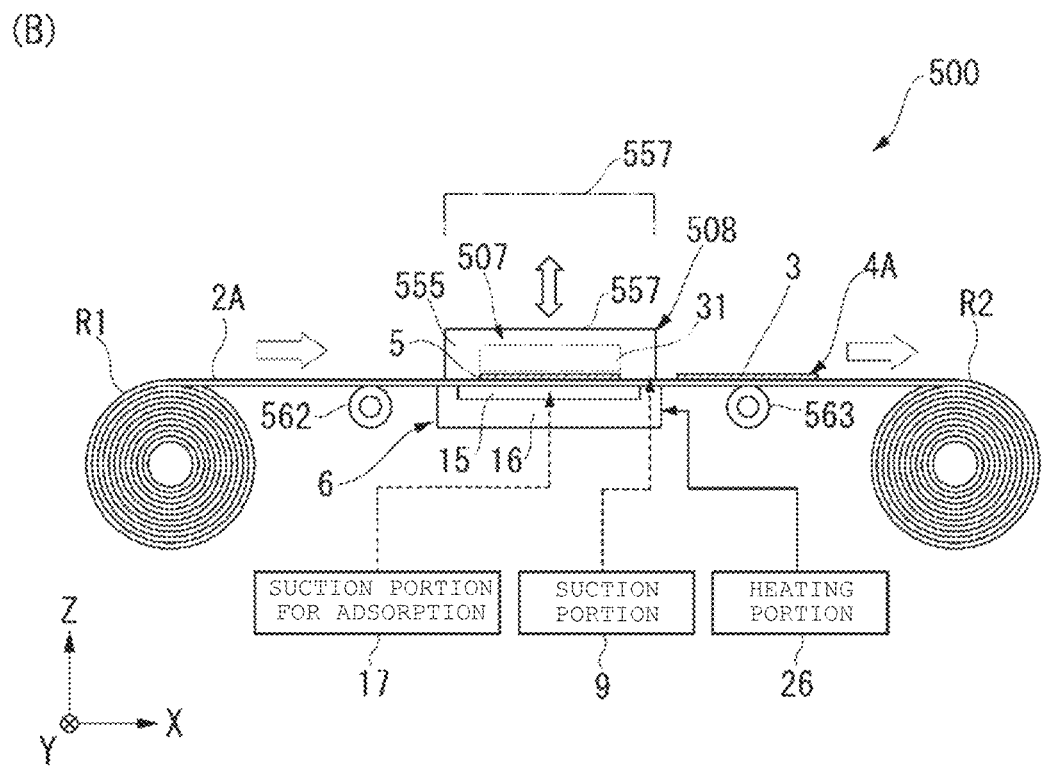

FIG. 14
(A)
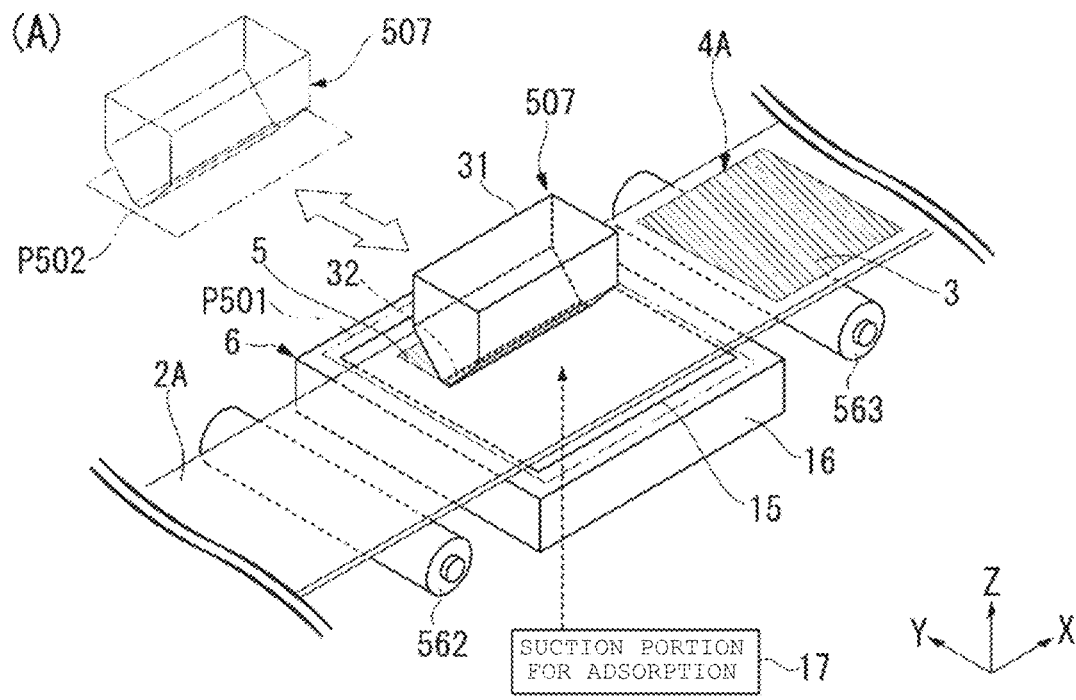
(B)
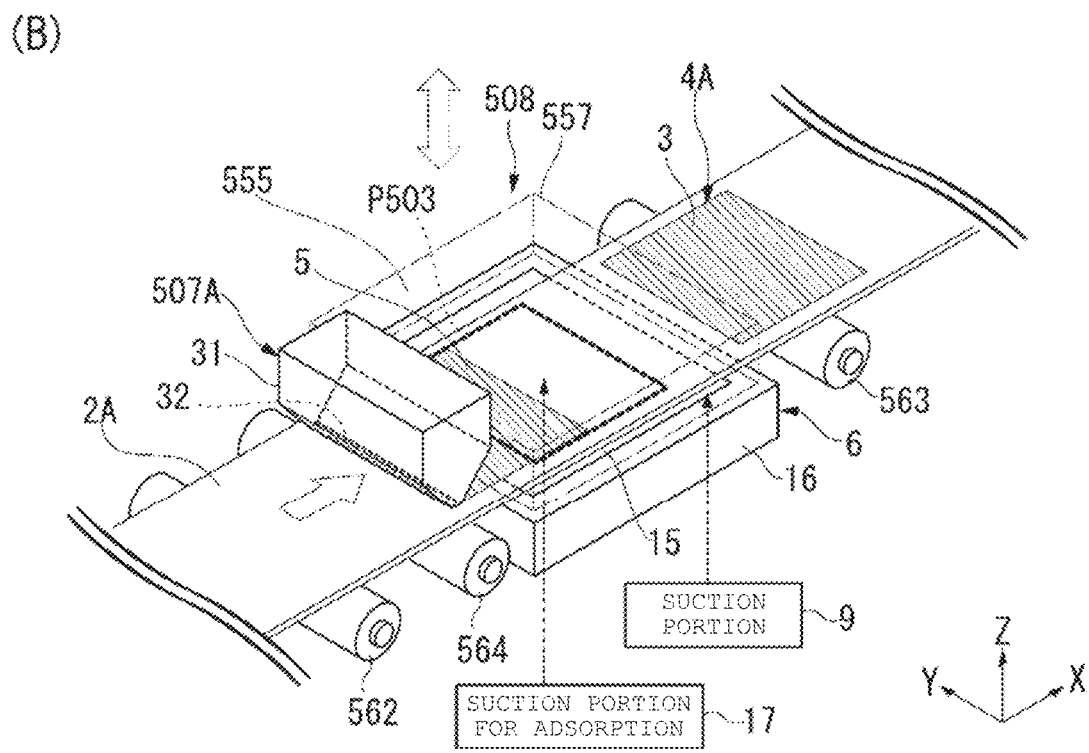

FIG. 15
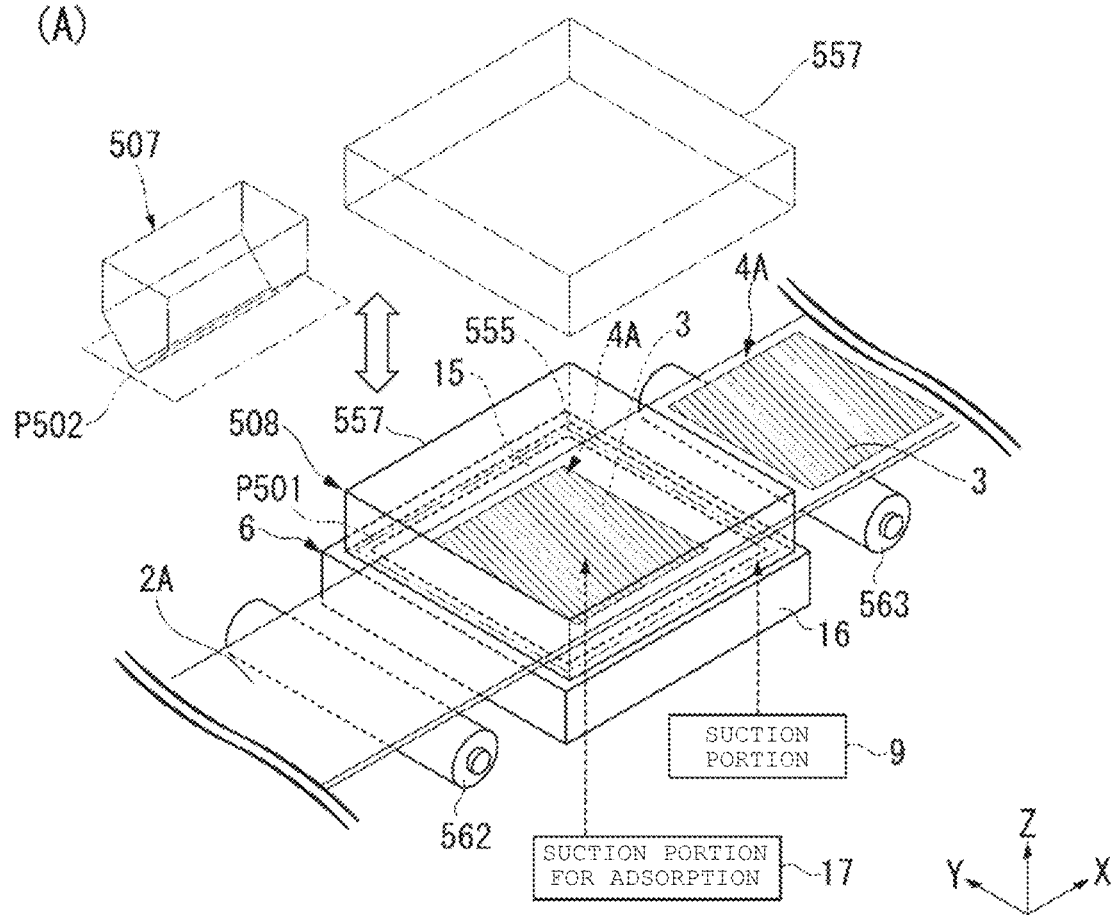
(A)
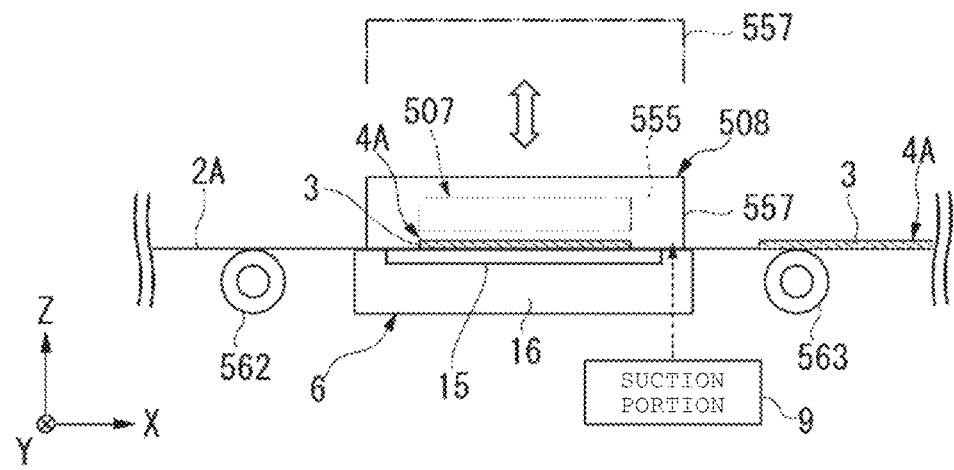
(B)

FIG. 16
(A) 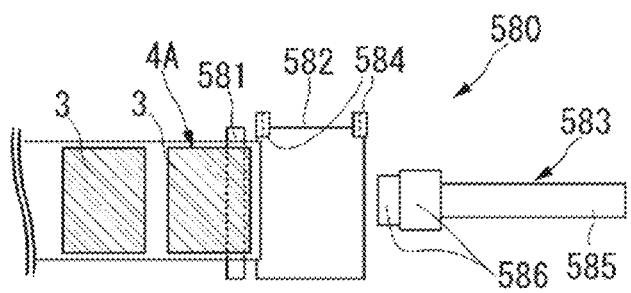 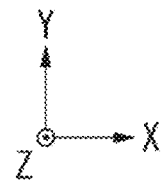
(B) 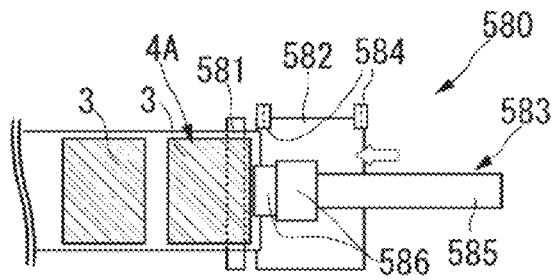 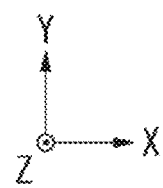
(C) 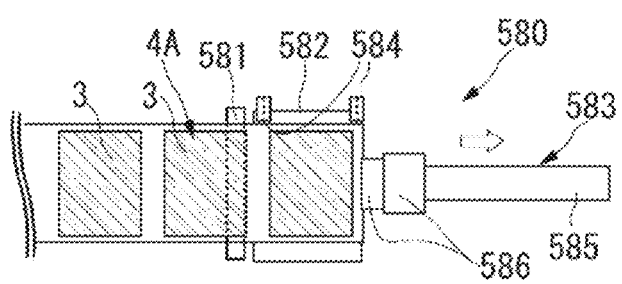 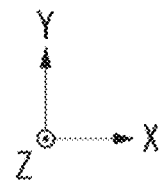
(D) 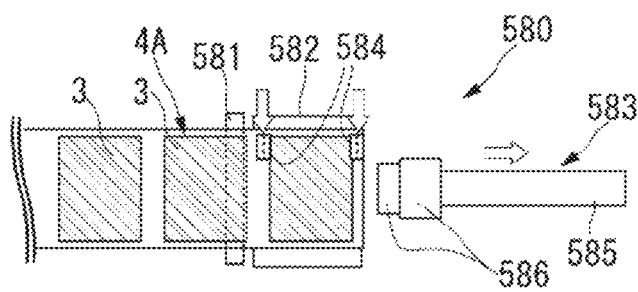 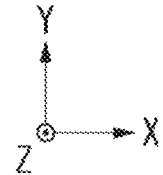
(E) 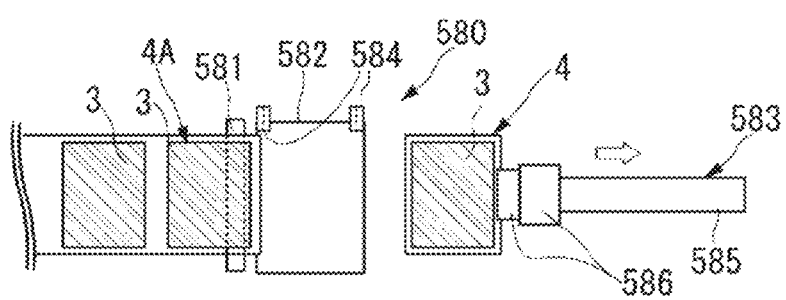 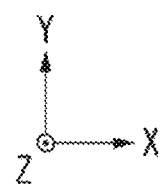

FIG. 17
(A)
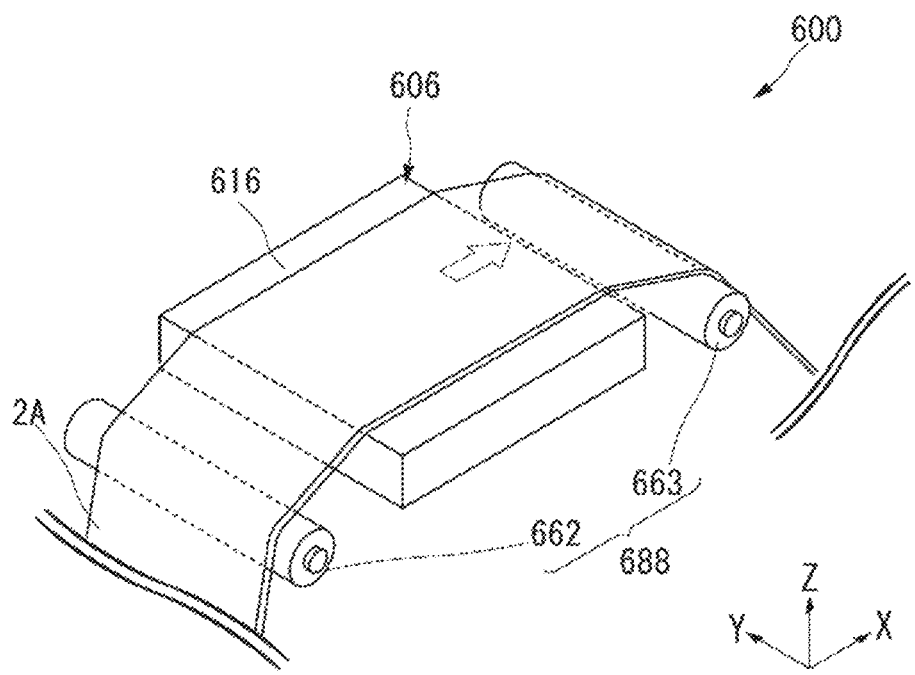
(B)
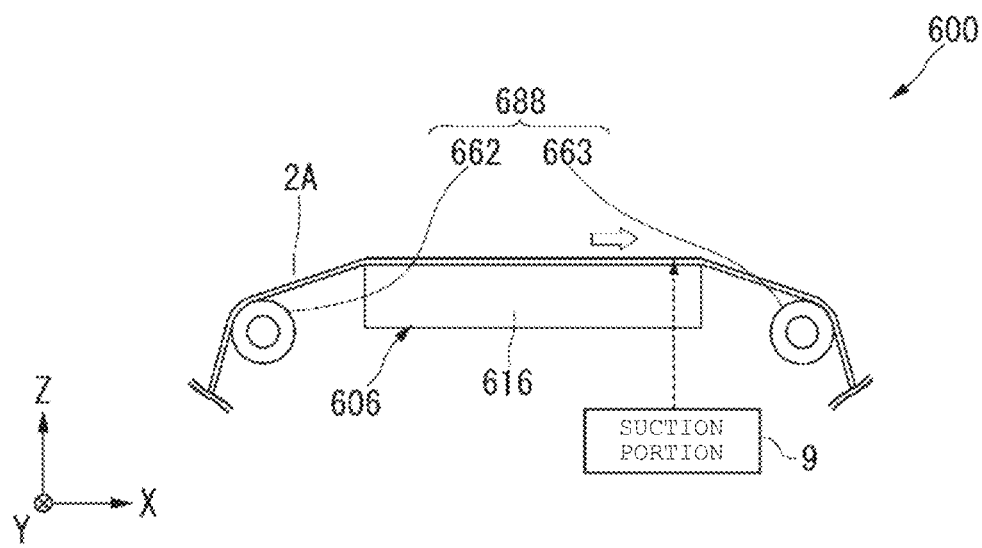

FIG. 18
(A)
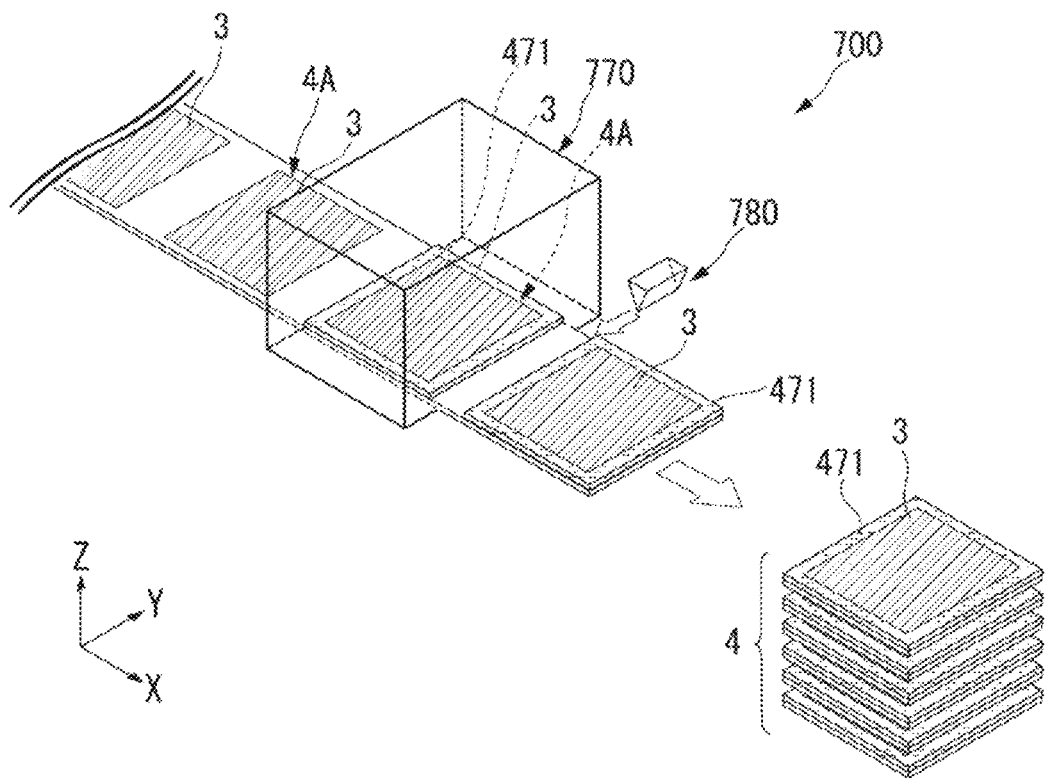
(B)
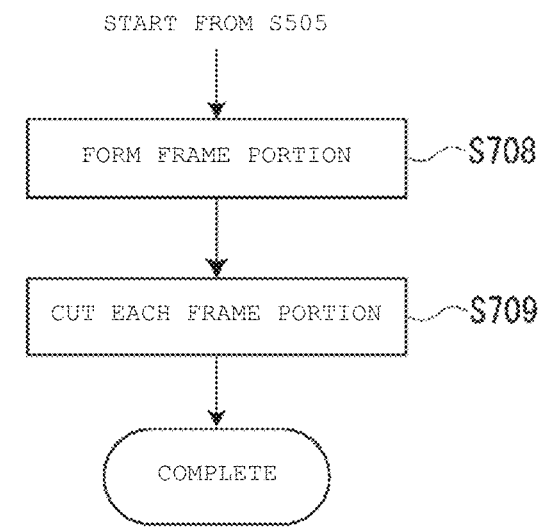

FIG. 19
(A)
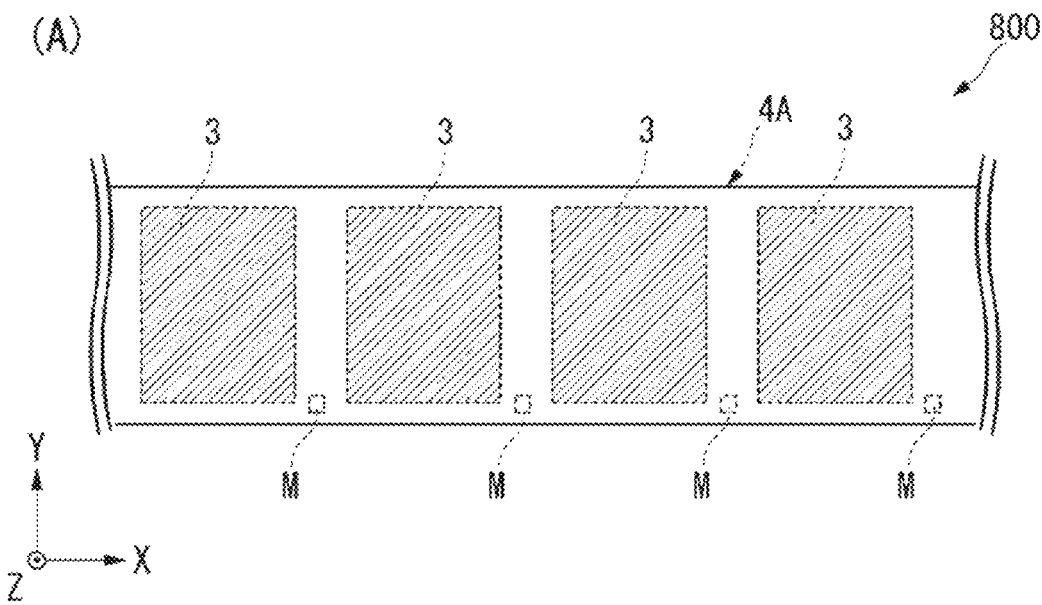
(B)
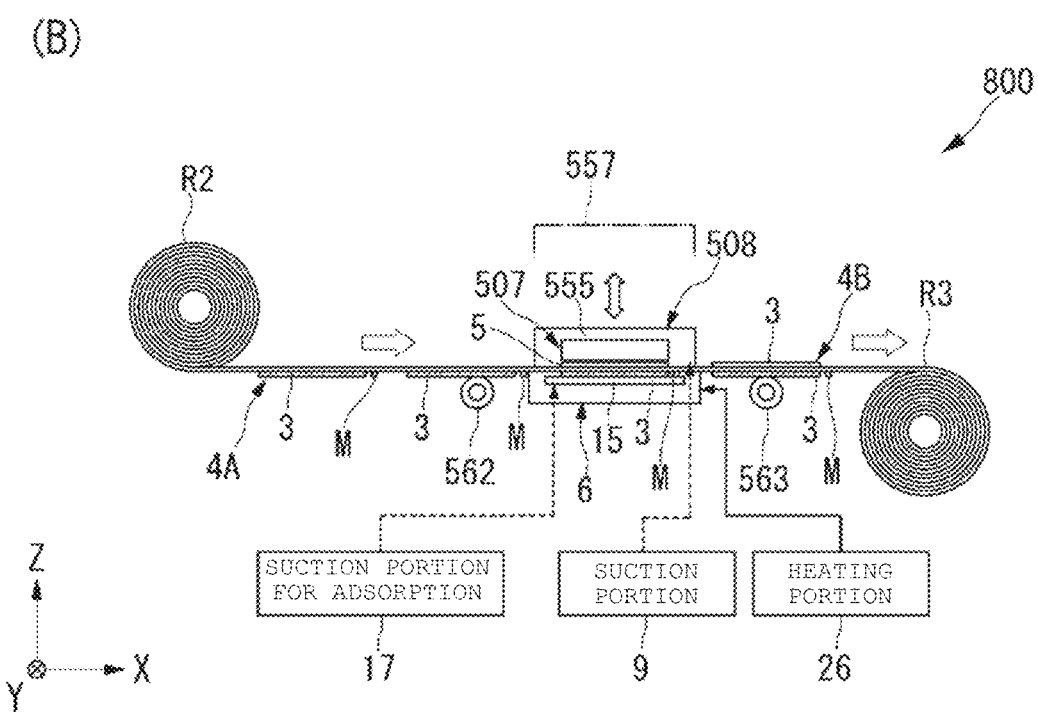

FIG. 20
(A)
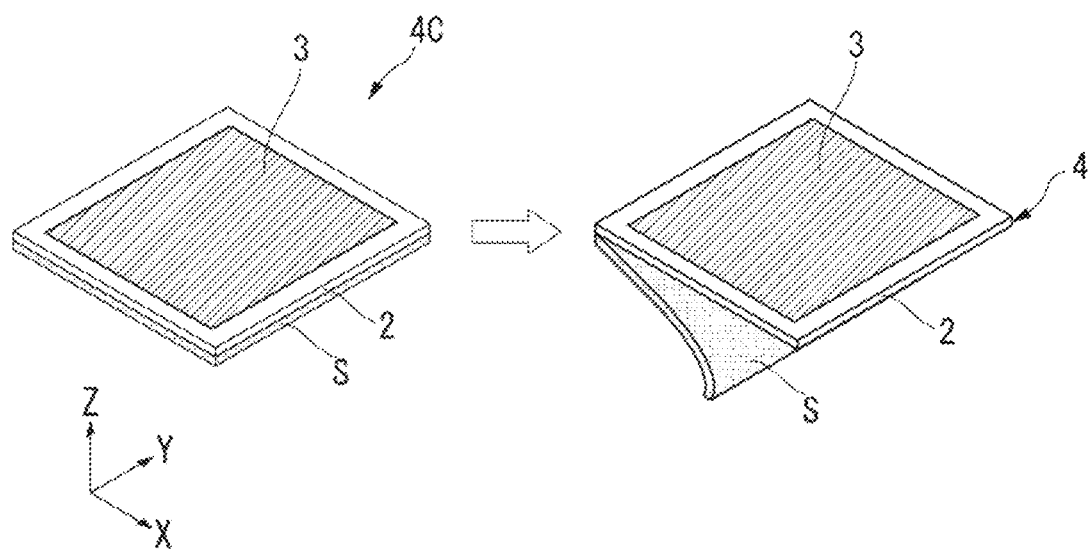
(B)
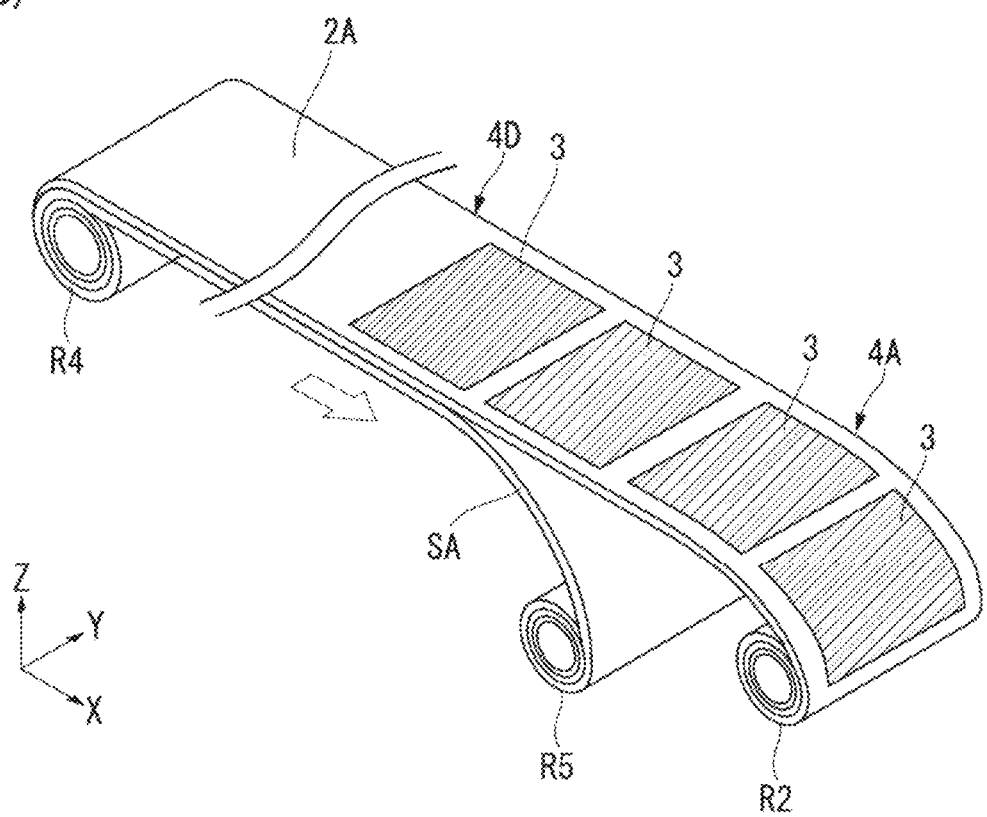

FIG. 21
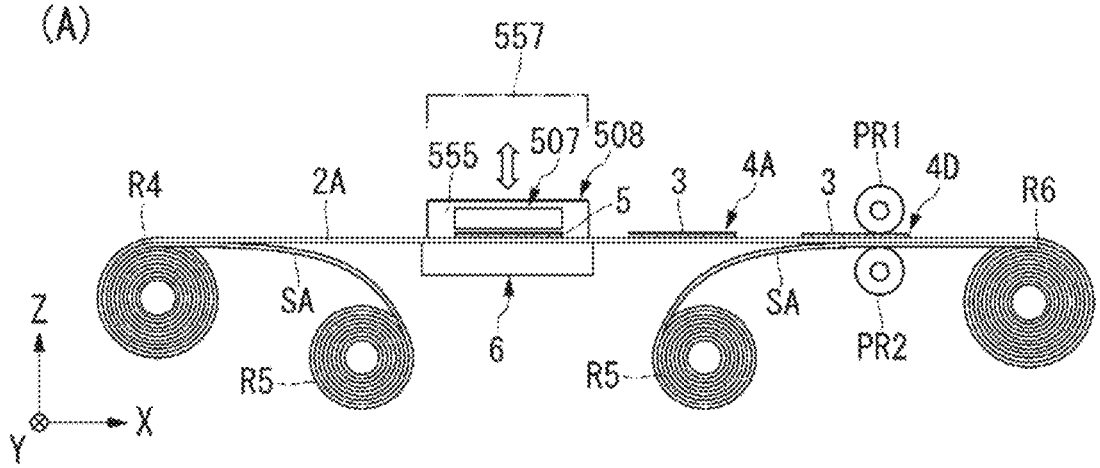
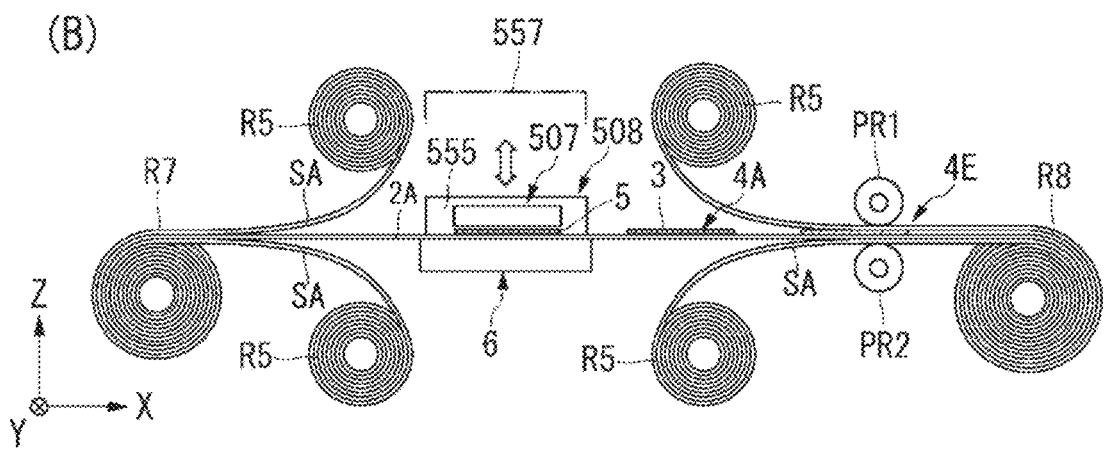
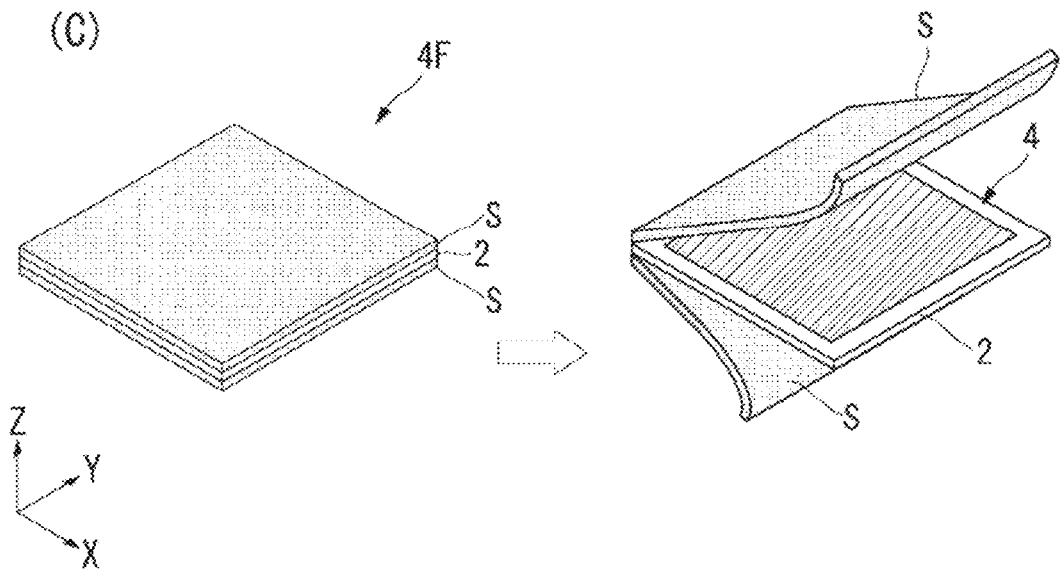

FIG. 22
(A)
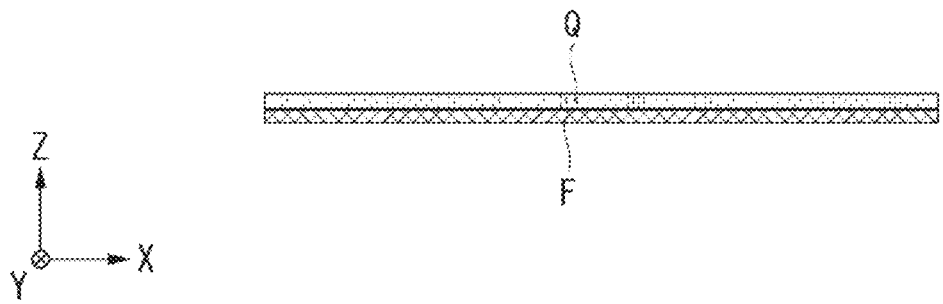
(B)
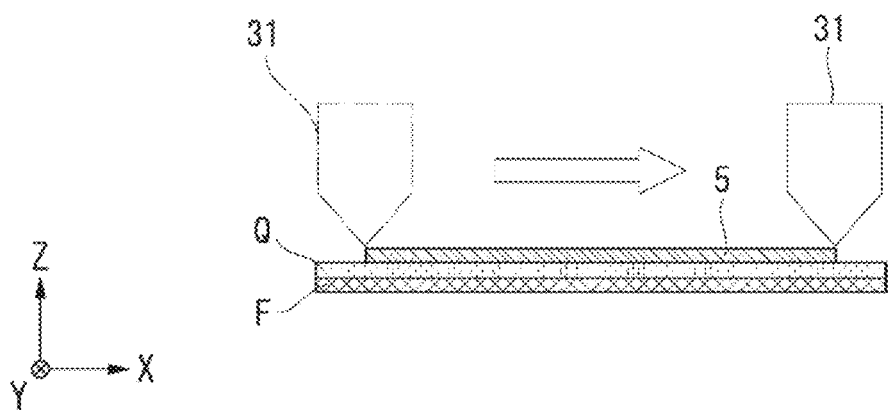
(C)
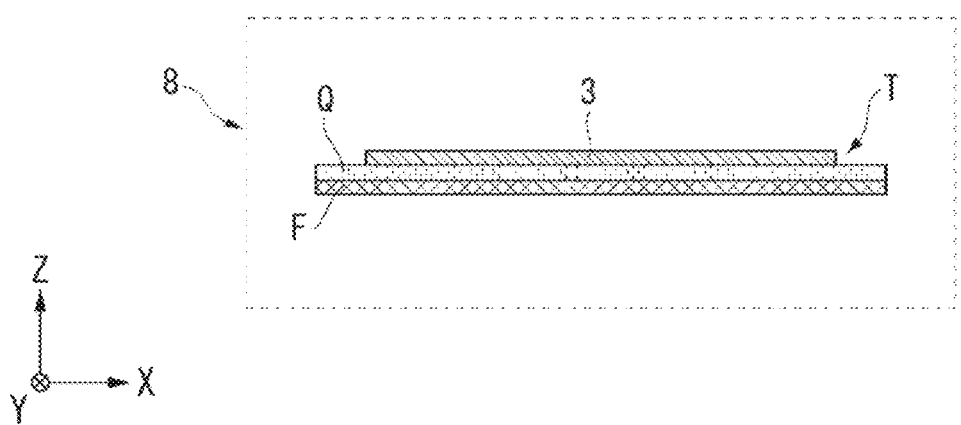

FIG. 23
(A)
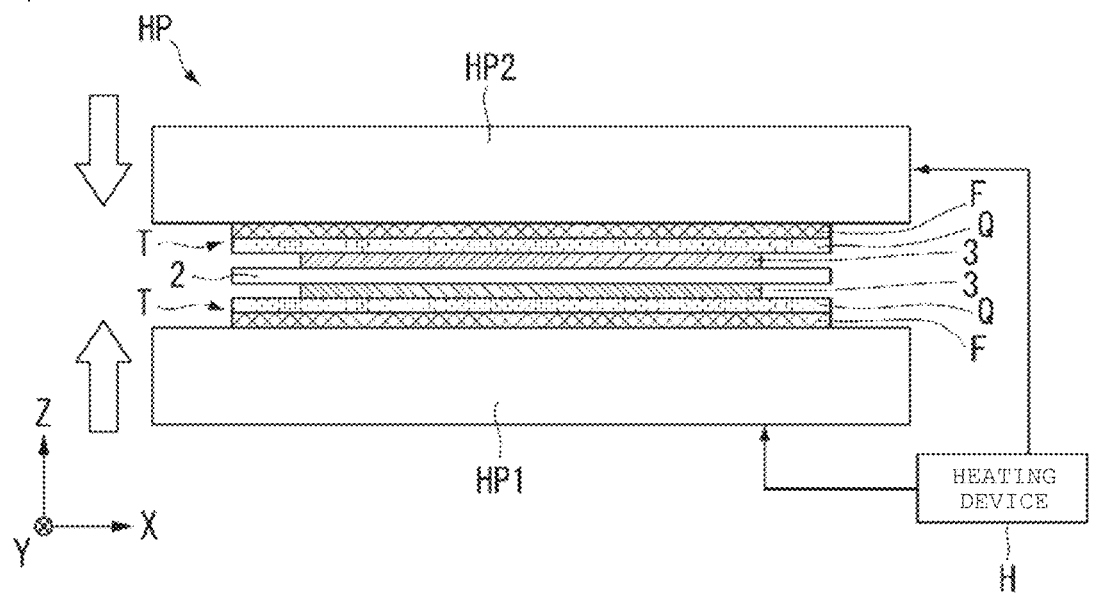
(B)
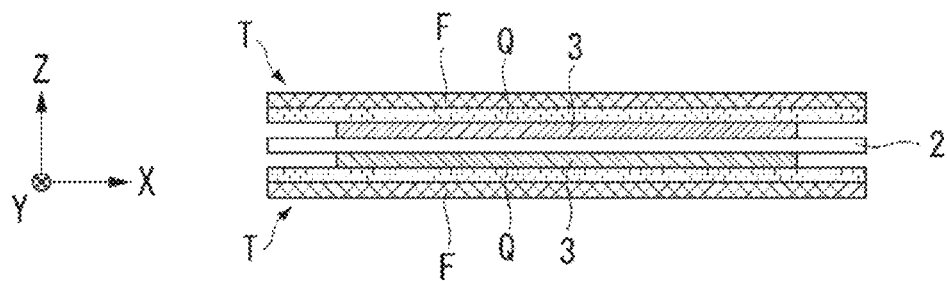
(C)
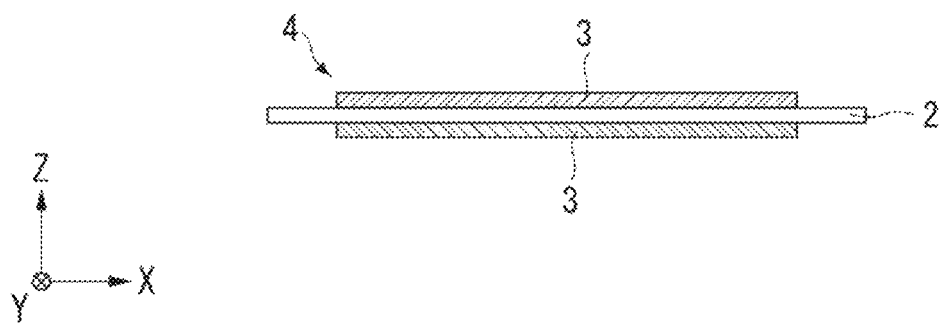

FIG. 24
(A)
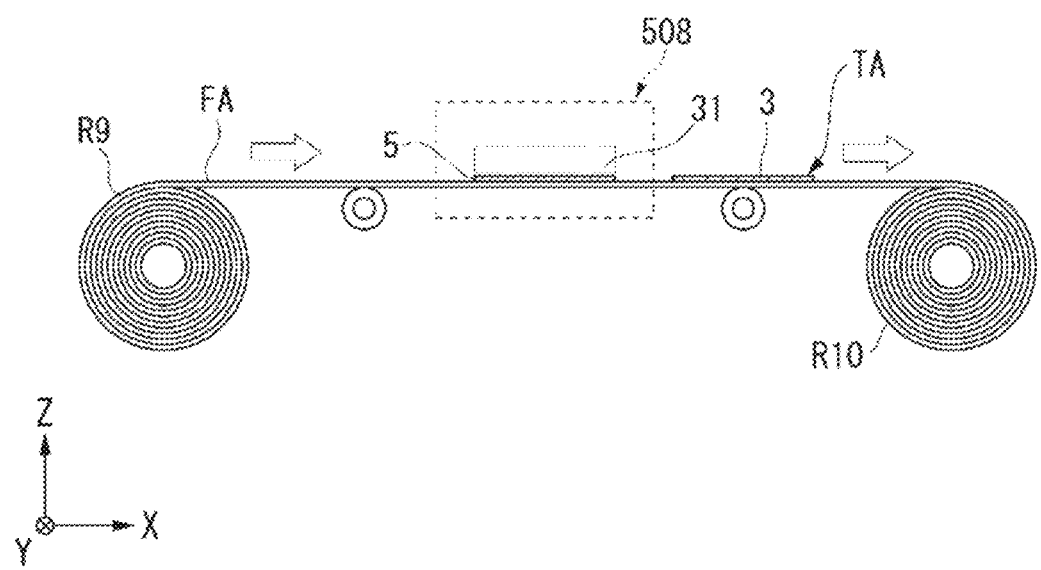
(B)
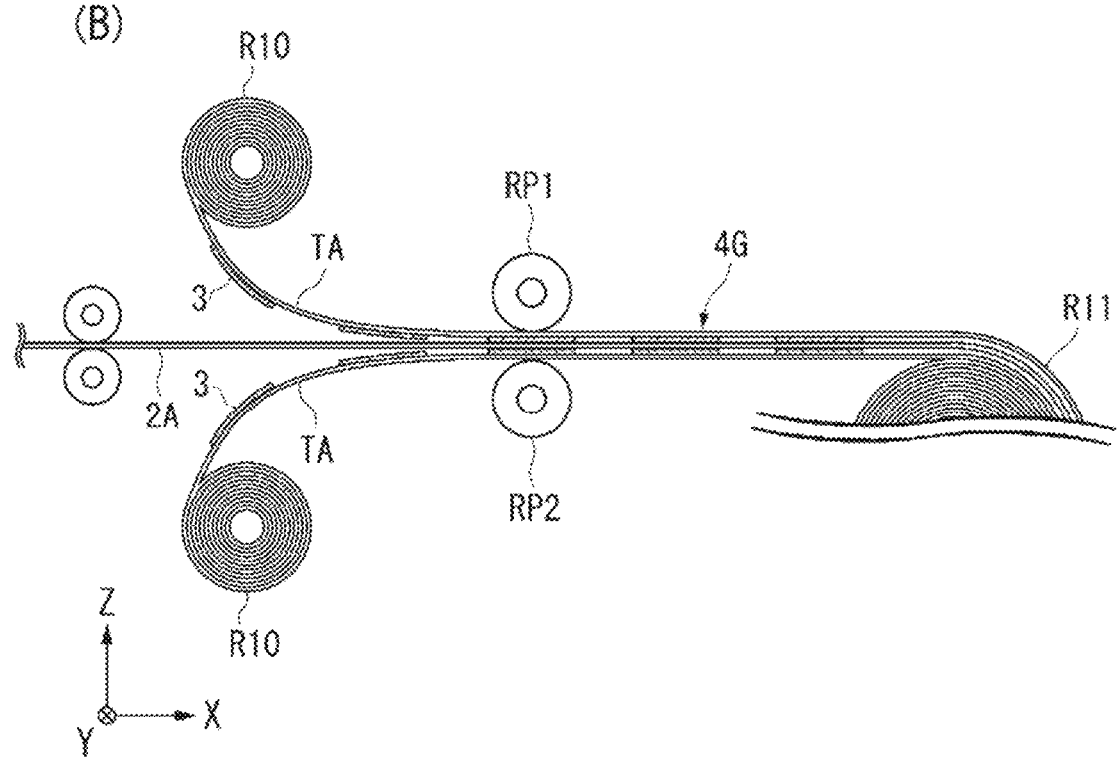

FIG. 25
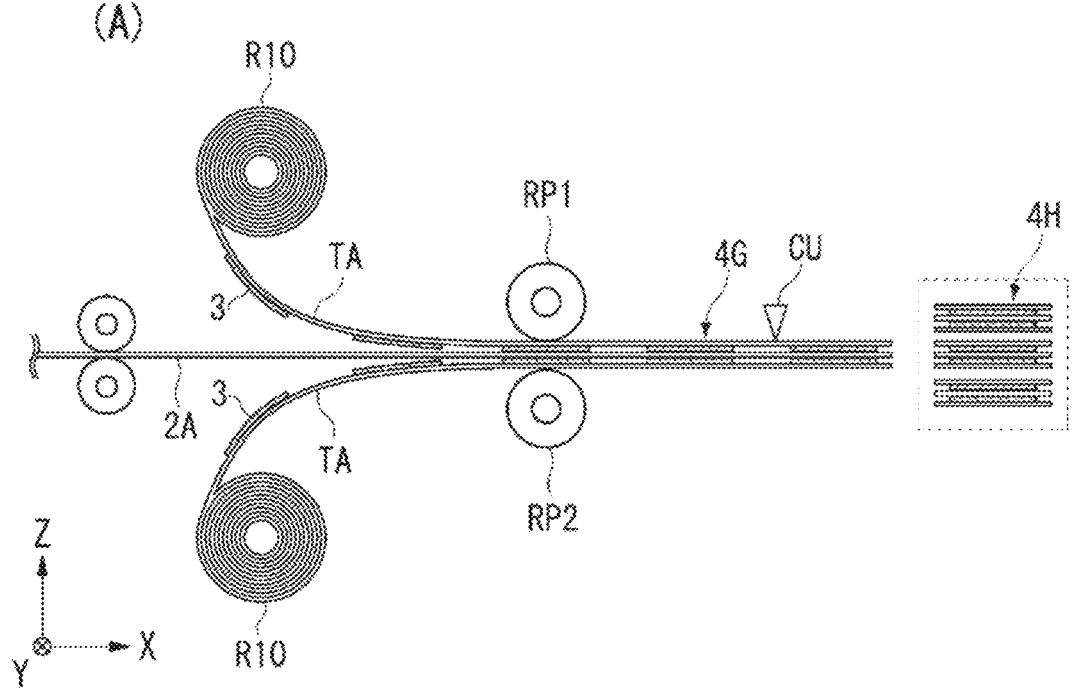
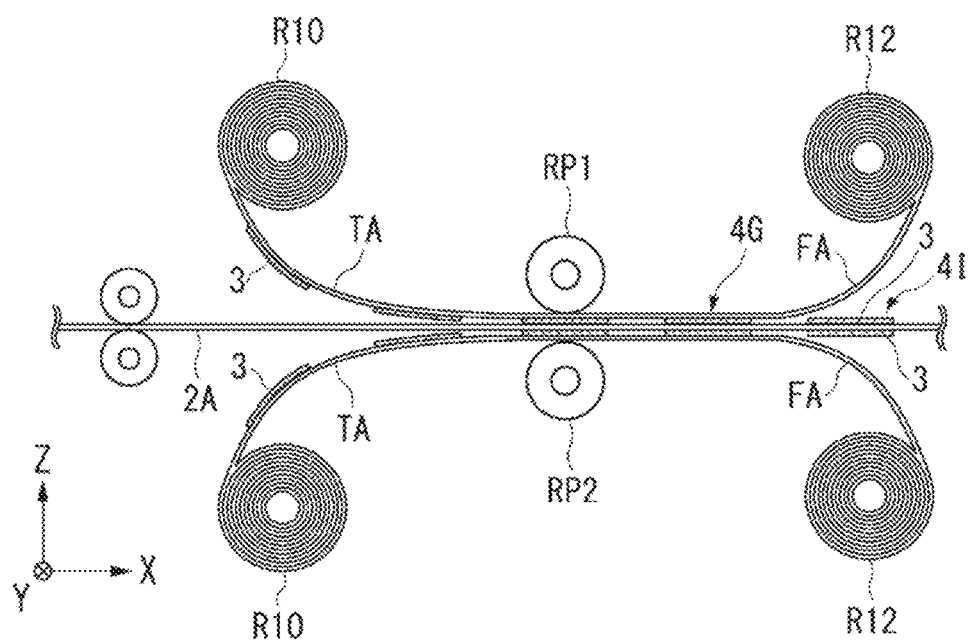

FIG. 26
(A)
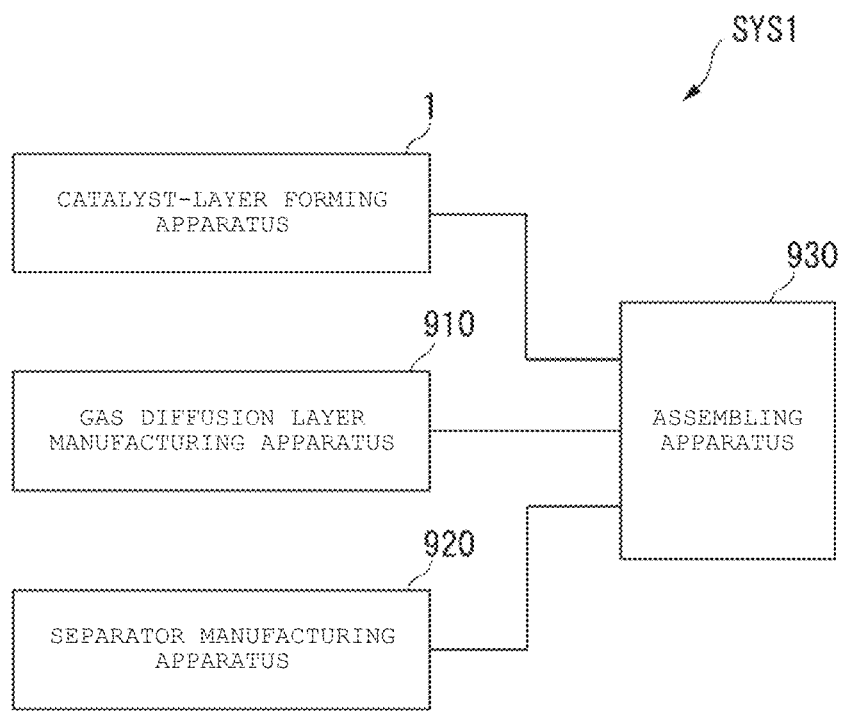
(B)
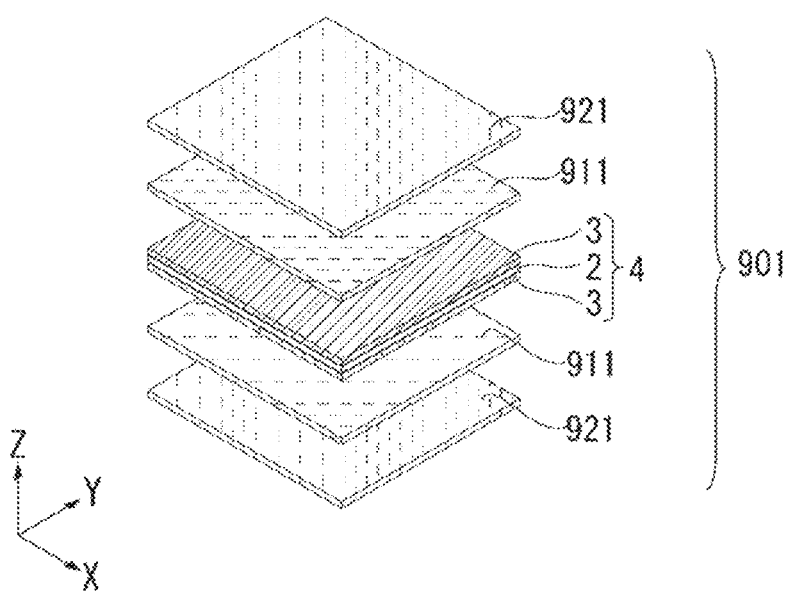

CATALYST-LAYER FORMING APPARATUS

TECHNICAL FIELD

The present invention relates to a catalyst-layer forming apparatus, a catalyst-layer forming method, a catalyst layer, a fuel cell, a fuel-cell manufacturing system, and a fuel-cell manufacturing method.

BACKGROUND ART

A fuel cell is a power generation device that generates electric energy by allowing a fuel such as hydrogen or methanol to electrochemically react with oxygen. Among these fuel cells, for example, a solid polymer fuel cell includes a catalyst layer and an electrolyte film. The catalyst layer is used to perform an electrochemical reaction with a catalyst. In order to improve power generation performance of the fuel cell, it is required to improve the efficiency of the electrochemical reaction, and the catalyst layer is required to have high catalytic activity. The catalyst layer is formed by being laminated to an electrolyte film in a state of being carried on a surface of a carbon carrier, for example. This laminated film is manufactured by, for example, a transfer method (decal method) for transferring a catalyst layer formed on a base material sheet to an electrolyte film (for example, refer to PTL 1 below). Furthermore, the laminated film is manufactured by, for example, a direct applying method for applying a catalyst ink for forming a catalyst layer on an electrolyte film and drying the same (for example, refer to PTL 2 below).

CITATION LIST

Patent Literature

[PTL 1] Japanese Unexamined Patent Application, Publication No. 2010-251012
[PTL 2] Japanese Unexamined Patent Application, Publication No. 2010-033731

SUMMARY OF INVENTION

Technical Problem

In the case of using the transfer method described in PTL 1, it is required to easily and efficiently forma catalyst layer having high catalytic activity. In addition, in the case of using the direct applying method described in PTL 2, there is a problem that when the catalyst ink is applied to the electrolyte film, the electrolyte film absorbs the catalyst ink and swells, and thus deformation such as wrinkles and cracks is generated in the whole portion or a part of the laminated film. For example, in a case where the electrolyte film has high affinity with an alcohol component, if a solvent of the catalyst ink is an aqueous solution containing alcohol, the electrolyte film absorbs the alcohol component and absorbs water, and thus the deformation of the laminated film may be generated. Furthermore, for example, the deformation of the laminated film may be generated by the electrolyte film absorbing moisture in the atmosphere. The use of the laminated film in which wrinkles and deformation are generated is a cause of not only a deterioration of catalytic activity but also breakage of a cell of the fuel cell.

The present invention has been made in view of the above circumstances, and an object thereof is to easily and efficiently form a catalyst layer having high catalytic activity and to easily manufacture a fuel cell having high power generation efficiency.

Solution to Problem

According to a first aspect of the present invention, there is provided an apparatus for forming a catalyst layer for a fuel cell on an application object, the apparatus including: a holding portion that holds the sheet-shaped application object; an application portion that applies a catalyst ink for forming the catalyst layer on at least one surface of the application object held by the holding portion; a chamber portion that is capable of forming a space including the holding portion; and a suction portion that depressurizes the inside of the space formed by the chamber portion so as to dry the catalyst ink.

According to a second aspect of the present invention, there is provided a fuel-cell manufacturing system including the catalyst-layer forming apparatus described above.

According to a third aspect of the present invention, there is provided a method for forming a catalyst layer for a fuel cell on an application object, the method including: holding the sheet-shaped application object by a holding portion; applying a catalyst ink for forming the catalyst layer on at least one surface of the held application object by an application portion; forming a space including the application object to which the catalyst ink is applied by a chamber portion; and depressurizing the inside of the space by the suction portion so as to dry the catalyst ink.

According to a fourth aspect of the present invention, there is provided a catalyst layer formed by the catalyst-layer forming method described above.

According to a fifth aspect of the present invention, there is provided a fuel cell including the catalyst layer described above.

According to a sixth aspect of the present invention, there is provided a fuel-cell manufacturing method including the catalyst-layer forming method described above.

Advantageous Effects of Invention

According to the aspects of the present invention, it is possible to easily and efficiently manufacture the catalyst layer having high catalytic activity. Furthermore, it is possible to easily manufacture a fuel cell having high power generation efficiency.

BRIEF DESCRIPTION OF DRAWINGS

FIG. 3(A) is a view showing an example of a holding portion,
and FIG. 3(B) is a perspective view showing an example of an application portion.
FIG. 4(A) is a perspective view showing an example of a chamber portion,
and FIG. 4(B) is a perspective view showing an example of a lid portion.
FIGS. 6(A) and 6(B) are views for explaining the operation of the catalyst-layer forming apparatus shown in FIG. 1.
FIGS. 7(A) and 7(B) are views for explaining the operation of the catalyst-layer forming apparatus subsequently to FIG. 6.

FIG. 12 shows examples of a catalyst-layer forming apparatus according to a sixth embodiment, in which FIG. 12(A) is a plan view and FIG. 12(B) is a side view.

FIG. 14(A) is a view showing an example of an application portion and a holding portion, and FIG. 14(B) is a view showing another example of the application portion and the holding portion.

FIG. 15 shows examples of the chamber portion, in which FIG. 15(A) is a perspective view and FIG. 15(B) is a side view.

FIGS. 16(A) to 16(E) are views showing the operation of a cutting portion.

FIG. 17 shows examples of a catalyst-layer forming apparatus according to a seventh embodiment, in which FIG. 17(A) is a perspective view showing an example of a holding portion, and FIG. 17(B) is a side view showing an example of the holding portion.

FIG. 18 shows examples of a catalyst-layer forming apparatus according to an eighth embodiment, in which FIG. 18(A) is a view showing an example of a frame-forming portion, and FIG. 18(B) is a flowchart showing an example of the operation.

FIG. 19 shows examples of a catalyst-layer forming apparatus according to a ninth embodiment, in which FIG. 19(A) is an enlarged view of a laminated film for a fuel cell, and FIG. 19(B) is a side view.

FIG. 20(A) is a view showing an example of a laminated film according to a tenth embodiment, and FIG. 20(B) is a view showing the laminated film according to another example.

FIGS. 21(A) to 21(C) are views showing examples of the laminated film according to still another example.

FIG. 22 is a view showing an example of a catalyst layer according to an eleventh embodiment, in which FIG. 22(A) is a view showing an example of a peeling sheet, FIG. 22(B) is a view showing a state in which a catalyst ink is applied to the peeling sheet, and FIG. 22(C) is a view showing a state in which the catalyst ink is dried under reduced pressure.

FIG. 23 is a view showing an example of transferring the catalyst layer of the peeling sheet to an electrolyte film, in which FIG. 23(A) is a view showing a state in which the catalyst layer is pressed against the electrolyte film, FIG. 23(B) is a view showing a state in which the catalyst layer is joined to the electrolyte film, and FIG. 23(C) is a view showing a state in which the peeling sheet is peeled off from the catalyst layer.

FIG. 24 is a view showing an example of a catalyst layer according to a twelfth embodiment, in which FIG. 24(A) is a view showing a state in which the catalyst layer is formed on the elongated peeling sheet, and FIG. 24(B) is a view showing a state in which the catalyst layer is joined to an elongated electrolyte film.

FIGS. 25(A) and 25(B) are views showing another example of a state in which the catalyst layer is joined to the elongated electrolyte film.

FIG. 26(A) is a block diagram showing an example of a fuel-cell manufacturing system according to an embodiment, and FIG. 26(B) is a view showing an example of a cell of a fuel cell.

DESCRIPTION OF EMBODIMENTS

Figure 1:
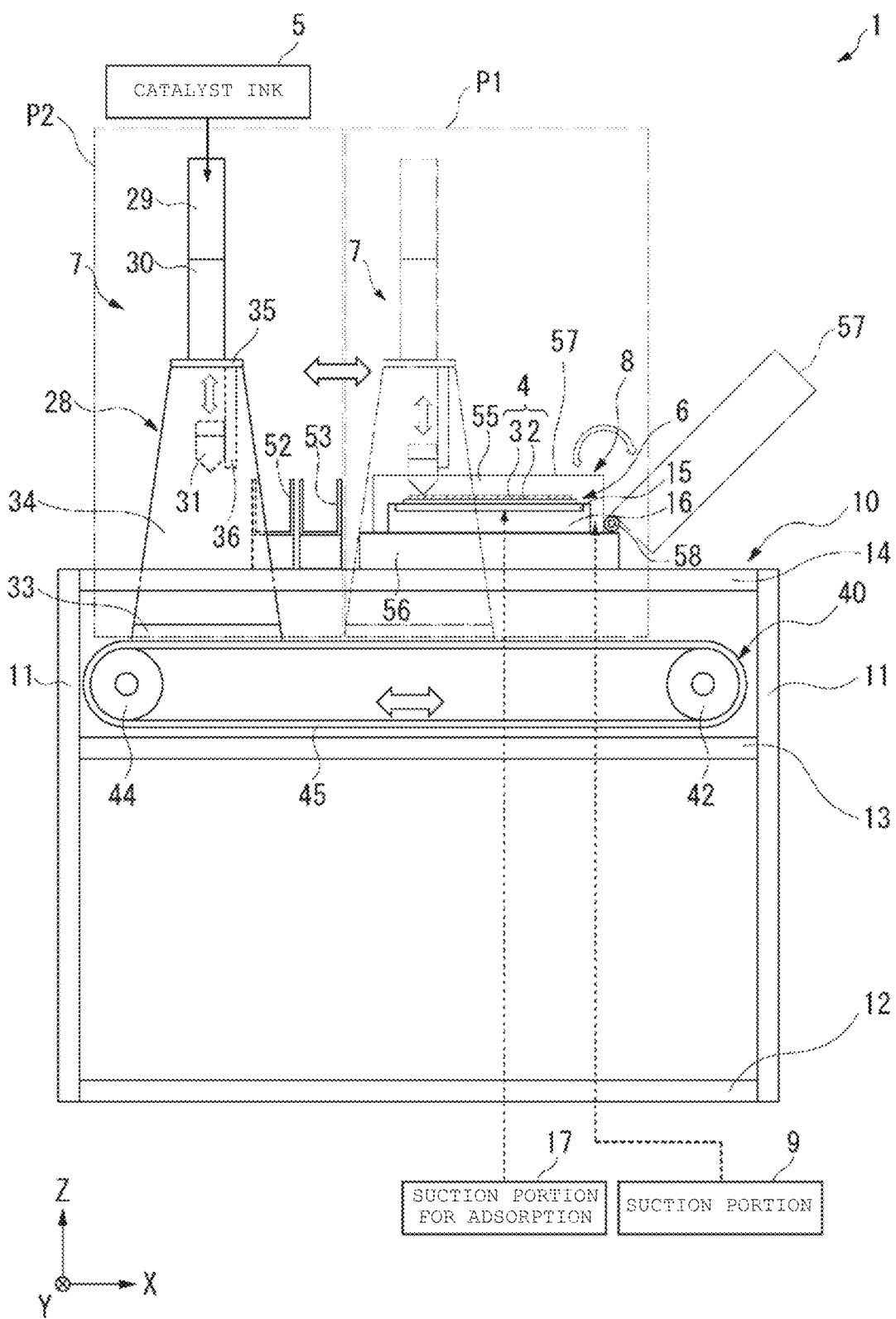
FIG. 1 is a view showing an example of a catalyst-layer forming apparatus according to a first embodiment.

Hereinafter, embodiments of the present invention will be described with reference to the drawings. However, the present invention is not limited thereto. In addition, in order to explain the embodiments in the drawings, the scale is changed appropriately by enlarging or emphasizing parts. In the following drawings, directions in the drawings will be described using an XYZ coordinate system. In this XYZ coordinate system, a plane parallel to a horizontal plane is an XY plane. Any direction parallel to the XY plane is expressed as an X direction, and a direction orthogonal to the X direction is expressed as a Y direction. In addition, a direction perpendicular to the XY plane (vertical direction) is expressed as a Z direction. Each of the X direction, the Y direction, and the Z direction will be explained on the assumption that a direction of an arrow in the drawings is a + direction and a direction opposite to the direction of the arrow is a − direction.

First Embodiment

Figure 2:
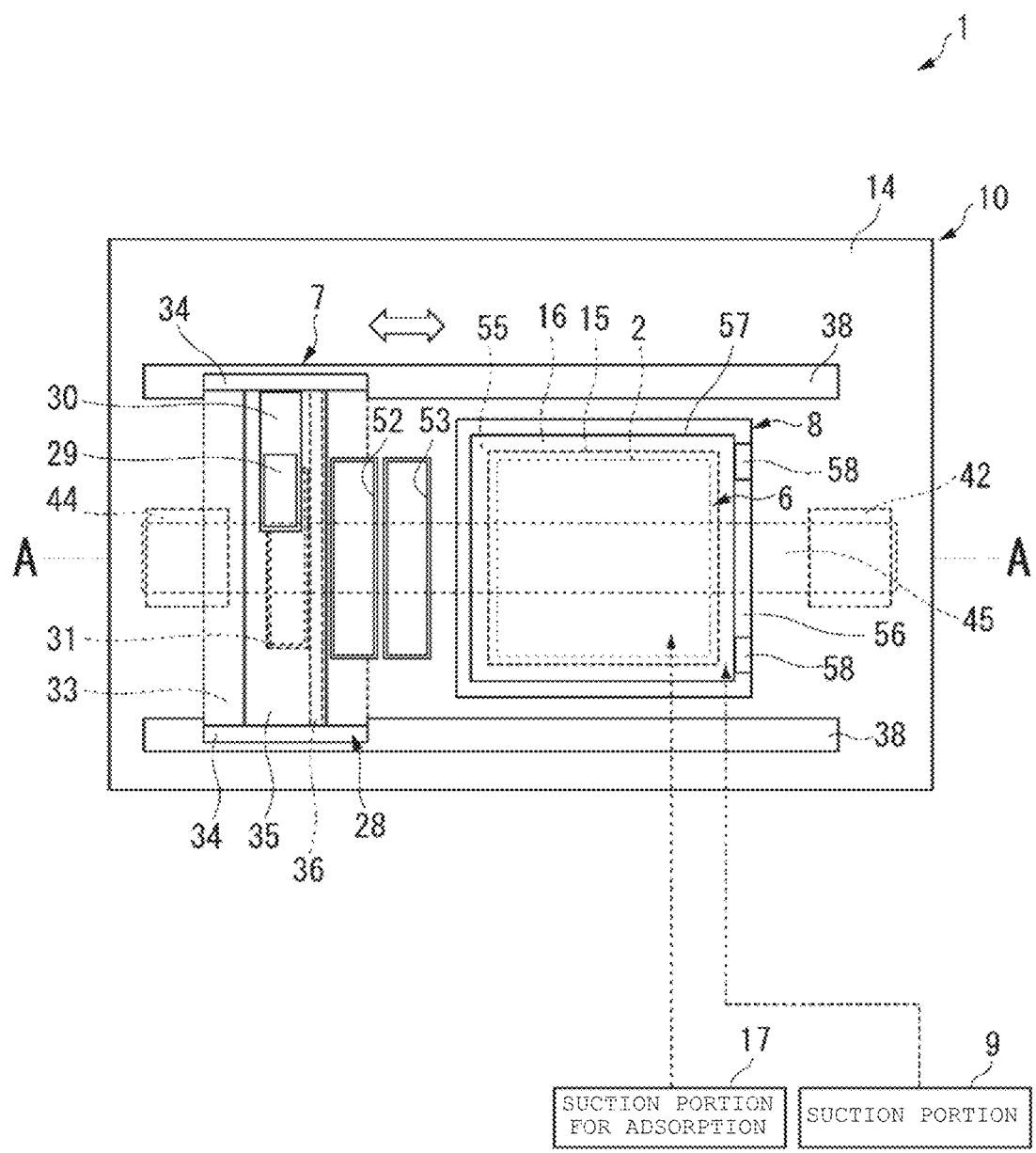
FIG. 2 is a plan view of the catalyst-layer forming apparatus shown in FIG. 1.

A first embodiment will be described with reference to the drawings. FIG. 1 is a view of a catalyst-layer forming apparatus 1 seen from a −Y direction. In the following embodiments, a "catalyst-layer forming apparatus" is referred to as an "apparatus". FIG. 2 is a plan view of the apparatus 1 seen from a +Z direction. The apparatus 1 is an apparatus for manufacturing a laminated film 4 for a fuel cell by forming a catalyst layer 3 on an electrolyte film (application object) 2 (refer to FIG. 1). In each of the following embodiments, a "laminated film for a fuel cell" is referred to as a "laminated film". In the apparatus 1, a catalyst ink 5 for forming the catalyst layer 3 is applied to the electrolyte film 2 and dried, by which the catalyst layer 3 is formed on the electrolyte film 2 and thus the laminated film 4 is manufactured (refer to FIG. 1).

As shown in FIGS. 1 and 2, the apparatus 1 includes a holding portion 6, an application portion 7, a chamber portion 8, and a suction portion 9. In addition, the apparatus 1 may include a control unit (not shown) that comprehensively controls each of the above units. The holding portion 6, the application portion 7, and the chamber portion 8 are supported by a main frame 10. The main frame 10 includes a plurality of support frames 11 in a Z direction, a plurality of horizontal frames 12 and 13 disposed between the support frames 11, and a table 14. However, the main frame 10 is not limited to the drawing, and any shape capable of supporting the holding portion 6 and the like can be applied. Whether or not to support the suction portion 9 on the main frame 10 is arbitrary. A caster or the like may be provided on a lower surface of the main frame 10 so that the apparatus 1 is movable.

The holding portion 6 holds the sheet-shaped electrolyte film 2. The holding portion 6 includes an adsorption portion 15, a base portion 16, and a suction portion 17 for adsorption. The adsorption portion 15 has, for example, an outer shape of a rectangular flat plate shape (in the present specification, a rectangle is used as a meaning including a square) and is supported on an upper side (+Z side) of the base portion 16. As the adsorption portion 15, for example, a porous member made of ceramic, resin, carbon, or the like is used. An outer shape and a size of the adsorption portion 15 are not limited to those shown in the drawings as long as the adsorption portion 15 can hold the sheet-shaped electrolyte film 2 in a spread state, and various shapes and sizes can be applied. The base portion 16 is disposed on a base 56 of the chamber portion 8 described later. For example, a suction pump or the like for generating a predetermined suction power is used as the suction portion 17 for adsorption. The suction portion 17 for adsorption applies a suction power to an upper surface side of the adsorption portion 15 via the base portion 16.

FIG. 3(A) is a view showing an example of the holding portion 6, and is a cross-sectional view taken along a line A-A shown in FIG. 2. For the explanation, FIG. 3(A) shows enlarged characteristic portions. Furthermore, FIG. 3(A) shows application of the catalyst ink 5 by the application portion 7 described later. As shown in FIG. 3(A), the adsorption portion 15 has a plurality of holes 18 penetrating an adsorption surface and a lower surface (surface on a −Z side) by using an upper surface side as the adsorption surface. For example, the adsorption surface of the adsorption portion 15 is disposed substantially horizontally, but the surface is not limited thereto and may be disposed in a state of being inclined in either of the directions. For example, a hole 18 has a hole diameter formed to be about 0.1 μm to several mm, but this hole diameter is not particularly limited thereto. An opening shape of the hole 18 may be any of a circular shape, an elliptical shape, an oval shape, and a polygonal shape.

In addition, the number of the holes 18 per unit area is constantly formed over the entire surface of the adsorption portion 15, but the number of the holes 18 is not limited thereto. For example, the number of the holes 18 per unit area may be increased at a position corresponding to an edge portion of the electrolyte film 2 to be adsorbed, the number of the holes 18 may be decreased at a position corresponding to a central portion of the electrolyte film 2. On the contrary, the number of the holes 18 may be increased at a position corresponding to the central portion of the electrolyte film 2, and the number of the holes 18 may be decreased at a position corresponding to the edge portion of the electrolyte film 2. Furthermore, a plurality of groove portions may be formed in the adsorption surface of the adsorption portion 15, and the holes 18 may be connected to the groove portions.

As shown in FIG. 3(A), the base portion 16 supports the adsorption portion 15 from the upper surface side and forms a space portion 20 on the lower surface side of the adsorption portion 15. The base portion 16 is provided with a connection hole 22 for connecting the space portion 20 and the suction portion 17 for adsorption. The suction portion 17 for adsorption is connected to the connection hole 22 by, for example, a tubular member (not shown) or the like. Accordingly, by driving the suction portion 17 for adsorption, the inside of the space portion 20 is suctioned and depressurized, and an adsorption power is applied to the adsorption surface of the adsorption portion 15 via the holes 18 communicating with the space portion 20. The adsorption power of the adsorption portion 15 is set by driving of the suction portion 17 for adsorption. A magnitude of the adsorption power and a driving timing by the suction portion 17 for adsorption may be controlled by the control unit (not shown) or may be manually operated by an operator. The holes 18 are formed almost all over the adsorption portion 15, and thus it is possible to easily and reliably adsorb the sheet-shaped electrolyte film 2.

A sheet member 24 is disposed on the upper surface of the adsorption portion 15. Therefore, the electrolyte film 2 is adsorbed to the adsorption portion 15 with the sheet member 24 sandwiched therebetween. As the sheet member 24, a member capable of ventilation between front and back surfaces thereof is used. For example, a resinous porous sheet, a paper member such as Japanese Paper, a nonwoven fabric, a membrane filter, or the like is used. The sheet member 24 in which a hole diameter thereof is smaller than a hole diameter of the hole 18 of the adsorption portion 15 is used. The hole diameter of the sheet member 24 means an average hole diameter. By disposing the sheet member 24, it is possible to suppress damage imparted to the electrolyte film 2 due to a suction power in a case of adsorbing the electrolyte film 2. Furthermore, in a case where the sheet member 24 has elasticity, the electrolyte film 2 can be received by elasticity even when the electrolyte film 2 is strongly suctioned, and thus the damage suctioned by the adsorption portion 15 can be further suppressed. Whether or not to dispose the sheet member 24 on the upper surface of the adsorption portion 15 is arbitrary, and the sheet member 24 may not be disposed.

The holding portion 6 includes a heating portion 26 for heating the electrolyte film 2 adsorbed by the adsorption portion 15. As the heating portion 26, for example, a heat source such as an electric heater is used. By driving the heating portion 26, it is possible to heat the electrolyte film 2 at a predetermined temperature via the base portion 16 and the adsorption portion 15. Accordingly, it becomes possible to shorten a drying time of the catalyst ink 5 applied to the electrolyte film 2 by the application portion 7 described later. A heating temperature and a heating timing of the heating portion 26 may be controlled by the control unit (not shown) or may be manually operated by an operator. Examples of the heating timing of the heating portion 26 include a timing at which the catalyst ink 5 is applied to the electrolyte film 2 by the application portion 7 described later, a timing when the catalyst ink 5 is dried under reduced pressure by the chamber portion 8 described later, a timing after the drying under reduced pressure, and the like.

The heating portion 26 is not limited to heating the electrolyte film 2 via the base portion 16 or the like as shown in the drawing, and may be a portion that heats the electrolyte film 2 by radiant heat using far infrared rays or the like. In a case of the heating portion 26 which uses radiant heat, the heating portion 26 which is disposed above the adsorption portion 15, and by which the entire surface of the electrolyte film 2 is irradiated with light having a wavelength in an infrared region is used. Whether or not to provide the heating portion 26 is arbitrary, and the heating portion 26 may not be provided. Furthermore, instead of or in addition to the heating portion 26, the holding portion 6 may include a cooling device.

Based on the above description, the holding portion 6 can hold the electrolyte film 2 in a spread state by suction from the adsorption portion 15. Therefore, even when the electrolyte film 2 is a thin film, even when the catalyst ink 5 is applied by the application portion 7 described later or when the catalyst ink 5 is dried under reduced pressure by the chamber portion 8, it is possible to hold the electrolyte film 2 in a spread state and to prevent uneven application of the catalyst ink 5 and deformation such as wrinkles and cracks in the electrolyte film 2 and the catalyst ink 5.

The holding portion 6 is not limited to holding the electrolyte film 2 by suction from the adsorption portion 15, and any configuration can be applied as long as the portion can hold the electrolyte film 2. For example, the holding portion 6 may hold the electrolyte film 2 by using an electrostatic chuck. In addition, the holding portion 6 may be the portion in which a peelable adhesive or an adhesive tape is disposed, and which holds the electrolyte film 2 by this adhesive action. In addition, the holding portion 6 may be the portion that holds the electrolyte film 2 by combining two or more of suction, electrostatic chuck, adhesive, and the like.

Returning to FIGS. 1 and 2, the application portion 7 applies the catalyst ink 5 for forming the catalyst layer 3 on at least one side of the electrolyte film 2 held by the holding portion 6. As shown in FIG. 1, the application portion 7 is a slit coater having a carriage 28, a tank 29, a pump 30, and a nozzle 31. The carriage 28 has a lower plate 33 having a shape of a rectangular plate disposed in a horizontal direction, two vertical plates 34 standing from the ±Y sides of the lower plate 33, an upper plate 35 disposed between upper ends of the two vertical plates 34, and a nozzle support plate 36 extending downwardly from the upper plate 35.

The lower plate 33 is disposed below the table 14 of the main frame 10. Each of the two vertical plates 34 is disposed so that an upper part thereof is positioned on an upper part of the table 14 while being in a state of penetrating through two openings 38 (refer to FIG. 2) formed on the table 14 in the X direction. The upper plate 35 supports the tank 29 and the pump 30. The nozzle support plate 36 supports the nozzle 31. The tank 29 is provided on an upper part of the pump 30 and stores the catalyst ink 5. The tank 29 is temporarily used for the storage when the catalyst ink 5 is supplied to the nozzle 31. In regard to the supply of the catalyst ink 5 to the tank 29, the catalyst ink 5 is supplied to the tank 29 from an ink storage container or the like disposed outside the main frame 10 or the like via a tube (not shown) or the like. In addition, the tank 29 may include a temperature adjustment mechanism for adjusting a temperature of the stored catalyst ink 5.

The tank 29 and the nozzle 31 are connected by a tube (not shown) or the like. The pump 30 supplies the catalyst ink 5 stored in the tank 29 to the nozzle 31 via a tube or the like. As the pump 30, any pump capable of sending the catalyst ink 5, such as a rotary pump, can be used. An amount of the catalyst ink 5 supplied to the nozzle 31 is controlled by, for example, the control unit (not shown). The arrangement of the tank 29 and the pump 30 is merely an example, and is not limited to the illustrated embodiment. Furthermore, the tank 29 and the pump 30 are not limited to being disposed in the carriage 28. For example, the tank 29 and the pump 30 may be disposed in portions other than the carriage 28, and the catalyst ink 5 may be supplied from the tank 29 to the nozzle 31 via a tube or the like.

The nozzle 31 ejects the catalyst ink 5. The nozzle 31 is attached so as to be movable in the vertical direction (Z direction) by a guide (not shown) provided on the nozzle support plate 36, and is movable in the Z direction by a drive device (not shown). Accordingly, when applying the catalyst ink 5, a gap between the nozzle 31 and the electrolyte film 2 can be adjusted. The application portion 7 may include a sensor capable of measuring a distance between the electrolyte film 2 and the nozzle 31. As this sensor, either a non-contact type sensor such as an optical type, or a contact type sensor using a probe or the like may be used. The movement of the nozzle 31 in the Z direction is controlled by, for example, the control unit (not shown). The nozzle 31 includes a storage portion (not shown) for storing the catalyst ink 5 sent from the tank 29 and a discharge port 32 for discharging the catalyst ink 5 in the storage portion.

The discharge port 32 is formed at a lower end (end on the −Z side) of the nozzle 31 so as to face the electrolyte film 2. The discharge port 32 is formed in a slit shape extending in the Y direction. A width (length in the X direction) of the discharge port 32 is set according to viscosity and a discharge amount of the catalyst ink 5. The length of the discharge port 32 in the Y direction is set according to a width of the catalyst ink 5 applied to the electrolyte film 2. The nozzle 31 may include the temperature adjustment mechanism for adjusting a temperature of the catalyst ink 5. Furthermore, the nozzle 31 may be formed detachably on the nozzle support plate 36 so as to be exchangeable. In addition, a part of the discharge port 32 among parts of the nozzle 31 may be formed detachably so as to be exchangeable.

The application portion 7 is formed to be movable in the X direction by an application portion drive unit 40. The application portion drive unit 40 includes a driving roller 42 and a driven roller 44 disposed to be separated in the X direction, and a belt 45 extended over the driving roller 42 and the driven roller 44. The driving roller 42 is disposed on a +X side on the horizontal frame 13, and is driven by the drive device (not shown). The driven roller 44 is disposed on a −X side on the horizontal frame 13. The belt 45 is made of stainless steel, resin, or cloth, and the lower plate 33 of the carriage 28 is fixed to a surface on the +Z side.

By driving the driving roller 42 to move the belt 45, the carriage 28 moves in the X direction. Furthermore, by stopping the driving of the driving roller 42, the carriage 28 can be disposed at an arbitrary position in the X direction. The application portion drive unit 40 is not limited to the configuration using the above-described belt 45 and the like, and for example, a ball screw mechanism or a rack-and-pinion mechanism may be used. Furthermore, the application portion 7 is not limited to the portion that moves in the X direction with the carriage 28. For example, a configuration in which the nozzle 31 is held by a robot arm, a manipulator, or the like, and thus the nozzle 31 moves in the X direction, the Z direction, or the like by driving the robot arm or the like, may be used.

A movement position and a stop position of the application portion 7 may be controlled by the control portion (not shown) or may be manually operated by an operator. As shown in FIG. 1, by moving in the X direction, the application portion 7 is movable between a facing position P1 where the catalyst ink 5 can be applied to the electrolyte film 2, and a retreat position P2 from which the application portion retreats to the outside of the chamber portion 8 described later. The retreat position P2 is set according to a size of the chamber portion 8 so as not to interfere with the chamber portion 8. The retreat position P2 is not limited to the position shown in the drawing and can be set at an arbitrary position outside the chamber portion 8.

FIG. 3(B) shows an example in which the application portion 7 applies the catalyst ink 5. As shown in FIG. 3(B), in the facing position P1, the application portion 7 moves in the X direction relative to the electrolyte film 2 held by the holding portion 6, and at this time, the catalyst ink 5 is discharged onto the electrolyte film 2 from the discharge port 32 of the nozzle 31. At this time, since the electrolyte film 2 is held in a state spread by the adsorption portion 15 of the holding portion 6 as described above, it is possible to uniformly apply the catalyst ink 5 on the electrolyte film 2 (refer to FIG. 3(A)). When discharging the catalyst ink 5 from the discharge port 32 onto the electrolyte film 2, a height (position in the Z direction) of the nozzle 31 is adjusted to a position suitable for applying the ink.

When applying the catalyst ink 5, the nozzle 31 (the application portion 7) is not limited to move in the X direction. For example, the nozzle 31 may be fixed and the holding portion 6 may be moved in the X direction to apply the catalyst ink 5, or the nozzle 31 and the holding portion 6 may be respectively moved in directions opposite to each other in the X direction to apply the catalyst ink 5. Humidity when applying the catalyst ink 5 is arbitrary, but the humidity is generally set to 20% or more. Accordingly, the catalyst ink 5 can be uniformly applied onto the electrolyte film 2, and drying of the discharge port 32 of the nozzle 31 can be suppressed.

Returning to FIGS. 1 and 2, the application portion 7 includes a nozzle immersion portion 52 and a preliminary discharge portion 53 for maintaining the nozzle 31. The nozzle immersion portion 52 and the preliminary discharge portion 53 are disposed side by side in the X direction on the −X side of the holding portion 6 and installed so as not to interfere with the chamber portion 8. The nozzle immersion portion 52 and the preliminary discharge portion 53 are disposed such that the nozzles 31 of the application portion 7 at the retreat position P2 can be connected to each portion.

The nozzle immersion portion 52 includes a container which is open in the +Z direction, and a tip portion of the nozzle 31 is formed so as to be insertable from the +Z direction. In the container, for example, the catalyst ink 5, a solution for forming the catalyst ink 5, and the like are stored. While the catalyst ink 5 is not applied to the electrolyte film 2, the tip portion of the nozzle 31 is immersed in the solution or the like of the nozzle immersion portion 52, by which it is possible to prevent drying of the discharge port 32 of the nozzle 31 and to clean the nozzle 31.

The preliminary discharge portion 53 is provided for preliminary discharging of the catalyst ink 5 by the nozzle 31. The preliminary discharge portion 53 is, for example, a container which is open in the +Z direction, and the tip portion of the nozzle 31 is formed so as to be insertable from the +Z direction. A discharge receiving surface for preliminarily discharging the catalyst ink 5 may be formed in the container. Initial discharge of the catalyst ink 5 by the nozzle 31 may cause variations in discharge amount. Prior to application to the electrolyte film 2, the preliminary discharge of the nozzle 31 is performed by the preliminary discharge portion 53, by which a discharge amount of the catalyst ink 5 can be stabilized.

In order to maintain the nozzle 31, a processing portion other than the nozzle immersion portion 52 and the preliminary discharge portion 53 may be provided. Furthermore, the nozzle immersion portion 52 and the preliminary discharge portion 53 are not limited to being disposed on the −X side of the holding portion 6, and may be disposed on the +X side of the holding portion 6, or the +Y side or the −Y side of the application portion 7. Furthermore, instead of moving the nozzle 31 to the nozzle immersion portion 52 or the like at the time of nozzle cleaning, the nozzle immersion portion 52 and the like may be moved to the nozzle 31 at the time of nozzle cleaning. In this case, an arbitrary configuration in which the nozzle immersion portion 52 and the preliminary discharge portion 53 are formed to be movable so as to retreat in the Y direction or the Z direction with respect to the nozzle 31 in a normal state for example, and at the time of maintenance of the nozzle 31, the nozzle immersion portion 52 and the preliminary discharge portion 53 move to the nozzle 31, is adopted. Whether or not to provide the nozzle immersion portion 52 and the preliminary discharge portion 53 is arbitrary, and the nozzle immersion portion 52 and the like may not be provided.

The application portion 7 is not limited to the configuration described above, and any configuration capable of discharging the catalyst ink 5 can be applied. For example, instead of the nozzle 31, the catalyst ink 5 may be applied to the electrolyte film 2 by an ink jet method or a spray method. Alternatively, the catalyst ink 5 may be discharged onto the electrolyte film 2 by a dispenser or the like, and the catalyst ink 5 may be spread on the electrolyte film 2 by a squeegee or the like.

As shown in FIGS. 1 and 2, the chamber portion 8 forms a sealed space 55 including the holding portion 6. The space 55 is a space that can be depressurized by suction of the suction portion 9. The chamber portion 8 is disposed on the table 14 of the main frame 10. The chamber portion 8 includes the base 56 and a lid portion 57. The base 56 has a lower surface side fixed to the table 14, and has an upper surface side fixed to the base portion 16 of the holding portion 6. As the base 56, a rectangular plate-shaped member is used. Not shown in the drawing, the base 56 has a connection hole that communicates with the connection hole 22 (refer to FIG. 3(A)) provided in the base portion 16, and secures a path through which a suction power of the suction portion 17 for adsorption reaches adsorption portion 15. The lid portion 57 abuts against an outer edge of an upper surface of the base 56 and is formed in a concave shape capable of forming the space 55.

FIG. 4(A) is a perspective view showing an example of the chamber portion 8, and FIG. 4(B) is a perspective view showing an example of the lid portion 57. As shown in FIG. 4(A), the holding portion 6 is fixed to a substantially central region of the upper surface of the base 56. The lid portion 57 is connected to the base 56 by two hinge portions 58 on the +X side of the upper surface of the base 56. The lid portion 57 forms the small space 55 so as to cover the holding portion 6, and therefore it is possible to shorten the time required for depressurizing the space 55 by the suction portion 9 described later.

As shown in FIG. 4(A), the lid portion 57 is formed so as to be rotatable about a Y axis by the hinge portions 58 and rotationally moves between a space forming position forming the space 55 including the holding portion 6 and a holding portion opening position where the holding portion 6 is opened. The holding portion opening position is set to a position at which the application portion 7 does not interfere with the lid portion 57. When the catalyst ink 5 is applied to the electrolyte film 2 of the holding portion 6 by the application portion 7, the lid portion 57 is disposed at the holding portion opening position (refer to the lid portion 57 indicated by a two-dot chain line in FIG. 4(A)). When suctioning the space 55 by the suction portion 9 described later to depressurize the space, the lid portion 57 is disposed at the space forming position (refer to the lid portion 57 indicated by a solid line in FIG. 4(A)). The hinge portions 58 may be disposed on the +Y side or the −Y side of the base 56 instead of being disposed on the +X side of the base 56.

The base 56 includes through holes 59. The through holes 59 are provided so as to penetrate from the +Z side to the −Z side of the base 56. The through holes 59 are formed to be connected to the space 55 in a case where the lid portion 57 is at the space forming position. The through holes 59 are connected to the suction portion 9 by a tubular member (not shown) such as a tube, for example. Therefore, by driving the suction portion 9, it is possible to suction the inside of the space 55 for depressurization. A number and disposition of the through holes 59 are arbitrary as long as through holes are connected to the space 55. For example, two or more through holes 59 may be formed and connected to the suction portion 9, respectively. Furthermore, the suction portion 9 is not limited to be connected via the through holes 59 of the base 56, and for example, a configuration in which an opening is provided in a part of the lid portion 57, the opening and the suction portion 9 are connected to each other through the tube or the like, and the inside of the space 55 is suctioned from the lid portion 57, may be used.

As shown in FIG. 4(B), the inside of a central portion of the lid portion 57 may be formed with a window portion 57a that can be visually inspected. As the window portion 57a, a transparent or translucent plate-shaped glass or a plate-shaped resin such as an acrylic plate is used. By the window portion 57a, an operator or the like can visually inspect a dry state of the catalyst ink 5. However, whether or not to form the window portion 57a is arbitrary. Furthermore, an elastic member such as rubber may be attached to the edge portion of the lid portion 57 in order to improve adhesiveness with the base 56 at the space forming position.

The chamber portion 8 includes a lid portion drive unit 60 for rotationally driving the lid portion 57. Driving of the lid portion drive unit 60 may be controlled by the control portion (not shown) or may be manually operated by an operator. Whether or not to provide the lid portion drive unit 60 is arbitrary. In a case where the lid portion drive unit 60 is not provided, the operator may perform opening and closing operation of the lid portion 57. Furthermore, the lid portion 57 is not limited to be formed to be openable and closable by the hinge portions 58. For example, the lid portion 57 may be formed to be movable in the vertical direction (Z direction). Furthermore, the lid portion 57 may be held by a robot arm or a manipulator, and may be openable and closable by driving the robot arm.

After the catalyst ink 5 is applied to the electrolyte film 2 by the application portion 7 and after the chamber portion 8 forms the space 55, the suction portion 9 suctions the space 55 for depressurization, and the catalyst ink 5 is dried while the space 55 being depressurized. For example, as the suction portion 9, an arbitrary pump such as a vacuum pump that generates a predetermined suction power can be applied. The control of a magnitude of the suction power and a drive timing of the suction portion 9 may be controlled by the control unit (not shown) or may be manually operated by an operator. At this time, the control unit may perform control so that the suction power of the suction portion 9 becomes smaller than the suction power of the suction portion 17 for adsorption of the holding portion 6. By making the suction power of the suction portion 17 for adsorption greater than the suction power of the suction portion 9, it is possible to suppress the electrolyte film 2 from being detached from the adsorption portion 15 even when the space 55 is suctioned. Furthermore, the suction portion 9 may gradually increase the suction power to depressurize the space 55. Accordingly, it is possible to suppress the catalyst ink 5 applied to the electrolyte film 2 from being deformed by the suction power. For example, in a case where the suction portion 9 performs a first suction for depressurizing the space 55 from an atmospheric pressure to a predetermined pressure, and then increases the suction power to be greater than that of the first suction so as to perform a second suction for depressurizing the space 55 to 1,000 Pa or less and preferably to 100 Pa or less, breakage due to the suction power with respect to the catalyst ink 5 is suppressed, the catalyst ink 5 is sufficiently dried, and therefore the porous catalyst layer 3 is formed with high accuracy. In this case, the predetermined pressure in the first suction is preferably 20,000 to 60,000 Pa. A time for depressurization to the predetermined pressure in the first suction is preferably 5 to 20 seconds. A rate for depressurization in the first suction is preferably 4,000 to 6,000 Pa/sec. In addition, the second suction may be appropriately adjusted depending on a solvent to be used, but the space 55 is depressurized to 1,000 Pa or less and preferably to 100 Pa or less. It is preferable that the second suction is performed for a time longer than the first suction. After suction by the suction portion 9, the pressure in the space 55 is returned to the atmospheric pressure. A mechanism for returning the pressure in the space 55 to the atmospheric pressure is arbitrary. For example, as the mechanism for returning the pressure of the space 55 to the atmospheric pressure, a mechanism for allowing air and gas to flow into the space, or the like can be used. Furthermore, conditions for setting the pressure in the space 55 to the atmospheric pressure is arbitrary.

As described above, according to the present embodiment, it is possible to perform drying of the catalyst ink 5 under reduced pressure by the chamber portion 8 without moving or carrying the electrolyte film 2 from the state where the electrolyte film 2 is held by the holding portion 6. Therefore, generation of deformation such as wrinkles and distortion which is caused by the electrolyte film 2 absorbing moisture contained in the catalyst ink 5 and the atmosphere is suppressed, and it is possible to form the laminated film 4 with less deformation or the like. In addition, since the drying under reduced pressure is performed in a short time after the application of the catalyst ink 5, the porous catalyst layer 3 can be formed. Therefore, a specific surface area of the catalyst layer 3 can be increased, and the activity of the catalyst layer 3 can be improved.

The electrolyte film 2 and catalyst layer 3 constituting the laminated film 4 and the catalyst ink 5 forming the catalyst layer 3 will be described. The contents described later are the same for the other embodiments. The electrolyte film 2 has a function of, for example, selectively transmitting protons in a film thickness direction. The electrolyte film 2 is not particularly limited, and any known electrolyte film can be used. As the electrolyte film 2, for example, it is roughly classified according to the types of ion exchange resin which is a constituent material, and a fluorine-based polymer electrolyte film, a hydrocarbon-based polymer electrolyte film, and the like can be used.

Examples of the ion exchange resin constituting the fluorine-based polymer electrolyte film include perfluorocarbon sulfonic acid-based polymer such as Nafion (registered trademark, manufactured by Du Pont), Aciplex (registered trademark, manufactured by Asahi Kasei Corporation), and Flemion (registered trademark, manufactured by AGC Chemicals), perfluorocarbon phosphonic acid-based polymer, trifluorostyrene sulfonic acid-based polymer, ethylene tetrafluoroethylene-g-styrene sulfonic acid-based polymer, ethylene-tetrafluoroethylene copolymer, polyvinylidene fluoride-perfluorocarbon sulfonic acid-based polymer, and the like. From the viewpoint of improving power generation performance such as heat resistance and chemical stability, these fluorine-based polymer electrolyte films are used, and in particular, a fluorine-based polymer electrolyte film consisting of a perfluorocarbon sulfonic acid-based polymer is used.

Examples of the ion exchange resin constituting the hydrocarbon-based electrolyte film include sulfonated polyethersulfone (S-PES), sulfonated polyaryl ether ketone, sulfonated polybenzimidazole alkyl, phosphonated polybenzimidazole alkyl, sulfonated polystyrene, sulfonated polyether ether ketone (S-PEEK), sulfonated polyphenylene (S-PPP), and the like. The hydrocarbon-based polymer electrolyte film formed by these ion exchange resins has advantages in manufacturing that a raw material is inexpensive, a manufacturing process is simple, and material selectivity is high. The ion exchange resins may be used alone, or two or more kinds thereof may be used in combination. Furthermore, the material is not limited to the materials above, and other materials may be used.

A thickness of the electrolyte film 2 may be appropriately determined in consideration of characteristics of the fuel cell, and is not particularly limited. The thickness of the electrolyte film 2 is generally about 5 to 100 μm. If the thickness of the electrolyte film 2 is within such a range, a balance between strength at the time of film formation, durability at the time of use, and output characteristics at the time of use becomes appropriate. As the electrolyte film 2, electrolyte film laminated to a peelable base material sheet may be used. Accordingly, handling of the electrolyte film 2 becomes easy. Such a base material sheet is appropriately selected according to, for example, the types of a conductive carrier in the catalyst ink 5, and the like. A sheet made of a resin such as a polytetrafluoroethylene (PTFE) sheet, a polyethylene terephthalate (PET) sheet, and a polyester sheet can be used.

The catalyst layer 3 has at least one of an anode catalyst layer used on an anode side in the fuel cell and a cathode catalyst layer used on a cathode side in the fuel cell. The anode catalyst layer exhibits, for example, a catalytic action in the oxidation reaction of hydrogen. The cathode catalyst layer exhibits, for example, a catalytic action in the reduction reaction of oxygen. In a case where the catalyst layer 3 includes both the anode catalyst layer and the cathode catalyst layer, the anode catalyst layer and the cathode catalyst layer are formed on different surfaces of the electrolyte film 2, respectively.

The anode catalyst layer and the cathode catalyst layer can be formed, for example, from the catalyst ink 5. The catalyst ink 5 forming the anode catalyst layer and the catalyst ink 5 forming the cathode catalyst layer are not particularly limited as long as the catalyst inks each has the catalytic action described above, and known catalyst inks can be used. As such the catalyst ink 5, for example, a catalyst ink containing a catalyst in which a catalyst component is coated with two ionomer layers, which is disclosed in Japanese Unexamined Patent Application, Publication No. 2013-069614 can be used. As the catalyst ink 5, for example, a catalyst ink containing an electrode catalyst in which a catalyst component is carried by a conductive carrier, a polymer electrolyte, and a solvent can be used. The solvent may not be a solvent that completely dissolves the polymer electrolyte, and may be any solvent as long as the polymer electrolyte can be dispersed thereby.

The catalyst component used for the anode catalyst layer is not particularly limited as long as a catalyst exhibits the catalytic action in the oxidation reaction of hydrogen, and a known catalyst can be used. The catalyst component used for the cathode catalyst layer is also not particularly limited as long as a catalyst exhibits the catalytic action in the reduction reaction of oxygen, and a known catalyst can be used. Specifically, the catalyst can be selected from metals such as platinum, ruthenium, iridium, rhodium, palladium, osmium, tungsten, lead, iron, chromium, cobalt, nickel, manganese, vanadium, molybdenum, gallium, and aluminum, an alloy thereof, and the like.

Among these, for example, a catalyst containing platinum is used in order to improve catalytic activity, poisoning resistance with respect to carbon monoxide and the like, heat resistance, and the like. In regard to a composition of the above alloy, for example, a content of platinum is 30 to 90 atomic % and a content of metal which is alloyed with platinum is 10 to 70 atomic %, and the content may vary depending on the types of alloy to be alloyed. An alloy is a generic term used to refer to a material which is obtained by adding one or more metal elements or nonmetallic elements to a metal element and has a metallic property. In regard to a composition of the alloy, there are a eutectic alloy which is so-called a mixture in which component elements thereof become separate crystals, an alloy in which component elements thereof are completely melted to form a solid solution, an alloy in which component elements thereof form an intermetallic compound or a compound of a metal and a nonmetal, and the like. In the present embodiment, any alloy may be used. In this case, the catalyst component used for the anode catalyst layer and the catalyst component used for the cathode catalyst layer can be appropriately selected from the above examples.

A shape and size of the catalyst component are not particularly limited, and it is possible to adopt the same shape and size as those of the known catalyst component. The shape of the catalyst component can be, for example, granular, scaly, or layered. In this case, an average particle diameter of catalyst particles is, for example, 1 to 30 nm, 1 to 10 nm, 1 to 5 nm, 2 to 4 nm, and the like. If the average particle diameter of the catalyst particles is within such a range, a balance between a catalyst utilization rate related to an electrode area which is effective for proceeding an electrochemical reaction, and the ease of carrying becomes appropriate. The average particle diameter of the catalyst particles can be measured as an average value of a crystallite diameter calculated from a half value width of a diffraction peak of the catalyst component in X-ray diffraction and of a particle diameter of the catalyst component observed from a transmission electron microscope (TEM).

The conductive carrier functions as a carrier for carrying the catalyst components and as an electron conduction path related to transfer of electrons between the catalyst components and other members. As the conductive carrier, any conductive carrier having a specific surface area for carrying the catalyst particles in a desired dispersed state and having sufficient electron conductivity as a current collector may be used. For example, a conductive carrier having carbon (carbon atoms) as a main component is used. Examples thereof include carbon particles composed of carbon black, activated carbon, coke, natural graphite, artificial graphite, and the like. The conductive carrier having carbon as a main component includes a conductive carrier composed of only carbon atoms and a conductive carrier substantially composed of carbon atoms. In addition, in order to improve characteristics of the fuel cell, elements other than carbon atoms may be contained. In a case where the conductive carrier is substantially composed of carbon atoms, contamination of impurities of about 2% to 3% by weight or less is permitted.

A BET specific surface area of the conductive carrier may be any specific surface area as long as the area is sufficient for carrying the catalyst component with high dispersity. For example, the area is 20 to 1600 $m^2/g$ or 80 to 1200 $m^2/g$. If the specific surface area is within the above range, the polymer electrolyte and the catalyst component to the conductive carrier are sufficiently dispersed and thus sufficient power generation performance is obtained, and therefore the catalyst component and the polymer electrolyte can be sufficiently effectively utilized. A size of the conductive carrier is not particularly limited, but from the viewpoints of the ease of carrying, a catalyst utilization rate, setting a thickness of an electrode catalyst layer within an appropriate range, and the like, an average particle diameter is set to about, for example, 5 to 200 nm or 10 to 100 nm.

In the electrode catalyst in which the catalyst component is carried by the conductive carrier, a carried amount of the catalyst component is set to, for example, 10% to 80% by weight or 30% to 70% by weight with respect to the total amount of the electrode catalyst. If the carried amount of the catalyst component is within such a range, a balance between dispersivity of the catalyst component on the catalyst carrier and the catalyst performance becomes appropriate. The carried amount of the catalyst component can be examined by inductively coupled plasma emission spectroscopy (ICP).

As the polymer electrolyte, for example, the fluorine-based polymer electrolyte film, hydrocarbon-based polymer electrolyte film, or the like can be used. Among these, the electrolyte containing a fluorine atom is used for having excellent heat resistance, chemical stability, and the like. For example, fluorine-based electrolytes such as Nafion (registered trademark, manufactured by Du Pont), Aciplex (registered trademark, manufactured by Asahi Kasei Corporation), and Flemion (registered trademark, manufactured by AGC Chemicals) are used. A content of the polymer electrolyte in the catalyst layer 3 is not particularly limited, but a ratio of the polymer electrolyte mass is set to, for example, 0.3 to 1.2 with respect to an amount of carbon in the electrode catalyst.

The solvent is not particularly limited, and usual solvents used for forming the catalyst layer 3 can be similarly used. For example, water; and an alcohol such as methanol, ethanol, 1-propanol, 2-propanol, 1-butanol, 2-butanol, isobutyl alcohol, tert-butyl alcohol, pentanol, and cyclohexanol can be used. Among these, a case where the alcohol is a lower alcohol having 1 to 3 carbon atoms, such as methanol, ethanol, 1-propanol, and 2-propanol, is preferable from the viewpoint of the ease of handling and cost. These solvents may be used alone, or two or more kinds thereof may be used in combination. Among these, in a case where the solvent is an aqueous solution containing alcohol containing water in an amount of 70% by weight or more, absorption of water occurring when the electrolyte film 2 absorbs alcohol can be suppressed, and as a result, deformation of the laminated film 4 can be suppressed. In addition, an amount of the solvent to be used is not particularly limited and an amount same as the known amount can be used. In the catalyst ink 5, the electrode catalyst is used in any amount as long as it is an amount by which a desired action, that is, an action of catalyzing the oxidation reaction of hydrogen (anode side) and the reduction reaction of oxygen (cathode side) can be sufficiently exerted. The electrode catalyst is set in the catalyst ink 5 to be, for example, 5 to 30% by weight, or 9 to 20% by weight.

Figure 5:
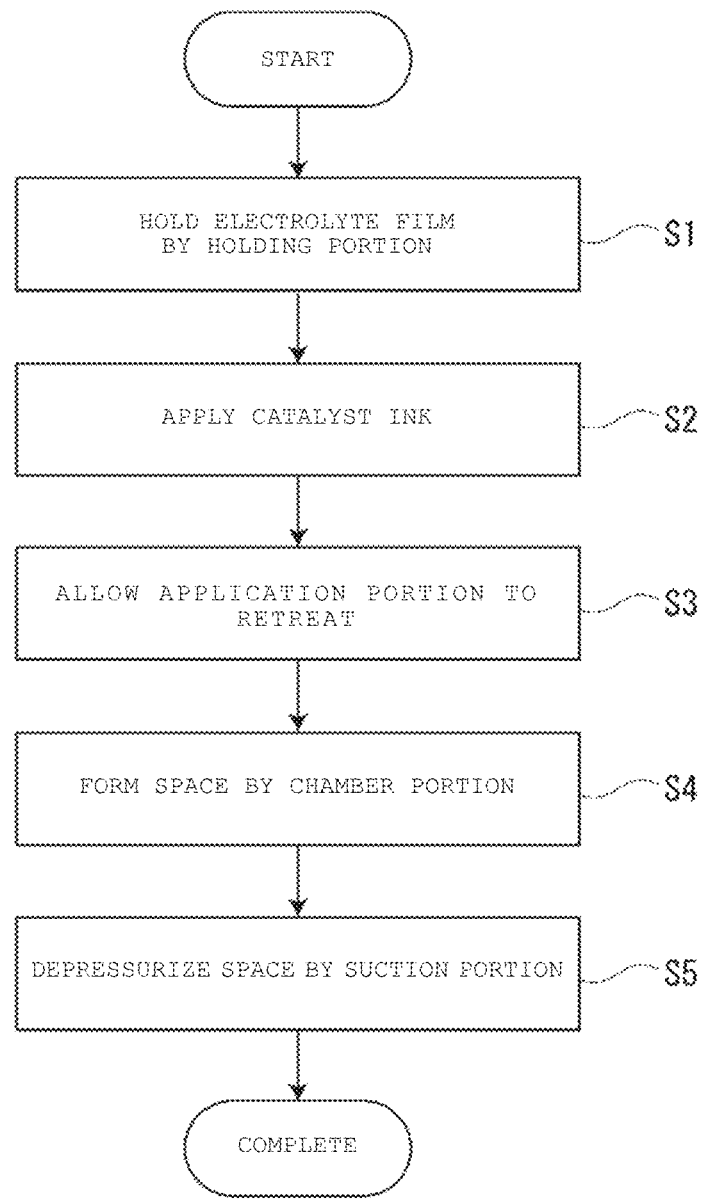
FIG. 5 is a flowchart showing an example of a catalyst-layer forming method.

Next, a method for manufacturing the laminated film 4 (method for forming the catalyst layer 3) will be described with reference to the drawings together with the operation of the apparatus 1. However, the following explanation is only an example, and the manufacturing method is not limited thereto. FIG. 5 is a flowchart showing a method for manufacturing the laminated film 4. FIGS. 6 and 7 are views showing the operation of the apparatus 1. FIGS. 6 and 7 are appropriately referred to while referring to the flowchart of FIG. 5.

First, the sheet-shaped electrolyte film 2 is prepared. An arbitrary method can be applied for preparing the sheet-shaped electrolyte film 2. Next, as shown in FIG. 5, the sheet-shaped electrolyte film 2 is held by the holding portion 6 (step S1). As shown in FIG. 6(A), the electrolyte film 2 is held by opening the lid portion 57 of the chamber portion 8 and disposing the electrolyte film 2 at the holding portion opening position, setting the electrolyte film 2 in a spread state on the sheet member 24 on the adsorption portion 15, and driving the suction portion 17 for adsorption so as to suction the electrolyte film 2. Therefore, the electrolyte film 2 is held in the holding portion 6 in a spread state. At this time, the application portion 7 is located at the retreat position P2.

The operation of setting the electrolyte film 2 on the holding portion 6 may be manually carried out by an operator or may be carried out by various transport devices. In addition, a driving timing of the suction portion 17 for adsorption may be either after setting the electrolyte film 2 on the sheet member 24 or before setting the electrolyte film 2. In a case of driving the suction portion 17 for adsorption before setting the electrolyte film 2 on the sheet member 24, a suction power may be changed in a stepwise manner such that a suction power is set to be weak during the placement, strong suction is performed after the setting is completed, and the like. By weak suction during the setting, it is possible to facilitate the setting of the electrolyte film 2. Such a change in suction power of the suction portion 17 for adsorption may be controlled by the control portion (not shown) or may be manually operated by an operator.

Next, as shown in FIG. 5, the catalyst ink 5 is applied to the electrolyte film 2 by the application portion 7 (step S2). Prior to the application, the nozzle 31 may be subjected to maintenance by the nozzle immersion portion 52 and the preliminary discharge portion 53. The application portion 7 moves to +X direction by driving the application portion drive unit 40 (refer to FIG. 1) and is disposed on the −X side of the facing position P1 from the retreat position P2. A position on the −X side of the facing position P1 is, for example, a position facing the outer edge of the electrolyte film 2 or a position facing the outside of the outer edge of the electrolyte film 2. Subsequently, a Z position of the nozzle 31 is adjusted by driving a drive unit (not shown). The Z position of the nozzle 31 is set so that a gap between the discharge port 32 and the electrolyte film 2 becomes a predetermined gap. The Z position of the nozzle 31 may be adjusted while the application portion 7 moves from the retreat position P2 to the facing position P1.

Subsequently, as shown in FIG. 6(B), the application portion drive unit 40 is driven to move the application portion 7 in the +X direction. At this time, the catalyst ink 5 is discharged from the discharge port 32 of the nozzle 31, and when the nozzle 31 reaches the +X side of the electrolyte film 2 (point where the application portion 7 reaches the +X side of the facing position P1), the discharge of the catalyst ink 5 from the nozzle 31 is stopped. As a result, the catalyst ink 5 is applied to a predetermined region on the electrolyte film 2. The electrolyte film 2 is held in a spread state by the holding portion 6, and therefore it is possible to prevent the electrolyte film 2 from being displaced when the catalyst ink 5 is applied, and the catalyst ink 5 can be appropriately applied onto the electrolyte film 2.

As a timing of discharging the catalyst ink 5 from the nozzle 31, for example, the catalyst ink 5 may be discharged when the application portion 7 moves in the X direction at a constant speed. That is, when the application portion 7 starts to move in the +X direction, the discharge of the catalyst ink 5 may start after reaching substantially a constant speed without discharging the catalyst ink 5 during acceleration. For example, in a case where a discharge amount of the catalyst ink 5 per unit time is controlled to be constant, if a relative speed of the nozzle 31 with respect to the electrolyte film 2 changes, an application amount per unit area of the electrolyte film 2 varies and thus unevenness occurs. Therefore, by starting the discharge of the catalyst ink 5 after the application portion 7 reaches substantially a constant speed, occurrence of unevenness of the catalyst ink 5 on the electrolyte film 2, for example, application unevenness, drying unevenness, and the like can be suppressed, by which a film having good thickness uniformity can be formed.

Next, as shown in FIG. 5, the application portion 7 moves in the −X direction by driving the application portion drive unit 40, and retreats to the outside of the chamber portion 8 (step S3). As shown in FIG. 7(A), the application portion 7 moves away from the holding portion 6 by moving from the facing position P1 to the retreat position P2, and therefore retreats to the outside of the chamber portion 8. In this step S3, suction of the electrolyte film 2 is continued by the suction portion 17 for adsorption. In addition, the catalyst ink 5 in the vicinity of the discharge port 32 of the nozzle 31 may be suctioned into the nozzle 31 so as to prevent the catalyst ink 5 from leaking from the nozzle 31 while the retreat of the application portion 7.

Next, as shown in FIG. 5, the space 55 including the electrolyte film 2 to which the catalyst ink 5 is applied is formed by the chamber portion 8 (step S4). As shown in FIG. 7(B), the lid portion 57 rotates from the holding portion opening position to the space forming position by driving the lid portion drive unit 60 so as to be in close contact with the base 56, and therefore the sealed space 55 is formed. The space 55 includes the electrolyte film 2 to which the catalyst ink 5 is applied, the membrane being in a state of being held by the holding portion 6. A timing at which the lid portion 57 rotates from the holding portion opening position by the lid portion drive unit 60 may be after the application portion 7 has moved to the retreat position P2 or during the movement of the application portion 7 from the facing position P1 to the retreat position P2.

Next, as shown in FIG. 5, the inside of the space 55 is suctioned and depressurized by driving the suction portion 9 (step S5). Depressurization of the space 55 is performed by driving the suction portion 9 after the space 55 is formed, as shown in FIG. 7(B). By depressurizing the space 55, the catalyst ink 5 is dried, and the catalyst layer 3 is formed on the electrolyte film 2. The catalyst ink 5 is dried under reduced pressure, and therefore the porous catalyst layer 3 can be formed, and the specific surface area of the catalyst layer 3 can be increased. Furthermore, since the space 55 of the chamber portion 8 is a small space covering the holding portion 6, it is possible to shorten the time for depressurizing the space 55. In addition, when depressurizing by the suction portion 9, a suction power with respect to the electrolyte film 2 by the suction portion 17 for adsorption may be set greater than a suction power with respect to the space 55. Accordingly, even when the space 55 is depressurized, the electrolyte film 2 can be reliably held by the holding portion 6. Whether or not the suction power with respect to the electrolyte film 2 is set to be greater than the suction power with respect to the space 55 is arbitrary. Furthermore, the suction portion 9 may gradually increase the suction power so as to depressurize the space 55. Accordingly, it is possible to suppress the catalyst ink 5 applied to the electrolyte film 2 from being deformed by the suction power. For example, in a case where the suction portion 9 performs a first suction for depressurizing the space 55 from an atmospheric pressure to a predetermined pressure, and then increases a suction power to be greater than that of the first suction so as to perform a second suction for depressurizing the space 55 to 1,000 Pa or less and preferably to 100 Pa or less, breakage due to the suction power with respect to the catalyst ink 5 is suppressed, the catalyst ink 5 is sufficiently dried, and therefore the porous catalyst layer 3 is formed with high accuracy. Whether the suction portion 9 gradually increases the suction power to depressurize the space 55 is arbitrary.

Furthermore, in the step S5, when the catalyst ink 5 is dried under reduced pressure or after the catalyst ink 5 is dried under reduced pressure, the electrolyte film 2 may be heated at a predetermined temperature by the heating portion 26. Therefore, a drying time of the catalyst ink 5 can be shortened. In addition, heating of the electrolyte film 2 by the heating portion 26 may be started during or after applying the catalyst ink 5 in the step S2. Furthermore, a heating temperature of the electrolyte film 2 by the heating portion 26 may be changed in accordance with the progress of drying of the catalyst ink 5, for example. Whether or not the electrolyte film 2 is heated by the heating portion 26 is arbitrary.

After the catalyst ink 5 is dried under reduced pressure to form the catalyst layer 3, the driving of the suction portion 9 is stopped and the pressure in the space 55 is returned to the atmospheric pressure. The conditions for setting the pressure in the space 55 to atmospheric pressure is arbitrary. After the pressure of the space 55 is returned to the atmospheric pressure, the lid portion 57 rotates to the holding portion opening position by the lid portion drive unit 60 to open the holding portion 6. Whether or not the catalyst layer 3 is formed may be visually inspected by an operator from the window portion 57a of the lid portion 57, or may be determined over a predetermined lapse of time. Furthermore, after stopping the driving of the suction portion 9, a gas (for example, nitrogen gas, argon gas, or the like) which is inert to the electrolyte film 2 and the catalyst layer 3 may be supplied into the space 55 to purge the space 55. Furthermore, when opening the space 55 in a depressurized state, for example, a part of the electrolyte film 2 may be elastically pressed against the adsorption portion 15 by a hook or the like. Accordingly, even when the space 55 is opened to the atmosphere for example, the electrolyte film 2 (laminated film 4) can be reliably held by suction of the adsorption portion 15, hooks, and the like, and can be prevented from being peeled off from the adsorption portion 15. Subsequently, by stopping the driving of the suction portion 17 for adsorption, the laminated film 4 can be removed. In addition to manual work by an operator, various transporting devices may be used to remove the laminated film 4. Base on the above steps, the laminated film 4 in which the catalyst layer 3 is laminated to the electrolyte film 2 is completed.

As described above, according to the present embodiment, since the time from application of the catalyst ink 5 to drying under reduced pressure is short, the time for the electrolyte film 2 to absorb moisture in the catalyst ink 5 is short, and therefore the deformation of the electrolyte film 2 can be suppressed. In addition, since the application of the catalyst ink 5 and drying under reduced pressure are performed while the electrolyte film 2 is held by the holding portion 6, it is unnecessary to move or carry the electrolyte film 2, and therefore a manufacturing time of the laminated film 4 can be shortened. In addition, since the time from the application of the catalyst ink 5 to the start of drying is short, it is possible to use a material which requires a short time from application to drying as the catalyst ink 5. In addition, the electrolyte film 2 is held by the holding portion 6 in a spread state, and therefore the deformation of the electrolyte film 2 during the application of the catalyst ink 5 or drying under reduced pressure can be suppressed, by which the suitable laminated film 4 having less deformation can be manufactured. Furthermore, since the catalyst ink 5 is dried under reduced pressure to form the catalyst layer 3, the porous catalyst layer 3 is formed. Therefore, the specific surface area of the catalyst layer 3 is increased, and the laminated film 4 having high catalytic activity of the catalyst layer 3 can be efficiently manufactured.

In a case of forming the catalyst layer 3 on both surfaces of the electrolyte film 2, first, the catalyst layer 3 is formed on one surface of the electrolyte film 2, and then the electrolyte film 2 is adsorbed again by the holding portion 6 with the other surface as the upper surface, the catalyst layer 3 is formed on the other surface by the same procedure as described above, and therefore it is possible to form the laminated film 4 having the catalyst layer 3 on both surfaces of the electrolyte film 2. In a case where the catalyst ink 5 is applied to both surfaces of the electrolyte film 2, different catalyst layers 3 may be formed by changing the components of the catalyst ink 5 for each side.

The catalyst layer 3 may be formed to be multilayer by repeating the steps S2 to S5. In this case, the same catalyst ink 5 may be used to form the catalyst layer 3 to be multilayer, or different catalyst inks 5 may be used to form the catalyst layer 3 to be multilayer. In a case where the same catalyst ink 5 is used, a thickness of the catalyst layer 3 made of the same material can easily be increased. Furthermore, in a case where different catalyst inks 5 are used, it is possible to easily form the catalyst layer 3 in a state in which a plurality of materials are laminated.

Second Embodiment

Next, a second embodiment will be described. In the present embodiment, the same reference numerals are given to the same configurations as those of the first embodiment, and the description thereof is simplified or omitted. In addition, among the items described in the first embodiment, all the items applicable to the second embodiment may be applied in the second embodiment.

Figure 8:
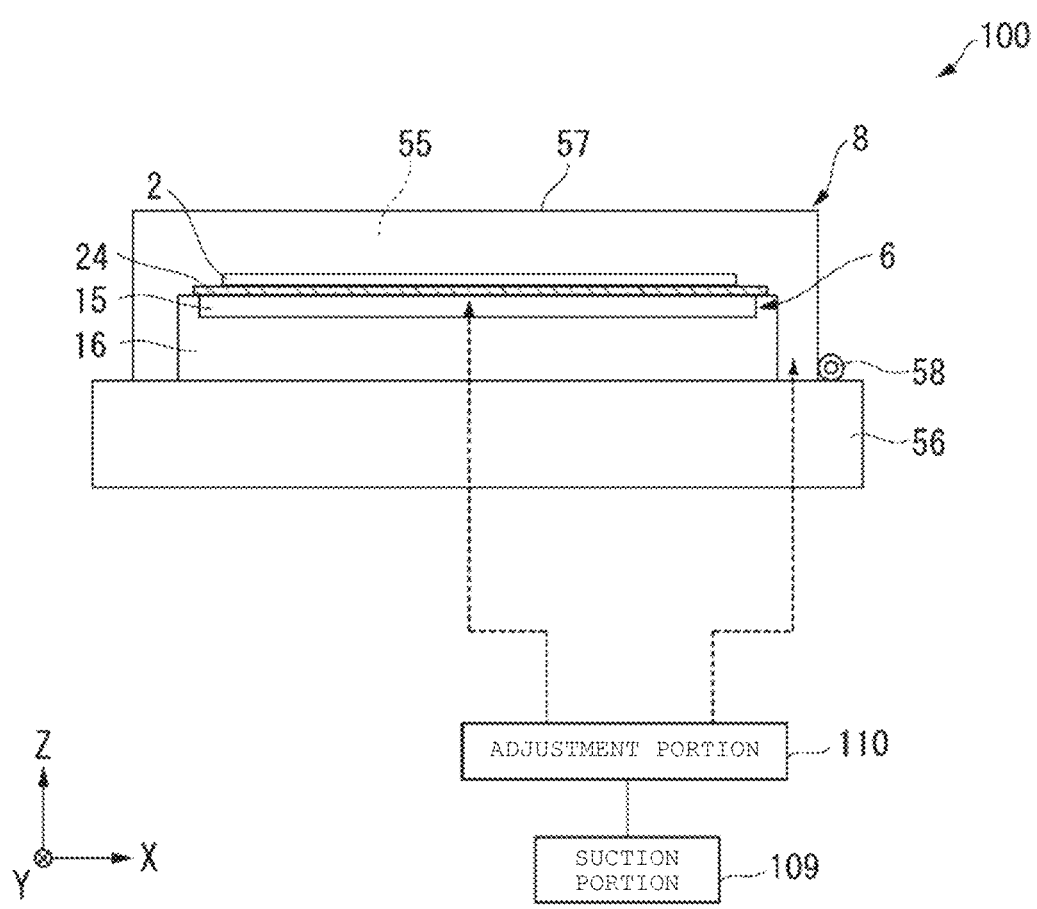
FIG. 8 is a view showing an example of a catalyst-layer forming apparatus according to a second embodiment.

FIG. 8 is a view showing a suction portion 109 in an apparatus 100 according to the second embodiment. In the present embodiment, the suction portion 109 is different from that of the first embodiment. The holding portion 6, the application portion 7, and the chamber portion 8 are the same as those in the first embodiment. As same as the first embodiment, for example, an arbitrary pump such as a vacuum pump that generates a predetermined suction power can be applied to the suction portion 109. A magnitude of an adsorption power and a drive timing of the suction portion 109 may be controlled by a control unit (not shown) or may be manually operated by an operator. The suction portion 109 is connected to both the adsorption portion 15 and the space 55 by a tubular member such as a tube via an adjustment portion 110. The adjustment portion 110 divides suction by the suction portion 109 into suction with respect to the adsorption portion 15 and suction with respect to the space 55, and adjusts each suction.

For example, a vacuum valve capable of controlling a gas flow rate can be used as the adjustment portion 110. For example, the adjustment portion 110 adjusts a suction power with respect to the adsorption portion 15 so that the suction power becomes greater than a suction power with respect to the space 55. The adjustment portion 110 is not limited to being formed separately from the suction portion 109, and may be formed as a part of the suction portion 109. In addition, the adjustment by the adjustment portion 110 may be controlled by the control unit (not shown), or may be manually operated by an operator.

As described above, according to the present embodiment, since both the suction with respect to the adsorption portion 15 and the suction with respect to the space 55 are performed by one suction portion 109, the suction portion 17 for adsorption is unnecessary as in the first embodiment. Therefore, the number of suction portions (for example, vacuum pumps) can be decreased, and the apparatus cost can be reduced. In addition, by operating the adjustment portion 110, it is possible to easily adjust the suction power with respect to the adsorption portion 15 and the suction power with respect to the space 55.

Third Embodiment

Next, a third embodiment will be described. In the present embodiment, the same reference numerals are given to the same configurations as those of the above-described embodiments, and the description thereof is simplified or omitted. In addition, among the items described in the above-described embodiments, all the items applicable to the third embodiment may be applied in the third embodiment.

Figure 9:
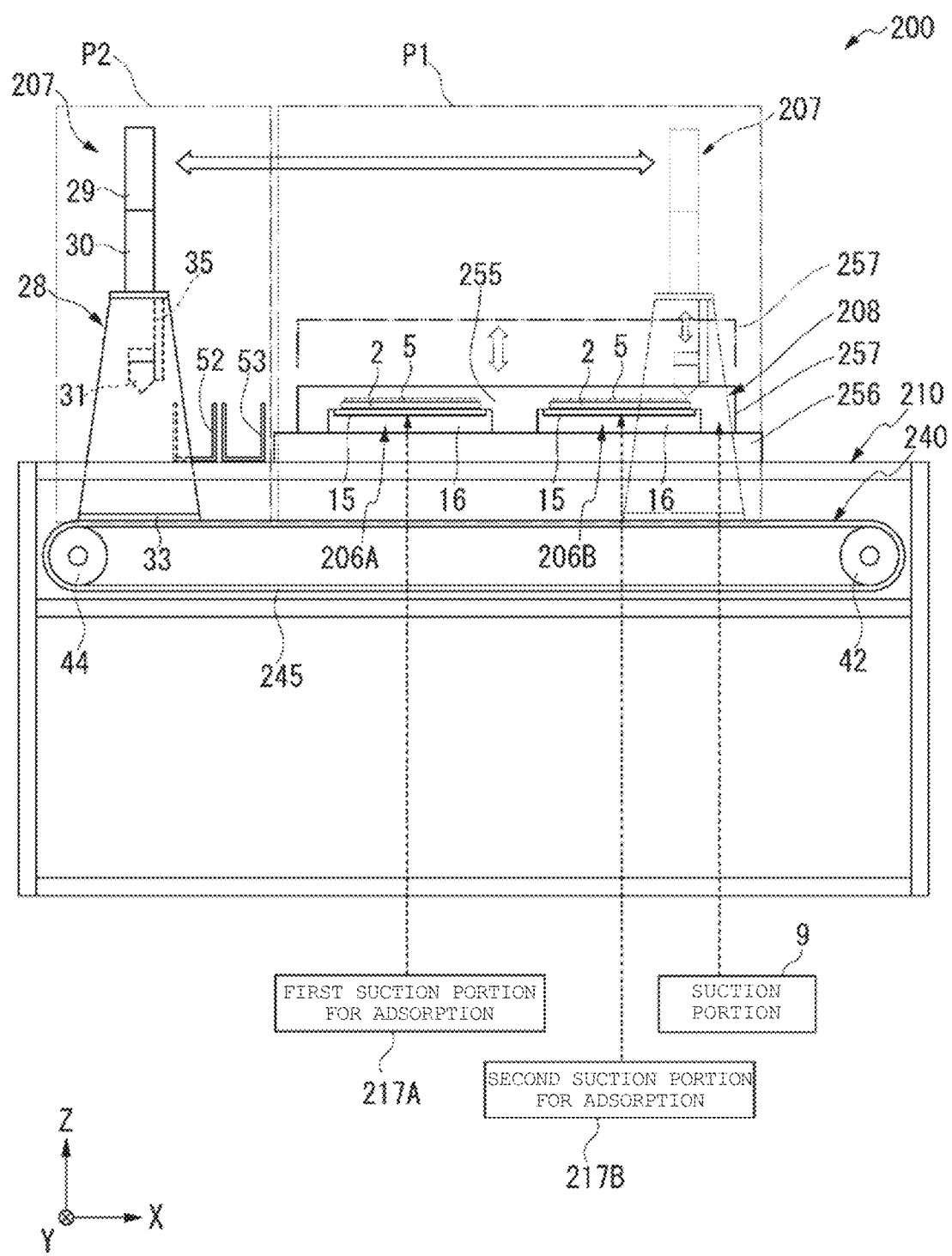
FIG. 9 is a view showing an example of a catalyst-layer forming apparatus according to a third embodiment.

FIG. 9 is a view showing an example of an apparatus 200 according to the third embodiment. As shown in FIG. 9, the apparatus 200 includes a first holding portion 206A and a second holding portion 206B, an application portion 207, and a chamber portion 208. A plurality of holding portions 206A and 206B, the application portion 207, and the chamber portion 208 are supported by a main frame 210. The main frame 210 is similar to the main frame 10 except that the main frame 210 is formed longer in the X direction than the main frame 10 shown in FIG. 1.

Each of the first holding portion 206A and the second holding portion 206B has the same configuration as the holding portion 6 shown in FIG. 1. The first holding portion 206A and the second holding portion 206B are disposed side by side in the X direction on a base 256 of the chamber portion 208. The first holding portion 206A and the second holding portion 206B are connected to a first suction portion 217A for adsorption and a second suction portion 217B for adsorption, respectively. The first suction portion 217A for adsorption and the second suction portion 217B for adsorption have the same configuration as that of the suction portion 17 for adsorption shown in FIG. 1. The first suction portion 217A for adsorption and the second suction portion 217B for adsorption are not limited to being disposed separately, and suction of the adsorption portion 15 may be performed by using the single suction portion 217A for adsorption (or suction portion 217B for adsorption).

The application portion 207 is movable in the X direction so as to apply the catalyst ink 5 to the electrolyte film 2 held by each of the first holding portion 206A and the second holding portion 206B. In accordance with the above description, a range of the facing position P1 is longer in the X direction than that in the first embodiment. In order to secure the movement of the application portion 207 in the X direction, an application portion drive unit 240 uses a belt 245 longer in the X direction than the belt 45 of the first embodiment. Another configuration of the application portion 207 is the same as that of the application portion 7 shown in FIG. 1. The nozzle immersion portion 52 and the preliminary discharge portion 53 for maintaining the nozzle 31 are disposed on the −X side of the first holding portion 206A.

The chamber portion 208 includes the base 256 for supporting the first holding portion 206A and the second holding portion 206B, and a lid portion 257 capable of forming a space 255 including the first holding portion 206A and the second holding portion 206B. The lid portion 257 is formed to be movable between, by a drive device (not shown), a holding portion opening position where the first holding portion 206A and the like are opened and a space forming position where the space 255 is formed. As same as the lid portion 57 of the first embodiment, the lid portion 257 may be formed to be rotatable by the hinge portion 58. The space 255 is connected to the suction portion 9 and can be depressurized by suction by the suction portion 9. Instead of forming the space 255 including both the first holding portion 206A and the second holding portion 206B, the chamber portion 208 may form a space separated from the first holding portion 206A and the second holding portion 206B.

As described above, according to the present embodiment, it is possible to apply the catalyst ink 5 by one application portion 207 to one of the plurality of the electrolyte films 2 held by the first holding portion 206A and the second holding portion 206B. Furthermore, with respect to the plurality of the electrolyte films 2 to which the catalyst ink 5 is applied, a single space 255 is depressurized so as to be collectively dried, and therefore the laminated film 4 (catalyst layer 3) can be efficiently manufactured (formed). In FIG. 9, two first holding portions 206A and two second holding portions 206B are used, but three or more holding portions may be disposed.

In the present embodiment, in addition to the use form in which the catalyst ink 5 is applied to one surface of the electrolyte film 2 by both the first holding portion 206A and the second holding portion 206B, a use form in which the catalyst ink 5 is applied to one side of the electrolyte film 2 by the first holding portion 206A, and then the catalyst ink 5 is applied to the other side of the electrolyte film 2 by the second holding portion 206B, may be adopted. At this time, transporting the electrolyte film 2 from the first holding portion 206A to the second holding portion 206B may be carried out manually by an operator or by various transport devices.

Fourth Embodiment

Next, a fourth embodiment will be described. In the present embodiment, the same reference numerals are given to the same configurations as those of the above-described embodiments, and the description thereof is simplified or omitted. In addition, among the items described in the above-described embodiments, all the items applicable to the fourth embodiment may be applied in the fourth embodiment.

Figure 10:
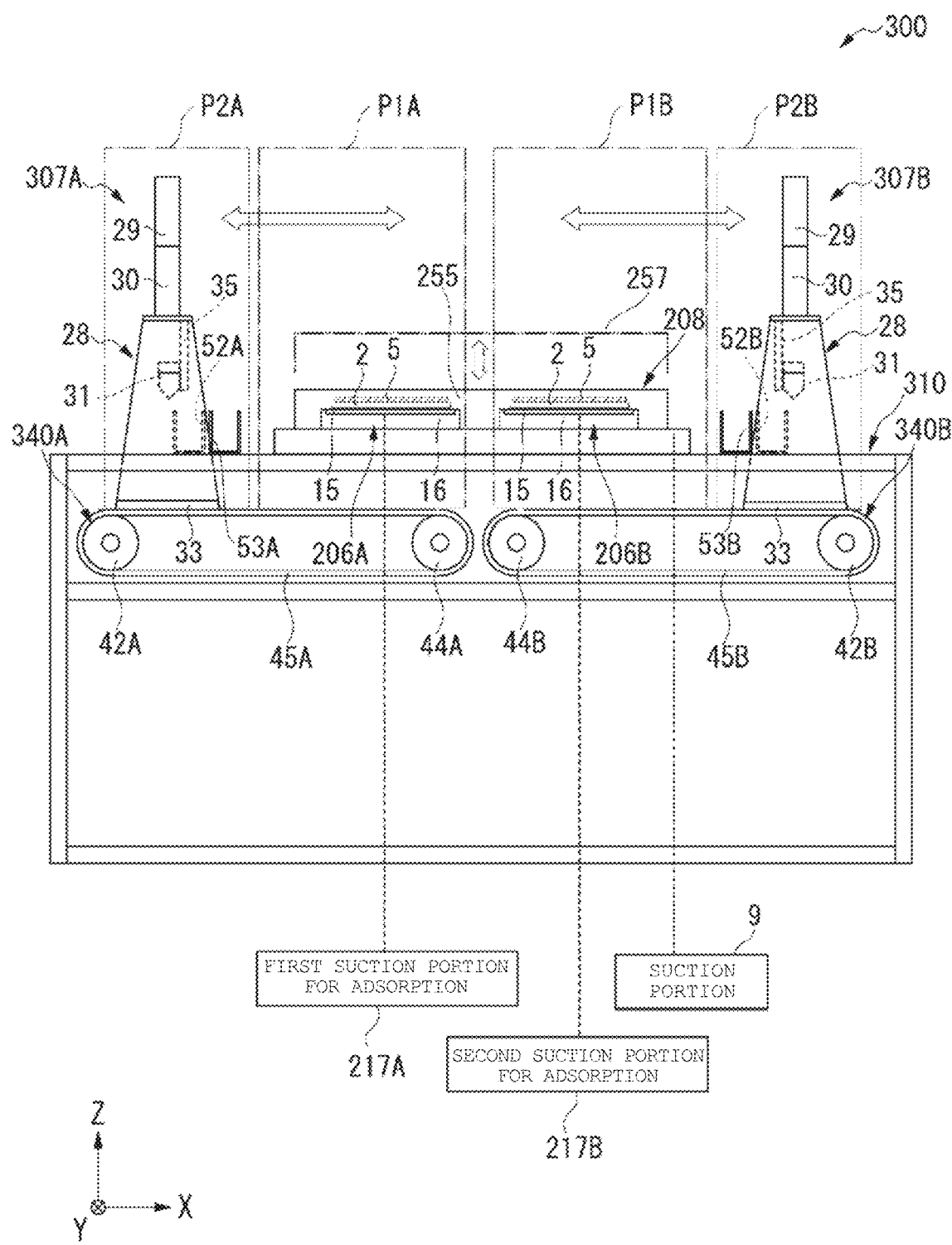
FIG. 10 is a view showing an example of a catalyst-layer forming apparatus according to a fourth embodiment.

FIG. 10 is a view showing an example of an apparatus 300 according to the fourth embodiment. As shown in FIG. 10, the apparatus 300 includes the first holding portion 206A and the second holding portion 206B, a first application portion 307A and a second application portion 307B, and the chamber portion 208. The plurality of holding portions 206A and 206B, the first application portion 307A and the second application portion 307B, and the chamber portion 208 are supported by a main frame 310. The main frame 310 is the same as the main frames 10 and 210 except that the main frame 310 is formed longer in the X direction than the main frames 10 and 210 shown in FIGS. 1 and 2. The first holding portion 206A and the second holding portion 206B are the same as those in the second embodiment.

The first application portion 307A is used to apply the ink to the electrolyte film 2 held by the first holding portion 206A. The first application portion 307A has the same configuration as that of the application portion 7 in the first embodiment. A retreat position P2A of the first application portion 307A is set on the −X side of the first holding portion 206A. A nozzle immersion portion 52A and a preliminary discharge portion 53A for maintaining the nozzles 31 of the first application portion 307A are disposed on the −X side of the first holding portion 206A. The first application portion 307A moves in the +X direction from the retreat position P2A and can be disposed at a facing position P1A. Movement of the first application portion 307A is performed by a first application portion drive unit 340A. The first application portion drive unit 340A includes a driving roller 42A, a driven roller 44A, and a belt 45A. The first application portion drive unit 340A is substantially the same as the application portion drive unit 40 of the first embodiment.

The second application portion 307B is used to apply the ink to the electrolyte film 2 held by the second holding portion 206B. The second application portion 307B has the same configuration as that of the application portion 7 of the first embodiment. A retreat position P2B of the second application portion 307B is set on the +X side of the second holding portion 206B. A nozzle immersion portion 52B and a preliminary discharge portion 53B for maintaining the nozzle 31 of the second application portion 307B are disposed on the +X side of the second holding portion 206B. The second application portion 307B moves in the −X direction from the retreat position P2B and can be disposed at a facing position P1B. Movement of the second application portion 307B is performed by a second application portion drive unit 340B. The second application portion drive unit 340B includes a driving roller 42B, a driven roller 44B, and a belt 45B. The second application portion drive unit 340B is substantially the same as the application portion drive unit 40 of the first embodiment.

As described above, according to the present embodiment, the catalyst ink 5 is applied to the plurality of the electrolyte films 2 held by the first holding portion 206A and the second holding portion 206B by the first application portion 307A and the second application portion 307B, respectively, and therefore an application time can be shortened. Furthermore, the plurality of the electrolyte films 2 are dried under reduced pressure by one space 255, and therefore the laminated film 4 (catalyst layer 3) can be efficiently manufactured (formed). In FIG. 10, two first holding portions 206A and two second holding portions 206B are used, but three or more holding portions may be disposed, and the application portion may be disposed for each holding portion.

In the present embodiment, as same as the second embodiment, in addition to the use form in which the catalyst ink 5 is applied to one side of the electrolyte film 2 by both the first holding portion 206A and the second holding portion 206B, a use from in which the catalyst ink 5 is applied to one side of the electrolyte film 2 by the first holding portion 206A, and then the catalyst ink 5 is applied to the other side of the electrolyte film 2 by the second holding portion 206B, may be adopted. At this time, transporting the electrolyte film 2 from the first holding portion 206A to the second holding portion 206B may be carried out manually by an operator or by various transport devices.

In the present embodiment, the same catalyst ink 5 may be applied by the first application portion 307A and the second application portion 307B, or different catalyst inks 5 may be applied thereby. In this case, a predetermined catalyst ink 5 may be applied to one side of the electrolyte film 2 by the first application portion 307A, and furthermore, different catalyst inks 5 may be applied to the other side of the electrolyte film 2 by the second application portion 307B. Therefore, different catalyst layers 3 can be formed on one surface and the other surface of the electrolyte film 2.

Fifth Embodiment

Next, a fifth embodiment will be described. In the present embodiment, the same reference numerals are given to the same configurations as those of the above-described embodiments, and the description thereof is simplified or omitted. In addition, among the items described in the above-described embodiments, all the items applicable to the fifth embodiment may be applied in the fifth embodiment.

Figure 11:
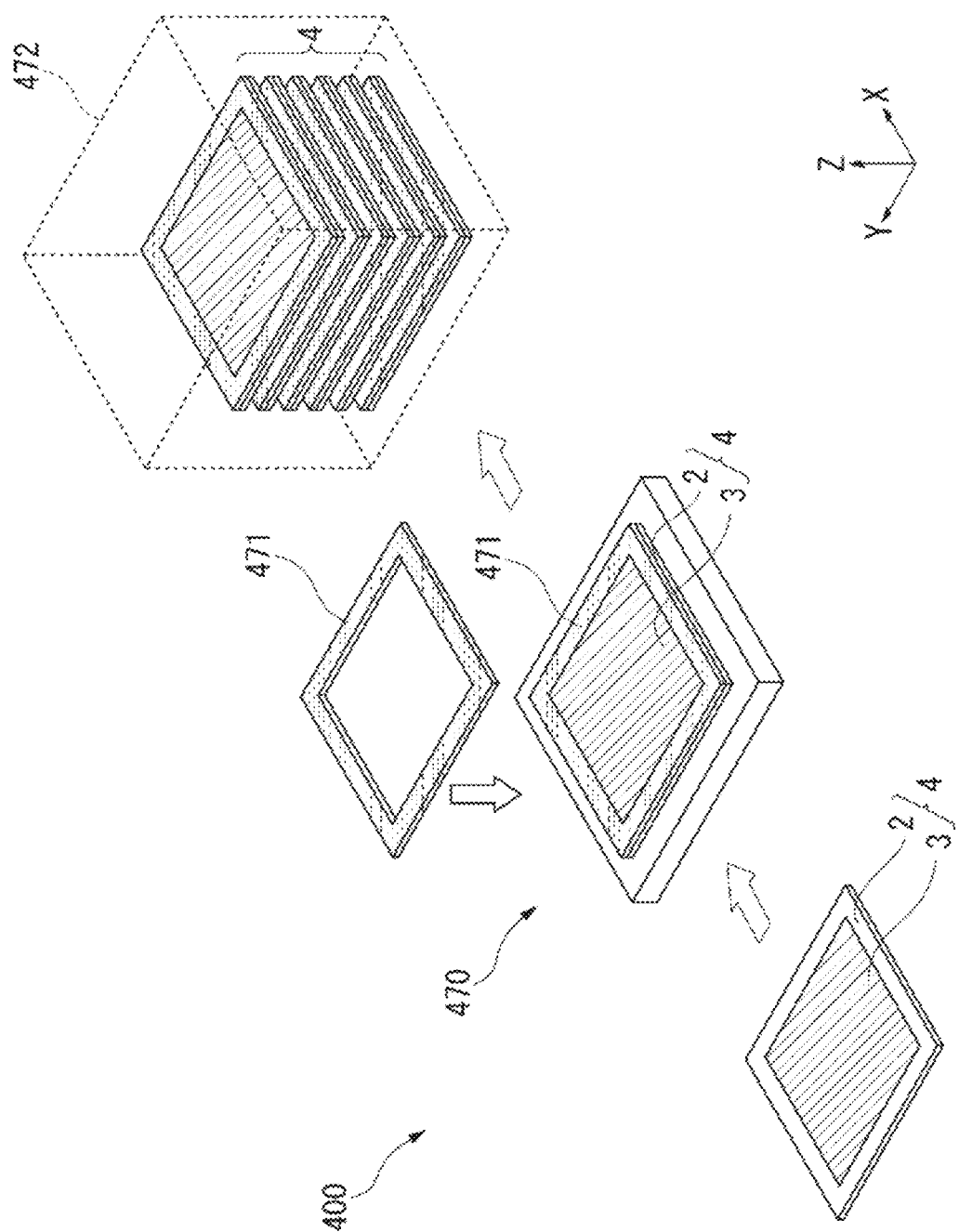
FIG. 11 is a view showing an example of a catalyst-layer forming apparatus according to a fifth embodiment.

FIG. 11 is a view showing an example of an apparatus 400 according to the fifth embodiment. The apparatus 400 forms a frame portion 471 on the laminated film 4. As shown in FIG. 11, the apparatus 400 includes a frame portion forming unit 470 and a laminated film storage portion 472. A process preceding the frame portion forming unit 470 is the same as that in the above-described embodiment, and the laminated film 4 in which the catalyst layer 3 is formed on the electrolyte film 2 is manufactured. The laminated film 4 thus manufactured is transported to the frame portion forming unit 470. The transporting the laminated film 4 may be manually carried out by an operator or by various transport devices.

The frame portion forming unit 470 forms the frame portion 471 on the laminated film 4. The frame portion 471 is formed so as to, for example, surround the catalyst layer 3 on the laminated film 4. For example, an outer edge of the frame portion 471 is formed substantially the same as the outer edge of the laminated film 4 and has an opening in an inner side thereof. A size of the opening of the frame portion 471 is set in accordance with, for example, the size of the catalyst layer 3. The frame portion 471 is used for improving rigidity of the laminated film 4. A material of the frame portion 471 is arbitrary, and for example, a metal material, glass, or the like is used in addition to a resin material having electrical insulation properties, and the like. A thickness of the frame portion 471 is set to, for example, several 10 μm to several 100 μm, but the thickness thereof is not particularly limited.

The frame portion 471 is formed so as not to overlap the catalyst layer 3, but the frame portion 471 may be formed to overlap with a part of the catalyst layer 3. In addition, the catalyst layer 3 is exposed more in the opening of the frame portion 471, by which the catalyst layer 3 can effectively function. A shape of the frame portion 471 is not limited to the shape surrounding the catalyst layer 3 as shown in the drawing, and the frame portion 471 may be formed in a part of the laminated film 4. For example, the frame portion 471 may be formed along one to three sides out of four sides of the outer edge of the laminated film 4. Furthermore, the frame portion 471 may have through holes such as a gas inlet and outlet holes used for a fuel cell or the like, screw holes or positioning holes used for assembling the frame portion 471, and the like.

The frame portion forming unit 470 forms the frame portion 471 by allowing the frame portion 471 prepared in advance to adhere to the laminated film 4. The frame portion forming unit 470 fixes the frame portion 471 to the laminated film 4 by applying an adhesive to an adhesion target surface of the frame portion 471 or a frame portion adhesion surface among the laminated film 4 by an adhesive application portion (not shown), and subsequently pressing the frame portion 471 against the laminated film 4. As an adhesive, an arbitrary adhesive is used. Alternatively, a part of the frame portion 471 may be melted and adhere to the laminated film 4 without using an adhesive. For alignment of the laminated film 4 and the frame portion 471, an alignment mark is formed on a part of the laminated film 4 (for example, apart on the electrolyte film 2 not having the catalyst layer 3), and the frame portion 471 may be aligned by recognizing the mark with an optical sensor or the like.

The laminated film storage portion 472 stores the laminated film 4 transported from the frame portion forming unit 470. The laminated film storage portion 472 may be stored in a state in which the laminated film 4 is laminated, or may have a shelf (slot) that can hold the laminated film 4 by one sheet or by a plurality of sheets. Whether or not to dispose the laminated film storage portion 472 is arbitrary, and the laminated film storage portion 472 may not be provided.

The frame portion 471 is formed on one surface of the laminated film 4 in the present embodiment, but the frame portion 471 may be formed on both surfaces of the laminated film 4. Furthermore, in the present embodiment, the frame portion 471 adheres to the laminated film 4, but the present invention is not limited thereto. For example, the frame portion 471 may be formed by applying a resin material having a thermosetting property or a photocurable property so as to surround the catalyst layer 3 on the upper surface of the laminated film 4 (for example, the upper surface of the electrolyte film 2), and appropriately curing the resin material.

As described above, according to the present embodiment, the frame portion 471 can be easily formed on the laminated film 4 by the frame portion forming unit 470. Furthermore, since the rigidity of the laminated film 4 is improved by the frame portion 471, even when the laminated film 4 is extremely thin to have a thickness of about over 10 μm for example, a subsequent handling property such as transport and assembly can be improved.

Sixth Embodiment

Next, a sixth embodiment will be described. In the present embodiment, the same reference numerals are given to the same configurations as those of the above-described embodiments, and the description thereof is simplified or omitted. In addition, among the items described in the above-described embodiments, all the items applicable to the sixth embodiment may be applied in the sixth embodiment.

FIG. 12 shows views showing examples of an apparatus 500 according to the sixth embodiment, in which FIG. 12(A) is a plan view seen from the +Z direction and FIG. 12(B) is a side view seen from the −Y direction. As shown in FIG. 12, the apparatus 500 is supplied as a roll R1 in which an elongated electrolyte film (application object) 2A is rolled up in a roll shape, and a laminated film 4A to be manufactured is formed as an elongated roll R2 which is rolled up in a roll shape. The electrolyte film 2A is the same as the electrolyte film 2 shown in FIG. 1 except that electrolyte film 2A is longer. The apparatus 500 includes the holding portion 6, an application portion 507, and a chamber portion 508.

The roll R2 is supported by a drive shaft which is rotationally driven by a drive device (not shown), and the electrolyte film 2A is transported in the +X direction by the rotation of the drive shaft. The roll R1 is supported by the driven shaft for example, and rotates in accordance with drawing out of the electrolyte film 2A. The roll R1 may be rotated so as to feed out the electrolyte film 2A in synchronization with the rotation of the roll R2. A rotation timing and a rotation speed of the roll R2 (transport timing and transport speed of the electrolyte film 2A) may be controlled by a control unit (not shown) or may be operated manually by an operator. Transporting the electrolyte film 2A is not limited to be performed by the rotation of the roll R2. For example, the electrolyte film 2A may be transported by a pair of driving rollers sandwiching the electrolyte film 2A on the +X side of the holding portion 6.

The holding portion 6 holds a part of the electrolyte film 2A drawn out from the roll R1. For example, the holding portion 6 is the same as the holding portion 6 shown in FIG. 1, and holds a part of the electrolyte film 2A by suction of the adsorption portion 15. The sheet member 24 as shown in FIG. 3 may be disposed between the holding portion 6 and the electrolyte film 2A. Rollers 562 and 563 are provided on the −X side and the +X side of the holding portion 6, respectively, so as to guide the elongated electrolyte film 2A. A height of the rollers 562 and 563 can be arbitrarily set, but for example, the height is set to be a height at which the electrolyte film 2A is transported substantially horizontally. In addition to the rollers 562 and 563, other rollers may be disposed. Whether or not to dispose the rollers 562 and 563 is arbitrary.

The application portion 507 applies the catalyst ink 5 to the electrolyte film 2 held by the holding portion 6. As same as the application portion 7 shown in FIG. 1, the application portion 507 includes the nozzle 31 having the discharge port 32 and the like. The application portion 507 is formed to be movable in the Y direction orthogonal to a transport direction of the electrolyte film 2A. For example, the application portion drive unit 40 of the first embodiment may be disposed in the Y direction and used for the movement of the application portion 507. The application portion 507 is movable between a facing position P501 at which the catalyst ink 5 can be applied to the electrolyte film 2A held by the holding portion 6 and a retreat position P502 set on the +Y side of the holding portion 6. The retreat position P502 may be set on the −Y side of the holding portion 6. Furthermore, the nozzle immersion portion 52 and the preliminary discharge portion 53 (refer to FIG. 1) which maintain the nozzles 31 may be disposed on the +X side of the holding portion 6.

The chamber portion 508 forms a space 555 including the holding portion 6. The chamber portion 508 includes a lid portion 557. The lid portion 557 is formed so as to be movable in the Z direction between a space forming position forming the space 555 and a holding portion opening position capable of applying the catalyst ink 5 to the electrolyte film 2A by the application portion 507. The movement of the lid portion 557 may be performed by a drive device (not shown) or by an operator. In a case where the movement of the lid portion 557 is performed by the drive device, a timing of the movement or the like may be controlled by a control portion (not shown) or may be operated manually by an operator.

In a case where the lid portion 557 is at the space forming position, a lower end of the lid portion 557 comes into close contact with an upper surface of the base portion 16 of the holding portion 6. At this time, both sides sandwiching an application region of the catalyst ink 5 in the electrolyte film 2A becomes a state of being sandwiched between the lid portion 557 and the base portion 16. An elastic member may be attached to the lower end of the lid portion 557. Thus, even in a case where the electrolyte film 2A is sandwiched, the sealed space 555 can be formed. The space 555 being depressurized by the suction portion 9 is the same as in the first embodiment. In addition, the lid portion 557 is not limited to move in the Z direction, but may be formed to be rotatable about, for example, the X direction as a shaft by using, for example, the hinge portion 58 as in the first embodiment.

In the present embodiment, whether or not to hold electrolyte film 2A by the holding portion 6 is arbitrary. The electrolyte film 2A is disposed over the rolls R1 and R2, and by rotating the roll R2 in a state where the rotation of the roll R1 is stopped, it is possible to apply a tension to the electrolyte film 2A. In this state, it is possible to apply the catalyst ink 5 to the electrolyte film 2A by the application portion 507. As described above, the mechanism for rotating one or both of the rolls R1 and R2 acts as a tension applying portion for the electrolyte film 2A. Furthermore, in the case of forming the space 555, since the electrolyte film 2A is sandwiched by the lid portion 557, holding of the electrolyte film 2A is performed during drying under reduced pressure.

Figure 13:
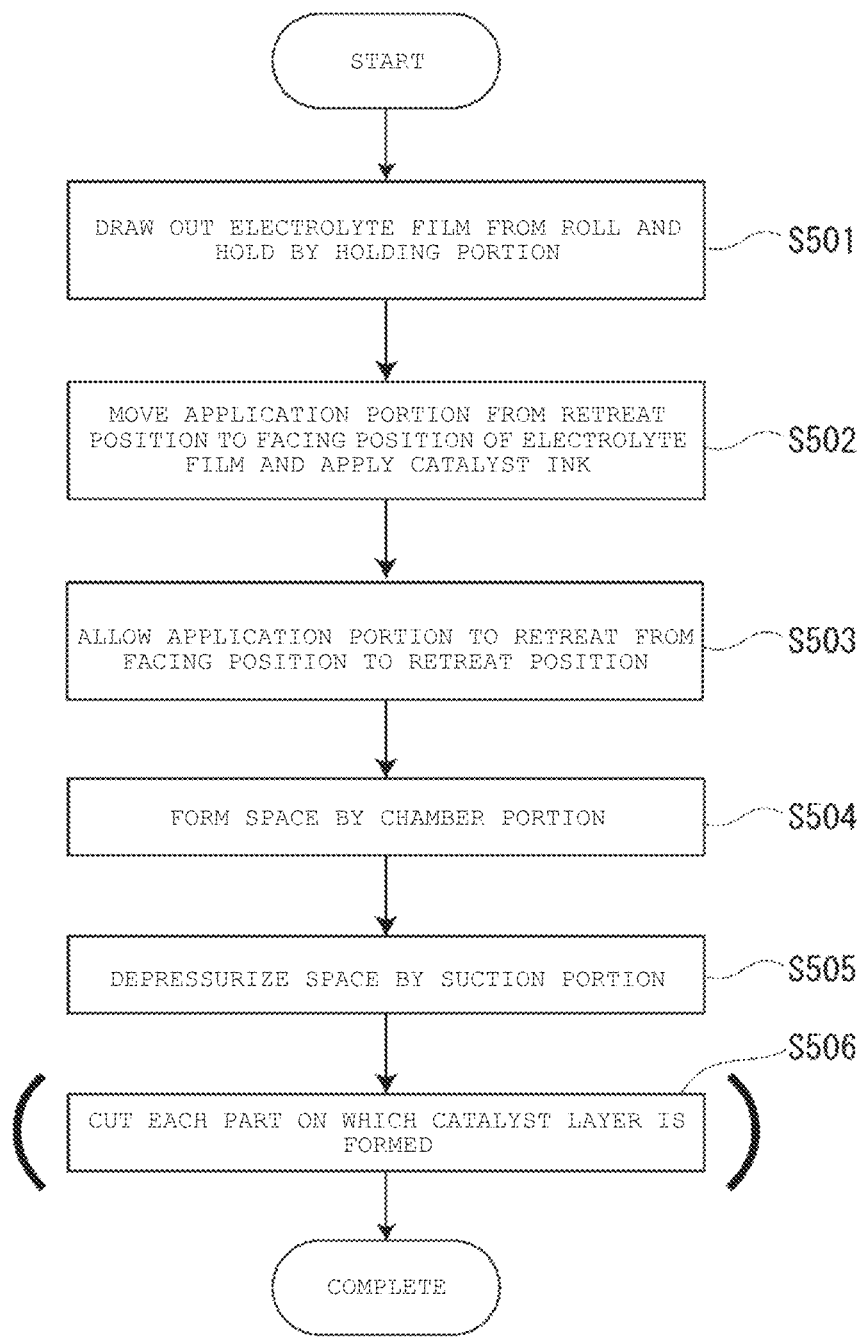
FIG. 13 is a flowchart showing another example of the catalyst-layer forming method.

Next, a method for manufacturing the laminated film 4 (a method for forming the catalyst layer 3) using the apparatus 500 will be described. FIG. 13 is a flowchart showing another example of the method for manufacturing the laminated film 4. FIG. 14(A) is a perspective view showing an example of the holding portion 6 and the application portion 507, and FIG. 14(B) is a perspective view showing another example of the holding portion 6 and the application portion 507. FIG. 15 shows examples of the chamber portion 508, FIG. 15(A) shows a perspective view, and FIG. 15(B) shows a side view seen from the −Y direction. FIG. 16 is a view showing an example of a cutting portion 580 and the operation thereof. FIGS. 14 to 16 are appropriately referred to while referring to the flowchart of FIG. 13.

First, the elongated electrolyte film 2A is disposed across the rolls R1 and R2. For example, a starting end of the electrolyte film 2A of the roll R1 is drawn out and attached to a drive shaft for forming the roll R2. Next, as shown in FIG. 13, the electrolyte film 2A is drawn out from the roll R1 by rotation of the roll R2, and a part thereof is held by the holding portion 6 (step S501). In this step S501, for example, the holding portion 6 holds the electrolyte film 2A by suctioning the membrane, as shown in FIG. 14(A). The holding portion 6 holds the electrolyte film 2A which is drawn out from the roll R1 to be in a spread state. The adsorption of the electrolyte film 2A may be carried out until after the depressurization of the space 555 described later is completed, or until after the application of the catalyst ink 5 by the application portion 507.

Next, as shown in FIG. 13, the catalyst ink 5 for forming the catalyst layer 3 is applied to at least one side of the held electrolyte film 2A by the application portion 507 (step S502). In the step S502, the application portion 507 moves from the retreat position P502 to the facing position P501, and the nozzle 31 moves in the Y direction as shown in FIG. 14(A), and therefore the catalyst ink 5 is applied to a predetermined region of the electrolyte film 2A. The application portion 507 may move the nozzle 31 in the Y direction to apply the catalyst ink 5 to a predetermined region of the electrolyte film 2A.

As an application portion 507A shown in FIG. 14(B), the catalyst ink 5 may be applied onto the electrolyte film 2A by utilizing that the electrolyte film 2A moves in the X direction without moving the nozzle 31 in the X direction and the Y direction. As shown in FIG. 14(B), the application portion 507A disposes the nozzle 31 on an upper side of a roller 564 for guiding the electrolyte film 2A. In the nozzle 31, the discharge port 32 is disposed in the Y direction along the roller 564. The nozzle 31 is disposed on the −X side of the holding portion 6 (the chamber portion 508) and is disposed on the upstream side of the holding portion 6 in a transport direction of the electrolyte film 2A. The nozzle 31 may be formed so as to be movable in the Z direction, and a gap between the nozzle 31 and the electrolyte film 2A may be adjustable. Furthermore, the nozzle immersion portion 52 and the preliminary discharge portion 53 (refer to FIG. 1) for maintaining the nozzles 31 may be disposed on the +Y side or the −Y side from the position of the nozzle 31 shown in the figures. In FIG. 14(B), the catalyst ink 5 is applied to a predetermined region of the electrolyte film 2A by transporting the electrolyte film 2A in the +X direction and discharging the catalyst ink 5 from the nozzle 31.

Next, as shown in FIG. 13, prior to forming the space 555 by the chamber portion 508, the application portion 507 retreats to the outside of the chamber portion 508 (step S503). This step S503 is performed by moving the application portion 507 toward the retreat position P502 in the +Y direction and allowing the application portion 507 to retreat to the outside of the chamber portion 508 as shown in FIG. 14(A), for example. In FIG. 14(B), since the application portion 507A is disposed to be separated from the holding portion 6, the application portion 507A is already in a state of completing the retreating.

Next, as shown in FIG. 13, the space 555 including the electrolyte film 2A to which the catalyst ink 5 is applied is formed by the chamber portion 508 (step S504). In the step S504, the lid portion 557 moves in the −Z direction and comes into contact with the upper surface of the base portion 16, and therefore the space 555 is formed as shown in FIGS. 15(A) and 15(B), for example. At this time, the electrolyte film 2A extending in the +X direction and the −X direction from the application region of the catalyst ink 5 is sandwiched between the lid portion 557 and the base portion 16. The chamber portion 508 forms the small space 555 surrounding the holding portion 6, and therefore a time required for depressurizing the space 555 can be shortened.

Next, as shown in FIG. 13, the space 555 is depressurized (step S505). This step S505 is performed by, after forming the space 555, suctioning the space 555 by driving the suction portion 9 as shown in FIG. 15(B), for example. By depressurizing the space 555, the catalyst ink 5 is dried to form the catalyst layer 3, and therefore the laminated film 4A is manufactured. When suctioning the space 555, a suction power with respect to the electrolyte film 2A may be set to be greater than a suction power with respect to the space 555. Thus, the electrolyte film 2A can be securely held by the holding portion 6. However, when depressurizing the space 555, whether or not to hold the electrolyte film 2A by the holding portion 6 is arbitrary. Furthermore, the suction portion 9 may gradually increase the suction power so as to depressurize the space 555. As a result, it is possible to suppress deformation of the catalyst ink 5 applied to the electrolyte film 2A due to the suction power. For example, in a case where the suction portion 9 performs a first suction for depressurizing the space 555 from an atmospheric pressure to a predetermined pressure, and then increases the suction power to be greater than that of the first suction so as to perform a second suction for depressurizing the space 555 to 1,000 Pa or less and preferably to 100 Pa or less, the above-described breakage due to the suction power with respect to the catalyst ink 5 is suppressed, the catalyst ink 5 is sufficiently dried, and therefore the porous catalyst layer 3 is formed with high accuracy. Whether or not that the suction portion 9 gradually increases the suction power to depressurizes the space 555 is arbitrary.

In FIG. 14(B), the application of the catalyst ink 5 is performed together with the transportation of the electrolyte film 2A (step S502), and when the applied catalyst ink 5 reaches a position P503, the transportation of the electrolyte film 2A stops. Subsequently, the electrolyte film 2A is suctioned and held by the holding portion 6. Whether or not to hold the electrolyte film 2A by the holding portion 6 is arbitrary. Subsequently, the lid portion 557 moves so as to surround the position P503 to form the space 555 (step S504), the inside of the space 555 is suctioned by the suction portion 9 and depressurized, by which the catalyst ink 5 is dried under reduced pressure (step S505). As shown in FIG. 14(B), since the application portion 507A does not reach the holding portion 6, it is not necessary to move the entire lid portion 557. For example, the lid portion 557 may be fixed on the base portion 16 of the holding portion 6, only an entrance portion of the electrolyte film 2A may be opened, and this opening may be opened and closed by a shutter or the like to form the space 555.

When applying the catalyst ink 5 or after applying the ink, and when drying the ink under reduced pressure or after drying the ink under reduced pressure in the space 555, the electrolyte film 2A is heated at a predetermined temperature by the heating portion 26 (refer to FIG. 12(B)). Therefore, a drying time of the catalyst ink 5 can be shortened. Whether or not to heat the electrolyte film 2A is arbitrary.

By the steps S501 to S505, the elongated laminated film 4A on which the catalyst layer 3 is formed on the elongated electrolyte film 2A at a predetermined gap, is formed, and by rolling this elongated laminated film 4A, the roll R2 is formed. The roll R2 is carried to another apparatus (for example, a fuel cell assembling apparatus or the like), and is appropriately cut for each catalyst layer 3 so as to be used as each laminated film 4. A case of forming the catalyst layer 3 to be multilayer is performed by repeating the above-described steps, and applying the catalyst ink 5 by overlapping the catalyst layer 3 of the laminated film 4A. In a case of forming the multilayer catalyst layer 3, different catalyst inks 5 may be used for each layer.

As shown in FIG. 13, the laminated film 4A may be cut for each part where the catalyst layer 3 is formed, instead of forming the roll R2 obtained by rolling the elongated laminated film 4A (step S506). However, whether or not to cut the laminated film 4A in the step S506 is arbitrary. As shown in FIG. 16, the apparatus 500 may include the cutting portion 580, and the laminated film 4A may be cut by the cutting portion 580 for each part where the catalyst layer 3 is formed.

As shown in FIG. 16(A), the cutting portion 580 includes a first holding portion 581, a second holding portion 582, a movable holder 583, and a pair of blade portions 584. The first holding portion 581 is formed in a bar shape extending in the Y direction and holds an end portion on the +X side of the laminated film 4A from a back surface side. The first holding portion 581 adsorbs and holds a part of the back surface of the laminated film 4A by suction, for example. The second holding portion 582 is disposed adjacent to the +X side of the first holding portion 581. The second holding portion 582 is formed in a rectangular plate shape and holds the laminated film 4A on which the catalyst layer 3 is formed. The second holding portion 582 adsorbs and holds the back surface of the laminated film 4A by suction, for example.

The movable holder 583 includes a rod 585 and a holder 586. The rod 585 is formed to be movable in the X direction by a guide (not shown), and moves in the X direction by a drive device (not shown). The holder 586 is formed at a −X side end portion of the rod 585. The holder 586 is formed so as to be able to hold a part of a +X side end portion of the laminated film 4 by sandwiching or adsorbing the film. The movable holder 583 moves between a position where the holder 586 can hold the end portion of the laminated film 4A held by the first holding portion 581 and a position where the laminated film 4A can be held by the second holding portion 582 by drawing out the laminated film 4A in the +X direction.

The pair of blade portions 584 cut the laminated film 4A held by the second holding portion 582. The pair of blade portions 584 are disposed on the −X side and the +X side of the second holding portion 582, respectively, and are formed to be movable in the Y direction along the guide (not shown). The pair of blade portions 584 retreat to the +Y side of the second holding portion 582, and move in the −Y direction along the guide by a drive device (not shown) so as to cut a predetermined part of the laminated film 4A. Instead of the pair of blade portions 584, a blade portion 584 may be formed at one position on the −X side of the second holding portion 582. Instead of the pair of blade portions 584, the laminated film 4A may be sandwiched in the Z direction so as to be cut.

Next, the step S506 will be described using the cutting portion 580. As shown in FIG. 16(A), the step starts from a state where the +X side end portion of the laminated film 4A is held by the first holding portion 581. Next, as shown in FIG. 16(B), the movable holder 583 moves the rod 585 in the −X direction and the +X side end portion of the laminated film 4 is held by the holder 586. Next, as shown in FIG. 16(C), after stopping the holding of the laminated film 4A by the first holding portion 581, the movable holder 583 moves in the +X direction while the laminated film 4A is held by the holder 586. Thereby, the laminated film 4A moves onto the second holding portion 582. Subsequently, the second holding portion 582 holds the laminated film 4 by suction or the like.

Next, as shown in FIG. 16(D), the movable holder 583 releases holding of the laminated film 4A, moves in the +X direction, and retreats from the second holding portion 582. Subsequently, the pair of blade portions 584 move in the −Y direction to cut the +X side and the −X side of the catalyst layer 3 of the laminated film 4 in the Y direction. That is, the elongated laminated film 4A becomes the laminated film 4 which is each portion to which the catalyst ink 5 is applied. Next, as shown in FIG. 16(E), after the pair of blade portions 584 move in the +Y direction and return to the original position, the movable holder 583 moves in the −X direction and holds the cut laminated film 4. Subsequently, after the holding of the laminated film 4 by the second holding portion 582 is released, the movable holder 583 moves in the +X direction, by which the laminated film 4 is transported in the +X direction and set at a predetermined position. The predetermined position may be, for example, a storage position of the laminated film 4. The movable holder 583 may move in the Y direction or the Z direction other than the X direction in order to move the laminated film 4 to a predetermined position for example.

As described above, according to the present embodiment, the roll R2 of the elongated laminated film 4A, or the laminated film 4 obtained by cutting the elongated laminated film 4A is formed by using the roll R1 obtained by rolling the electrolyte film 2A, and therefore it is possible to efficiently manufacture (form) the laminated films 4 and 4A (the catalyst layer 3). As in the first embodiment, since the application of the catalyst ink 5 to the drying under reduced pressure is performed in a short time, the porous catalyst layer 3 having high catalytic activity can be formed.

Seventh Embodiment

Next, a seventh embodiment will be described. In the present embodiment, the same reference numerals are given to the same configurations as those of the above-described embodiments, and the description thereof is simplified or omitted. In addition, among the items described in the above-described embodiments, all the items applicable to the seventh embodiment may be applied in the seventh embodiment.

FIG. 17 shows an example of an apparatus 600 according to the seventh embodiment, in which FIG. 17(A) is a perspective view showing an example of a holding portion 606 and FIG. 17(B) show a side view seen from the −Y direction. As shown in FIG. 17, the apparatus 600 includes a tension applying portion 688 and a table 616 as the holding portion 606. Other configurations are the same as those in each of the above-described embodiments, and the drawings thereof are omitted. The table 616 sets a part of the elongated electrolyte film 2A on an upper surface thereof. For example, a rectangular plate-shaped member is used as the table 616, and the table is connected to the suction portion 9 for suctioning a space (not shown). The table 616 may include the adsorption portion 15 and the suction portion 17 for adsorption shown in FIG. 1.

The tension applying portion 688 includes a roller 662 and a roller 663. The rollers 662 and 663 are disposed on the −X side and +X side of the table 616, respectively. Furthermore, the rollers 662 and 663 are all disposed on the −Z side from the upper surface of the table 616. As a result, the tension applying portion 688 applies a tension to the electrolyte film 2A on the table 616 by the roller 662 and the roller 663 such that a part of the electrolyte film 2A is held on the table 616 (on the holding portion 606).

Each of the rollers 662 and 663 may be a pair of rollers sandwiching the electrolyte film 2A. In this case, each of the rollers 662 and 663 may be rotationally driven by a drive device (not shown). In a case where each of the rollers 662 and 663 is rotationally driven, by driving in a direction in which the electrolyte film 2A is fed in the +X direction with respect to the roller 663, and driving in a direction in which the electrolyte film 2A returns to the −X direction with respect to the roller 662, a tension can be further applied to the electrolyte film 2A on the table 616. In order to reduce friction with the electrolyte film 2A, an inclined surface, a curved surface, a roller, or the like may be formed at an end portion on the −X side and the +X side of the table 616. Furthermore, the application of the tension to the electrolyte film 2A by the tension applying portion 688 is performed from the application of the catalyst ink 5 until the drying under the reduced pressure is completed.

As described above, according to the present embodiment, the application of the catalyst ink 5 and the drying under reduced pressure are performed in a state where the tension is applied by the tension applying portion 688, and therefore deformation of the electrolyte film 2A can be suppressed. Furthermore, since the holding portion 606 can hold the electrolyte film 2A by the tension applying portion 688, the suction portion 17 for adsorption and the adsorption portion 15 for holding the electrolyte film 2A are unnecessary, and therefore the apparatus cost can be reduced.

Eighth Embodiment

Next, an eighth embodiment will be described. In the present embodiment, the same reference numerals are given to the same configurations as those of the above-described embodiments, and the description thereof is simplified or omitted. In addition, among the items described in the above-described embodiments, all the items applicable to the eighth embodiment may be applied in the eighth embodiment.

FIG. 18 is a view showing an example of an apparatus 700 according to the eighth embodiment, in which FIG. 18(A) is a perspective view showing an example of a frame portion forming unit and FIG. 18(B) is a flowchart showing an example of the operation thereof. As shown in FIG. 18(A), the apparatus 700 includes a frame portion forming unit 770 and a cutting portion 780. The frame portion forming unit 770 forms the frame portion 471 (refer to FIG. 11) in the elongated laminated film 4A so as to surround each of the catalyst layers 3. A process preceding the frame portion forming unit 770 is the same as that in the above-described embodiment, and the elongated laminated film 4A in which the catalyst layer 3 is formed on the elongated electrolyte film 2A is manufactured. The laminated film 4A thus manufactured is transported to the frame portion forming unit 770. The laminated film 4 may be transported by various transport devices. Furthermore, the configuration of the frame portion forming unit 770 is the same as that of the frame portion forming unit 470 shown in FIG. 11, and for example, a configuration in which the frame portion 471 adheres to the laminated film 4A is adopted.

The cutting portion 780 cuts the laminated film 4A on which the frame portion 471 is formed for each part on which the frame portion 471 is formed. The cutting portion 780 is disposed on the +X side of the frame portion forming unit 770, and is formed to be movable in the Y direction along the guide (not shown). The cutting portion 780 retreats to the +Y side of the frame portion forming unit 770, and cuts a predetermined part of the laminated film 4A by moving in the −Y direction along the guide by a drive device (not shown). The cutting portion 780 may cut the laminated film 4A by sandwiching the film in the Z direction, instead of moving in the Y direction to cut the laminated film 4A.

By using this apparatus 700, implementation of the flowchart of FIG. 18(B) becomes possible. In the flowchart of FIG. 13 above, the catalyst ink 5 is dried under reduced pressure in the step S505 to form the catalyst layer 3, but in the present embodiment, the following processes are added subsequent to the step S505.

As shown in FIG. 18(B), subsequent to the step S505, the frame portion 471 is formed on the laminated film 4A (step S708). The elongated laminated film 4A is transported in the +X direction and sequentially transported to the frame portion forming unit 770, and therefore the frame portion 471 is formed so as to surround each catalyst layer 3. Next, as shown in FIG. 18(B), by moving the cutting portion 780 in the −Y direction with respect to the laminated film 4A transported from the frame portion forming unit 770 to the +X side, the laminated film 4A is cut for each frame portion 471 (step S709). The laminated film 4A transported to the +X side from the frame portion forming unit 770 may be held when cutting the film by the cutting portion 780.

The cut laminated film 4 is transported to a predetermined storage position or other apparatus by various transport devices or the like. When storing the laminated film 4, the laminated film 4 may be stored in a stacked state as in the laminated film storage portion 472 shown in FIG. 11, or the laminated film 4 may be stored in a shelf (slot) that can store the laminated film by one sheet or by a plurality of sheets. Whether or not to cut the laminated film 4A on which the frame portion 471 is formed is arbitrary. Accordingly, the apparatus 700 may not have the cutting portion 780. In a case where the laminated film 4A is not cut, the laminated film 4A on which the frame portion 471 is formed may be stored in a folded state.

As described above, according to the present embodiment, since the frame portion 471 is formed on the elongated laminated film 4A, it is possible to efficiently form the frame portion 471 in a short time. Furthermore, similarly to the fifth embodiment, the rigidity of the laminated film 4 is improved by the frame portion 471, and therefore a subsequent handling property such as transport and assembly can be improved.

Ninth Embodiment

Next, a ninth embodiment will be described. In the present embodiment, the same reference numerals are given to the same configurations as those of the above-described embodiments, and the description thereof is simplified or omitted. In addition, among the items described in the above-described embodiments, all the items applicable to the ninth embodiment may be applied in the ninth embodiment.

FIG. 19 shows examples of a catalyst-layer forming apparatus according to the ninth embodiment, in which FIG. 19(A) is an enlarged view of the laminated film 4A seen from the +Z direction and FIG. 19(B) is a side view of an apparatus 800 seen from the −Y direction. The apparatus 800 according to the ninth embodiment has substantially the same configuration as the apparatus 500 shown in FIG. 12. In the present embodiment, the method for forming the catalyst layer 3 on the other surface as well as one surface of the elongated laminated film 4A is shown.

As shown in FIG. 19(A), a mark M is formed for each catalyst layer 3 in the elongated laminated film 4A. A positional relationship of the mark M with respect to each catalyst layer 3 is determined in advance. Any shape, color, and the like can be applied to the mark M as long as the mark can be detected by a detection device such as a non-contact sensor such as an optical type and a contact type sensor such as a contact type probe. Furthermore, the mark M may be a through hole formed in a part of the laminated film 4A. Furthermore, the mark M may be formed in a part of the catalyst layer 3. The mark M may be formed by using a dedicated mark-forming device, or the mark M may be formed by applying the catalyst ink 5 by the application portion 507. Furthermore, instead of being formed on the surface on which the catalyst layer 3 is formed, the mark M may be formed on a surface on which the catalyst layer 3 is not formed.

As shown in FIG. 19(A), the elongated laminated film 4A having the catalyst layer 3 formed on one surface of the elongated electrolyte film 2A is disposed on the supply side of the apparatus 800 as the roll R2. The laminated film 4A is drawn out in the X direction in a state where the other surface on which the catalyst layer 3 is not formed faces toward the +Z direction (upward). Furthermore, the apparatus 800 includes a detection device (not shown) for detecting the mark M. In a case where the mark M is recognized, the detection device transmits a recognition result to a control unit (not shown), for example. The control unit judges a position of the catalyst layer 3 on the −Z plane based on the recognition result and controls the transportation of the laminated film 4A so that the holding portion 6 is aligned with the position of the catalyst layer 3.

Subsequently, after the laminated film 4A is held by the holding portion 6, the catalyst ink 5 is applied to the +Z side surface of the laminated film 4A by the application portion 507, the catalyst ink 5 is dried under reduced pressure by the chamber portion 508, and therefore the catalyst layer 3 is formed. As a result, an elongated laminated film 4B having the catalyst layer 3 on both the +Z surface side and the −Z surface side sandwiching the electrolyte film 2A is formed. The elongated laminated film 4B may be transported in the +X direction and rolled as a roll R3, or may be appropriately cut for each part where the catalyst layer 3 is formed as shown in FIG. 16.

In the laminated film 4B, the same catalyst layer 3 may be formed on the +Z surface side and the −Z surface side by the same catalyst ink 5, or a different catalyst layer 3 may be formed by the different catalyst ink 5. In the above description, an application position of the catalyst ink 5 is controlled by detecting the mark M, but the present invention is not limited thereto. For example, in a case where the catalyst layer 3 formed earlier can be recognized from the +Z surface side, the application position of the catalyst ink 5 may be controlled by detecting an edge of the catalyst layer 3 by the detection device or the like. Furthermore, instead of controlling the application position of the catalyst ink 5 by the control unit using the detection device (not shown), an operator may set the application position of the catalyst ink 5 by visual inspection or the like.

As described above, according to the present embodiment, the catalyst layer 3 can be efficiently formed on both surfaces of the elongated electrolyte film 2A. The catalyst layers 3 formed on both surfaces of the electrolyte film 2A are not limited to have the same size (area), and may have different sizes. A size of each catalyst layer 3 is set to the same or different sizes by respectively setting the application region by the application portion 507.

Tenth Embodiment

Next, a tenth embodiment will be described. In the present embodiment, the same reference numerals are given to the same configurations as those of the above-described embodiments, and the description thereof is simplified or omitted. In addition, among the items described in the above-described embodiments, all the items applicable to the tenth embodiment may be applied in the tenth embodiment.

FIG. 20(A) is a view showing an example of a laminated film 4C according to the tenth embodiment, and FIG. 20(B) is a view showing an example of a laminated film 4D according to another example. FIG. 21(A) is a view showing an example of the laminated film 4D according to still another example, FIG. 21(B) is a view showing an example of a laminated film 4E according to still another example, and FIG. 21(C) is a view showing a laminated film 4F according to still another example. As shown in FIG. 20(A), the electrolyte film 2 has a base material sheet S that can be peeled off toward the −Z surface side. The electrolyte film 2 may be any one of an electrolyte film which is formed by joining the electrolyte film 2 prepared in advance with the base material sheet S with an adhesive, electrostatic force, or the like, and an electrolyte film in which a liquid for forming the electrolyte film 2 is applied to the base material sheet S, the liquid is dried or the like so as to form the electrolyte film 2 on the base material sheet S. Each of the embodiments described above can be applied to a unit for forming the catalyst layer 3 on the +Z surface side of this electrolyte film 2.

The laminated film 4C having the catalyst layer 3 formed on the electrolyte film 2 has a three-layer structure of the base material sheet S, the electrolyte film 2, and the catalyst layer 3 in order from the −Z side. The frame portion 471 as shown in FIG. 11 may be formed on the +Z surface side of the electrolyte film 2. As shown in FIG. 20(A), the laminated film 4C becomes the laminated film 4 usable for a fuel cell by peeling off the base material sheet S on the back surface. As the base material sheet S, a sheet of any material can be used as long as the sheet can be peeled from the electrolyte film 2. For example, a resin sheet such as a polytetrafluoroethylene (PTFE) sheet, a polyethylene terephthalate (PET) sheet, and a polyester sheet can be used.

In the present embodiment, peeling of the base material sheet S may be performed by using a dedicated peeling device, or may be performed manually by an operator. In the present embodiment, the laminated film 4C may be stored in a state of having the base material sheet S, or the laminated film 4C may be stored in a state where the base material sheet S is peeled off from each laminated film 4C.

As shown in FIG. 20(B), the elongated electrolyte film 2A includes an elongated base material sheet SA peelable toward the −Z surface side and may be supplied as a roll R4. Similarly to the above description, the electrolyte film 2A may be any one of an electrolyte film which is formed by joining the elongated electrolyte film 2A prepared in advance with the base material sheet SA, and an electrolyte film in which a predetermined liquid is applied to the elongated base material sheet SA so as to form the electrolyte film 2A. Each of the embodiments described above can be applied to a unit for forming the catalyst layer 3 on the +Z surface side of the electrolyte film 2A drawn out from the roll R4. A material of the base material sheet SA is the same as that of the base material sheet S described above.

The elongated laminated film 4D in which the catalyst layer 3 is formed on the electrolyte film 2A has a three-layer structure of the base material sheet SA, the electrolyte film 2A, and the catalyst layer 3 in order from the −Z side on a part where the catalyst layer 3 is formed. The frame portion 471 may be formed for each catalyst layer 3 on the +Z surface side of the electrolyte film 2A as shown in FIG. 18(A). As shown in FIG. 20(B), in the laminated film 4D, the base material sheet SA is continuously peeled off from the electrolyte film 2A at a part of a transport path. A wedge-shaped member is disposed at a position from which the base material sheet SA is peeled off, and the base material sheet SA may be peeled off by this wedge-shaped member. The peeled base material sheet SA is rolled up to form a roll R5. This roll R5 is a roll obtained by winding the base material sheet SA, and can be reused by, for example, forming the electrolyte film 2A again.

The laminated film 4D from which the base material sheet SA is peeled off is rolled up as the laminated film 4A to form the roll R2. The laminated film 4D may be cut for each catalyst layer 3 before peeling off the base material sheet SA. The laminated film 4D is cut for each catalyst layer 3, and thus becomes the laminated film 4C shown in FIG. 20(A). Furthermore, the laminated film 4D may be rolled up to form a roll without peeling off the base material sheet SA.

Furthermore, as shown in FIG. 21(A), from the elongated electrolyte film 2A having the elongated base material sheet SA on one surface, the base material sheet SA may be peeled off before forming the catalyst layer 3. Furthermore, after forming the catalyst layer 3, the elongated electrolyte film 2A may be laminated with the elongated base material sheet SA that can be peeled off.

For example, as shown in FIG. 21(A), the elongated electrolyte film 2A having the elongated base material sheet SA peelable toward the −Z surface side is supplied as the roll R4, and is transported in the +X direction. In the electrolyte film 2A having the base material sheet SA, the base material sheet SA is continuously peeled off from the electrolyte film 2A at a part of the transport path before forming the catalyst layer 3, and the electrolyte film is rolled up to form the roll R5. Peeling of the base material sheet SA may be performed by the wedge-shaped member disposed at a position from which the base material sheet SA is peeled off.

After the electrolyte film 2A from which the base material sheet SA has been peeled off is held by the holding portion 6, the catalyst ink 5 is applied to the surface on the +Z side by the application portion 507. The catalyst ink 5 is dried under reduced pressure by the chamber portion 508 so as to form the catalyst layer 3, and therefore the elongated laminated film 4A is formed.

In the elongated laminated film 4A on which the catalyst layer 3 is formed on the electrolyte film 2A, the base material sheet SA at a part of the transport path after forming the catalyst layer 3 is continuously formed on the surface on the −Z side of the laminated film 4A. The base material sheet SA is supplied, for example, as the roll R5 disposed on the +X side of the holding portion 6 or the like, and is transported in the +X direction. In this base material sheet SA, a release agent is applied to a surface (the +Z surface side of the base material sheet SA) facing the −Z surface side of the laminated film 4A by a coating applicator (not shown), and then the base material sheet is transported to a pair of press rollers PR1 and PR2. As the release agent, for example, silicon oxide-, fluorine-, or silicone-based release agent is used from the viewpoint of peelability. The laminated film 4A is transported to the pair of press rollers PR1 and PR2 so as to be positioned on the +Z surface side of the base material sheet SA. The base material sheet SA is laminated to the −Z surface side of the laminated film 4A by the pair of press rollers PR1 and PR2 sandwiching the transported laminated film 4A and the base material sheet SA from the +Z side and −Z side, and therefore the elongated laminated film 4D is formed. The laminated film 4D has a three-layer structure of the base material sheet SA, the electrolyte film 2A, and the catalyst layer 3 in order from the −Z side at a part where the catalyst layer 3 is formed. The elongated laminated film 4D is rolled up to form a roll R6 without peeling off the base material sheet SA.

The lamination of the base material sheet SA on the laminated film 4A can be carried out without using the release agent as long as the laminated film 4A and the base material sheet SA are made of a material that can be laminated and peeled off without using the release agent. Furthermore, the laminated film 4D may be cut for each catalyst layer 3. In this case, the laminated film 4D is cut for each catalyst layer 3, and thus the laminated film 4C shown in FIG. 20(A) is obtained. Furthermore, the elongated laminated film 4A on which the catalyst layer 3 is formed on the electrolyte film 2A may be rolled up to form the roll R2 without forming the base material sheet SA, or the laminated film may be cut for each catalyst layer 3 without laminating the base material sheet SA to form a sheet of the laminated film 4. Furthermore, the lamination of the base material sheet SA on the laminated film 4A may be performed on the surface on which the catalyst layer 3 is formed (the surface on the +Z side of the laminated film 4A).

Furthermore, as shown in FIG. 21(B), as the elongated electrolyte film 2A, a membrane having the elongated base material sheet SAs that can be peeled off on the +Z surface side and the −Z surface side may be used. Furthermore, in the elongated electrolyte film 2A, the base material sheet SAs may be laminated to the +Z surface side and the −Z surface side of the laminated film 4A after forming the catalyst layer 3.

For example, as shown in FIG. 21(B), the elongated electrolyte film 2A having the peelable elongated base material sheet SAs on the +Z surface side and the −Z surface side is supplied as a roll R7 and transported in the +X direction. From the electrolyte film 2A having the base material sheet SAs on the +Z surface side and the −Z surface side, the base material sheet SAs provided on the +Z surface side and the −Z surface side of the electrolyte film 2A are continuously peeled off from the electrolyte film 2A at a part of the transport path before forming the catalyst layer 3, and are rolled up to form the roll R5s, respectively. Peeling of the base material sheet SA may be performed by the wedge-shaped member disposed at a position from which the base material sheet SA is peeled off.

The electrolyte film 2A from which the base material sheet SAs provided on the +Z surface side and the −Z surface side have been peeled off, is held by the holding portion 6, and then the catalyst ink 5 is applied to the +Z side surface by the application portion 507, the catalyst ink 5 is dried under reduced pressure by the chamber portion 508 so as to form the catalyst layer 3, and therefore the elongated laminated film 4A is formed.

On the elongated laminated film 4A having the catalyst layer 3 formed on the electrolyte film 2A, the base material sheet SAs are continuously laminated to the +Z side surface and the −Z side surface of the laminated film 4A at a part of the transport path after forming the catalyst layer 3. The base material sheet SAs laminated to the +Z side surface and the −Z side surface of the laminated film 4A are supplied, for example, as two rolls R5 disposed on the +X side of the holding portion 6 and the like, and are transported in the +X direction. The release agent is applied to the surface facing the +Z side or the −Z side surface of the laminated film 4A of each of the base material sheet SAs transported from the two rolls R5 by a coating applicator (not shown), and then the base material sheets are transported to the pair of press rollers PR1 and PR2. The laminated film 4A is transported to the pair of press rollers PR1 and PR2 so as to be positioned between the two base material sheet SAs. The pair of press rollers PR1 and PR2 sandwich the transported laminated film 4A and the two base material sheet SAs from the +Z side and the −Z side so as to laminate the base material sheet SA on the +Z surface side and the −Z surface side of the laminated film 4A, and therefore the laminated film 4E is formed. The laminated film 4E has a four-layer structure of the base material sheet SA, the electrolyte film 2A, the catalyst layer 3, and the base material sheet SA in order from the −Z side at a part where the catalyst layer 3 is formed. The elongated laminated film 4E is rolled up to form a roll R8 without peeling off the base material sheet SA. The laminated film 4E may be cut for each catalyst layer 3. In this case, the laminated film 4E is cut for each catalyst layer 3, and therefore the laminated film 4F shown in FIG. 21(C) having the base material sheet SAs on the +Z side and the −Z side is obtained.

As described above, according to the present embodiment, the peelable base material sheets S and SA are laminated to the electrolyte films 2 and 2A, the rigidity is applied to the electrolyte films 2 and 2A by the base material sheets S and SA, and therefore a handling property such as transportation can be improved. Furthermore, since the base material sheets S and SA cover the electrolyte films 2 and 2A, damage or adhesion of dust on the electrolyte films 2 and 2A can be suppressed. In the present embodiment, each one of the base material sheets S and SA is laminated to the electrolyte films 2 and 2A, but two or more base material sheets S and SA may be laminated thereto. In addition, in order to ease the peeling from the electrolyte films 2 and 2A, the base material sheets S and SA may be formed such that a part thereof protrudes from the electrolyte films 2 and 2A. In a case where the base material sheet SA is laminated to the surface on which the catalyst layer 3 is formed (+Z side surface of the laminated film 4A), a sheet-shaped separator or a gas diffusion layer may be used instead of the peelable base material sheet SA, and the separator or the gas diffusion layer may be laminated so as to be in close contact with the catalyst layer 3. As a result, a cell of a fuel cell can be manufactured easily.

Eleventh Embodiment

Next, an eleventh embodiment will be described. In the present embodiment, the same reference numerals are given to the same configurations as those of the above-described embodiments, and the description thereof is simplified or omitted. In addition, among the items described in the above-described embodiments, all the items applicable to the eleventh embodiment may be applied in the eleventh embodiment.

FIG. 22 shows an example of the catalyst layer according to the eleventh embodiment. As shown in FIG. 22(A), a peeling sheet F is prepared as an application object for forming the catalyst layer 3. As the peeling sheet F, it is possible to use, for example, a fluorine-based resin such as ethylene tetrafluoroethylene copolymer (ETFE), tetrafluoroethylene-hexafluoropropylene copolymer (FEP), tetrafluoroperfluoroalkyl vinyl ether copolymer (PFA), and polytetrafluoroethylene (PTFE), a polymer sheet or polymer film such as polyimide, polyethylene terephthalate, polyamide (nylon), polysulfone, polyethersulfone, polyphenylene sulfide, polyether/ether ketone, polyether imide, polyarylate, and polyethylene naphthalate, nonwoven fabric, and the like.

A release layer Q may be formed on the +Z side surface of the peeling sheet F. As the release layer Q, silicon oxide-, fluorine-, or silicone-based release agent and the like are formed by a known method such as a chemical vapor deposition method, a physical vapor deposition method, or the like, from the viewpoint of peelability. However, in a case where the peeling sheet F has peelability, it is not necessary to form the release layer Q.

Next, as shown in FIG. 22(B), the catalyst ink 5 is applied from the nozzle 31 onto the peeling sheet F (release layer Q). For the application of the catalyst ink 5, the application portion 7 and the like of each of the embodiments described above can be applied. Next, as shown in FIG. 22(C), the peeling sheet F to which the catalyst ink 5 is applied is stored in the chamber portion 8, and by depressurizing the chamber portion in the same manner as described above, the catalyst ink 5 is dried under reduced pressure. Therefore, a transfer sheet T including the catalyst layer 3 on the peeling sheet F is formed.

Next, a method for forming the laminated film 4 using the transfer sheet T formed as described above will be described. FIG. 23 shows an example of transferring the catalyst layer 3 of the peeling sheet F to the electrolyte film 2. As shown in FIG. 23(A), the transfer sheet T is set on a lower mold HP1 of a hot press HP in a state where the catalyst layer 3 faces the +Z side. The electrolyte film 2 is set on the transfer sheet T. The transfer sheet T is set on the electrolyte film 2 in a state where the catalyst layer 3 faces the −Z side. Therefore, the laminate of two transfer sheets T and the electrolyte film 2 is in a state where the catalyst layer 3 is in contact with each of the +Z side and the −Z side of the electrolyte film 2. Subsequently, a heating device His driven to heat the lower mold HP1 and an upper mold HP2, and this laminate is sandwiched so as to be pressurized between the lower mold HP1 and the upper mold HP2 while being heated.

A pressure applied to the laminate by the hot press HP is appropriately selected depending on components of the electrolyte film 2 and the catalyst layer 3, but is generally set to be within a range of 1 to 10 MPa, a range of 1 to 6 MPa, and a range of 2 to 5 MPa. A pressurization time is appropriately selected depending on a temperature and a pressure at the time of pressurization, and is set to be within a range of 1 to 20 minutes, a range of 3 to 20 minutes, and a range of 5 to 20 minutes, for example.

By heating and pressurizing the laminate by the hot press HP, each catalyst layer 3 is joined to the electrolyte film 2 as shown in FIG. 23(B). Next, as shown in FIG. 23(C), by peeling off the peeling sheet F from the transfer sheet T, the laminated film 4 on which the catalyst layer 3 is formed on each of the +Z side and the −Z side of the electrolyte film 2 is formed.

In the above description, the laminated film 4 on which the catalyst layer 3 is formed on each of the +Z side and the −Z side of the electrolyte film 2 is formed, but the laminated film may be a film on which the catalyst layer 3 is formed on any one surface of the +Z side and the −Z side of the electrolyte film 2. In this case, the electrolyte film 2 and one transfer sheet T are sandwiched by the hot press HP. In addition, it is not limited to form the catalyst layer 3 on the +Z side and the −Z side of the electrolyte film 2 at the same time. For example, first, the catalyst layer 3 may be formed on the +Z side of the electrolyte film 2 by using the hot press HP, and then the catalyst layer 3 may be formed on the −Z side of the electrolyte film 2.

A method for joining the catalyst layer 3 to the electrolyte film 2 is not limited to the use of the hot press HP, and for example, hot roll pressing, ultrasonic fusion bonding, or the like may be used. However, in a case of using the hot press HP, it is possible to secure in-plane uniformity in joining the electrolyte film 2 to the catalyst layer 3. Furthermore, as the method for joining the catalyst layer 3 to the electrolyte film 2, another method such as using a joint material may be adopted.

As described above, according to the present embodiment, it is possible to easily and reliably form the catalyst layer 3 having high catalytic activity on the peeling sheet F. By using the transfer sheet T having the catalyst layer 3, the catalyst layer 3 can be easily transferred to the electrolyte film 2, and the laminated film 4 exhibiting high performance can be easily formed.

Twelfth Embodiment

Next, a twelfth embodiment will be described. In the present embodiment, the same reference numerals are given to the same configurations as those of the above-described embodiments, and the description thereof is simplified or omitted. In addition, among the items described in the above-described embodiments, all the items applicable to the twelfth embodiment may be applied in the twelfth embodiment.

FIG. 24 shows an example of the catalyst layer according to the twelfth embodiment. As shown in FIG. 24(A), an elongated peeling sheet FA is prepared as an application object for forming the catalyst layer 3. The peeling sheet FA is provided as a roll R9 in a rolled state, and is appropriately drawn out in the +X direction. The release layer Q which is the same as the peeling sheet F described above may be formed on an upper surface (surface on which the catalyst layer 3 is formed) of the peeling sheet FA.

For example, as same as the apparatus 500 of the sixth embodiment shown in FIGS. 12 to 15, the catalyst ink 5 is applied from the nozzle 31 to a part of the peeling sheet FA, the catalyst ink 5 is dried under reduced pressure by the chamber portion 508, and therefore the catalyst layer 3 is formed. After forming the catalyst layer 3, the peeling sheet FA is transported in the +X direction, the next catalyst layer 3 is thus formed, and such operation is repeated. As a result, an elongated transfer sheet TA on which a plurality of catalyst layers 3 are formed on the elongated peeling sheet FA while having a constant gap or different gaps therebetween, is formed.

As shown in FIG. 24(A), the elongated transfer sheet TA is rolled up to the +X side of the chamber portion 508 to form a roll R10. The transfer sheet TA may be cut for each catalyst layer 3 to form a sheet of the transfer sheet T (refer to FIG. 22(C)). A method for forming the laminated film 4 by using the sheet of the transfer sheet T is the same as the method shown in FIG. 23 described above. For example, a mechanism same as that of the cutting portion 780 shown in FIG. 18 may be applied to a mechanism for cutting the sheet for each sheet.

Next, a method for forming the laminated film 4E using the transfer sheet TA formed as described above will be described. FIG. 24(B) shows an example of transferring the catalyst layer 3 of the peeling sheet FA to the elongated electrolyte film 2A. As shown in FIG. 24(B), the elongated electrolyte film 2A is transported toward the +X side. Roll R10s are disposed on each of the +Z side and the −Z side of the electrolyte film 2A, and the transfer sheet TA is drawn out from each roll R10 and is disposed in a state of being laminated on the +Z side and the −Z side of the electrolyte film 2A.

Subsequently, the electrolyte film 2A and the two transfer sheet TAs move in the +X direction to pass between a roller RP1 and a roller RP2 of the hot roll press, and therefore the catalyst layer 3 of each transfer sheet TA is joined to the electrolyte film 2A so as to form an elongated laminated film 4G. The peeling sheet FA remains on the laminated film 4G. The rollers RP1 and RP2 may be heated to a predetermined temperature by a heating device (not shown) or the like. Furthermore, instead of using the hot roll press, for example, the hot press HP as shown in FIG. 23(A) may be used. In this case, each catalyst layer 3 is sequentially disposed on the hot press HP, and heating and pressurization are performed by the hot press HP.

The elongated laminated film 4G formed as described above is rolled up to the +X side of the rollers RP1 and RP2 to form a roll R11. In this case, since the peeling sheet FA remains on the transfer sheet TA, it is possible to prevent the catalyst layers 3 from coming into contact with each other and to store the layers in the state of the roll R11. The laminated film 4G formed as described above is not limited to the roll R11.

FIG. 25 is a view showing another example of a state in which the catalyst layer 3 is joined to the elongated electrolyte film 2A. As shown in FIG. 25(A), the elongated laminated film 4G is cut for each catalyst layer 3 at the +X side of the rollers RP1 and RP2 by a cutting portion CU, and therefore a sheet of a laminated film 4H is obtained. A part of the peeling sheet FA remains on the laminated film 4H. Therefore, it is possible to prevent the catalyst layers 3 from coming into contact with each other even in a case where the laminated film 4H is stacked to be stored. A configuration same as, for example, the configuration of the cutting portion 580 shown in FIG. 16 may be adopted as a configuration of the cutting portion CU.

As shown in FIG. 25(B), from the elongated laminated film 4G, the peeling sheet FAs of the two transfer sheet TAs may be peeled off at the +X side of the rollers RP1 and RP2 so as to form an elongated laminated film 4I. The elongated laminated film 4I may be cut for each catalyst layer 3 by a cutting portion (not shown) (for example, the cutting portion having the same configuration as the cutting portion 580 shown in FIG. 16) so as to form a sheet of the laminated film 4. In addition, the elongated peeling sheet FA which is peeled off is rolled up to form a roll R12. The peeling sheet FA of the roll R12 may be used to form the catalyst layer 3 again.

In the above description, the laminated film 4 on which the catalyst layer 3 is formed on each of the +Z side and the −Z side of the electrolyte film 2A is formed, but the laminated film may be a film on which the catalyst layer 3 is formed on one surface of the +Z side and the −Z side of the electrolyte film 2A. In this case, the film is formed by sandwiching the electrolyte film 2A and one transfer sheet TA between the rollers RP1 and RP2. In addition, it is not limited to form the catalyst layer 3 on the +Z side and the −Z side of the electrolyte film 2A at the same time. For example, first, the catalyst layer 3 may be formed on the +Z side of the electrolyte film 2A by the transfer sheet TA, and then the catalyst layer 3 may be formed on the −Z side of the electrolyte film 2. The catalyst layer 3 may be transferred from the transfer sheet TA to a sheet of the electrolyte film 2 instead of transferring the catalyst layer 3 to the elongated electrolyte film 2A. In regard to the technique relating to transfer, for example, the contents disclosed in Japanese Unexamined Patent Application, Publication No. 2010-182563 may be adopted.

As described above, according to the present embodiment, it is possible to easily and reliably form the catalyst layer 3 having high catalytic activity with respect to the elongated peeling sheet FA. By using the elongated transfer sheet TA having this catalyst layer 3, the catalyst layer 3 can be easily transferred to the electrolyte film 2 or the elongated electrolyte film 2A, and therefore the laminated film 4 exhibiting high performance can be easily formed.

[Fuel-Cell Manufacturing System and Fuel-Cell Manufacturing Method]

Next, an embodiment of a fuel-cell manufacturing system will be described with reference to the drawings. FIG. 26(A) is a block diagram showing an example of a fuel-cell manufacturing system, and FIG. 26(B) is an exploded perspective view showing an example of a cell of a fuel cell. As shown in FIG. 26(A), a fuel-cell manufacturing system SYS1 includes the catalyst-layer forming apparatus 1, a gas diffusion layer manufacturing apparatus 910, a separator manufacturing apparatus 920, and an assembling apparatus 930, and manufactures a cell 901 shown in FIG. 26(B). The fuel-cell manufacturing system SYS1 shown in FIG. 26(A) is an example and may be configured to include other apparatuses, or may be configured to not to include one or more of the gas diffusion layer manufacturing apparatus 910, the separator manufacturing apparatus 920, and the assembling apparatus 930.

The apparatus (catalyst-layer forming apparatus) 1 is the same as that in the first embodiment described above, and any one of the apparatuses 100 to 800 shown in the other embodiments may be used instead. In addition, each of the apparatus 1, the gas diffusion layer manufacturing apparatus 910, the separator manufacturing apparatus 920, and the assembling apparatus 930 is not limited to be provided only one, but a plurality of each of the apparatuses may be appropriately disposed according to a processing time of each apparatus. In addition, disposing of each apparatus is arbitrary. For example, the apparatus 1, the gas diffusion layer manufacturing apparatus 910, and the separator manufacturing apparatus 920 may be disposed around the assembling apparatus 930 as a center.

In the present specification, the term "fuel cell" means a cell capable of generating electricity by using an oxidation-reduction reaction of fuel. For example, the "fuel cell" includes a cell having the laminated film 4 having the catalyst layer 3 on at least one side of the electrolyte film 2. As shown in FIG. 26(B), in the cell 901 of the fuel cell, gas diffusion layers 911 are disposed on the +Z surface side and the −Z surface side of the laminated film 4, respectively, and separators 921 are disposed on the outer side of the gas diffusion layer 911, respectively. A plurality of these cells are stacked to form a fuel cell stack. The cell 901 shown in FIG. 26(B) is merely an example and may have other configurations.

The gas diffusion layer manufacturing apparatus 910 shown in FIG. 26(A) manufactures the gas diffusion layer 911 used for the cell 901. In the cell 901, the gas diffusion layer 911 has, for example, a function of diffusing a gas such as hydrogen or oxygen (air) into the catalyst layer 3 and a function of collecting electrons generated by a chemical reaction of electrodes. A configuration of the gas diffusion layer manufacturing apparatus 910 is arbitrary. For example, as shown in FIGS. 22 and 24(A), a transfer sheet on which the gas diffusion layer 911 is formed on the peeling sheets F and FA may be prepared so as to make the gas diffusion layer 911 to be transferable to the catalyst layer 3 by using the transfer sheet. The separator manufacturing apparatus 920 manufactures the separator 921 used for the cell 901. For example, in the cell 901, the separator 921 has a function as a flow path of fuel such as hydrogen and air, a function as a partition between stacked cells 901, a function as a transmission portion of current collection and current to the outside, and the like. A configuration of the separator manufacturing apparatus 920 is arbitrary. The assembling apparatus 930 uses the parts constituting the cell 901 to assemble the parts, and therefore manufactures a fuel cell in which a plurality of the cells 901 are stacked. A configuration of the assembling apparatus 930 is arbitrary.

Figure 27:
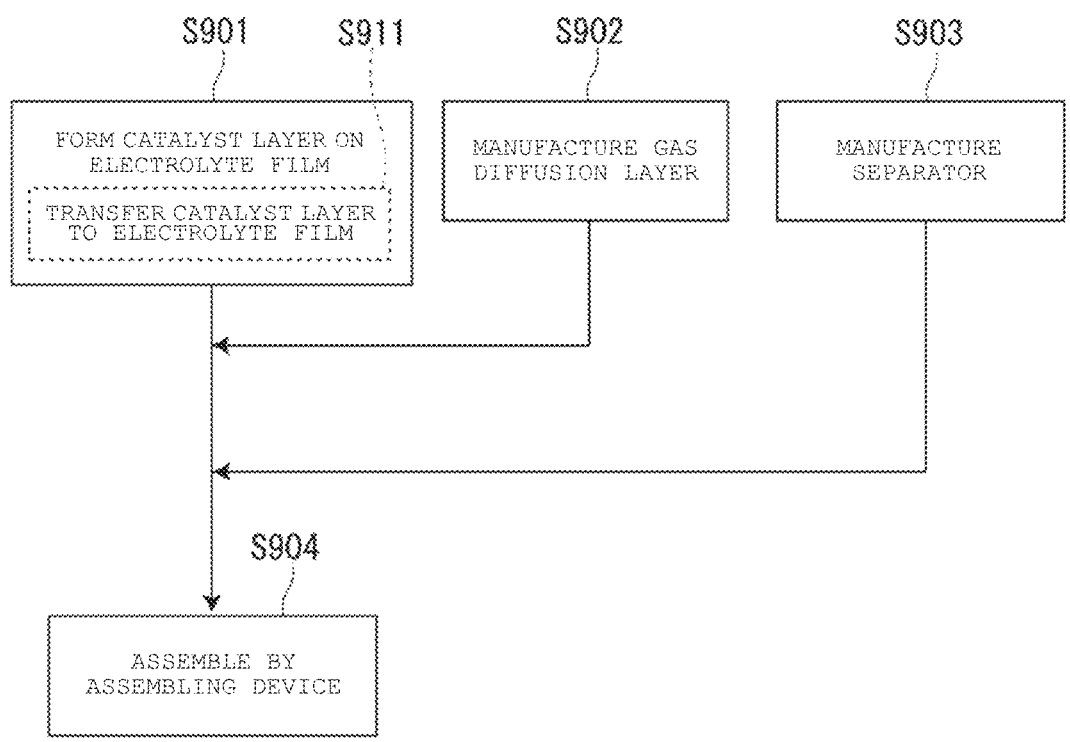
FIG. 27 is a flowchart showing an example of a fuel-cell manufacturing method according to an embodiment.

Next, a fuel-cell manufacturing method will be described with reference to the drawings. FIG. 27 is a flowchart showing the fuel-cell manufacturing method. As shown in FIG. 27, formation of the catalyst layer 3 on the electrolyte film 2 by the apparatus 1 (step S901), manufacture of the gas diffusion layer 911 by the gas diffusion layer manufacturing apparatus 910 (step S902), and manufacture of the separator 921 by the separator manufacturing apparatus 920 (step S903) are performed. The step S901 is the manufacture of the laminated film 4 for a fuel cell. Furthermore, in the step S901, in a case where the catalyst layer 3 is formed on the peeling sheets F and FA (in a case where the transfer sheets T and TA are formed), transferring of the catalyst layer 3 to the electrolyte films 2 and 2A from the peeling sheets F and FA (transfer sheets T and TA) (step S911) may be included. These steps S901 to S903 may be performed together or performed in order.

Next, using the laminated film 4, the gas diffusion layer 911, and the separator 921 formed in the steps S901 to S903, the assembling apparatus 930 assembles the cell 901 and assembles a fuel electric stack in which the cells 901 are stacked (step S904). In the step S904, for example, the gas diffusion layer 911 is set on the separator 921, the laminated film 4 is set on the gas diffusion layer 911, and the gas diffusion layer 911 is set on the laminated film 4. The separator 921 is set on the gas diffusion layer 911 and the above process is repeated to complete a fuel cell stack in which the plurality of the cells are stacked. Processes such as electrode formation of the fuel cell stack and electrical connection between the cells 901 are omitted.

The above-described fuel-cell manufacturing method is merely an example and other methods may be used. For example, in the method described above, after the laminated film 4, the gas diffusion layer 911, and the separator 921 are respectively manufactured, these are assembled to manufacture the cell 901 and the fuel cell stack, but the method is not limited to this method. For example, the method may be a method in which the laminated film 4 is manufactured first, the gas diffusion layer 911 is formed on both sides of the laminated film 4 by the gas diffusion layer manufacturing apparatus 910 to obtain a composite film, the composite film and the separator 921 are alternately laminated, and therefore the fuel cell stack having the plurality of the cells 901 is formed.

As described above, according to the present embodiment, since the laminated film 4 having a high catalytic effect is supplied by the apparatus 1 in a short time, it is possible to efficiently manufacture the cell 901 (fuel cell) with improved power generation efficiency in a short time.

The technical scope of the present invention is not limited to the above-described embodiments. For example, one or more of the requirements described in the above-described embodiments may be omitted. Furthermore, the requirements described in the above-described embodiments can be appropriately combined. In addition, in the above-described embodiment, the electrolyte films 2 and 2A and the peeling sheets F and FA are used as the application object, but the present invention is not limited thereto, and other members may be used as the application object. In addition, to the extent permitted by laws and ordinances, the contents of Japanese Unexamined Patent Application, Publication No. 2015-205286 which is a Japanese patent application, and all the documents cited in the present specification are incorporated as part of the text.

REFERENCE SIGNS LIST 1, 100, 200, 300, 400, 500, 600, 700, 800: apparatus (catalyst-layer forming apparatus)
2, 2A: electrolyte film (application object)
3: catalyst layer
4, 4A, 4B, 4C, 4D, 4E, 4F, 4G, 4H, 4I: laminated film (laminated film for fuel cell)
5: catalyst ink
6, 206A, 206B, 606: holding portion
7, 207, 307A, 307B, 507, 507A: application portion 8, 208, 508: chamber portion
9: suction portion
15: adsorption portion
17: suction portion for adsorption
18: hole
24: sheet member
26: heating portion
55, 555: space
110: adjustment portion
580, 780: cutting portion
688: tension applying portion
S, SA: base material sheet
F, FA: peeling sheet (application object)
SYS1: fuel-cell manufacturing system

The invention claimed is:

1. An apparatus for forming a catalyst layer for a fuel cell on an application object, the apparatus comprising:
   a holding portion including a table comprising a top surface, and a pair of rollers arranged such that the table is located between the pair of rollers, the pair of rollers positioned below the top surface of the table, the holding portion being configured to hold a sheet-shaped application object while applying tension by the table and the pair of rollers to the application object transported from one of the pair of rollers to another;
   an application portion that applies a catalyst ink for forming the catalyst layer on at least one surface of the application object held by the holding portion;
   a chamber portion comprising a lid portion and a base to which the holding portion is affixed, the lid portion configured to form a space including the holding portion together with the base;
   a suction portion that depressurizes the space formed by the chamber portion so as to dry the catalyst ink; and
   a shaft to which at least a portion of the application object is rolled,
   wherein the application portion is disposed movably with respect to the holding portion between a facing position where the catalyst ink is applicable to the application object and a retreat position where the application portion retreats from and is outside of the chamber portion,
   wherein the lid portion is configured to move between a closed position where the lid portion is in contact with the base to form the space that includes the holding portion and an open position where the lid portion is positioned away from the base to expose a surface of the holding portion to outside of the space so as to allow the application portion to apply the catalyst ink onto the at least one surface of the application object, and
   wherein when the lid portion is located at the open position, the application portion is configured to move with respect to the holding portion between the facing position and the retreat position.

2. The apparatus of claim 1, wherein the holding portion is configured to transport the application object in a horizontal direction along the top surface of the table, and the application object is disposed so as to extend lengthwise in the horizontal direction.

* * * * *